US012231888B2

(12) United States Patent
Yin et al.

(10) Patent No.: US 12,231,888 B2
(45) Date of Patent: Feb. 18, 2025

(54) WIRELESS NETWORK ACCESS METHOD, APPARATUS, DEVICE, EQUIPMENT AND SYSTEM

(71) Applicant: TENCENT TECHNOLOGY (SHENZHEN) COMPANY LIMITED, Guangdong (CN)

(72) Inventors: Xiyi Yin, Shenzhen (CN); Jun Li, Shenzhen (CN); Boheng Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 343 days.

(21) Appl. No.: 17/238,328

(22) Filed: Apr. 23, 2021

(65) Prior Publication Data

US 2021/0243603 A1 Aug. 5, 2021

Related U.S. Application Data

(63) Continuation of application No. PCT/CN2019/126136, filed on Dec. 18, 2019.

(30) Foreign Application Priority Data

Jan. 11, 2019 (CN) .......................... 201910028708.0

(51) Int. Cl.
*H04W 12/08* (2021.01)
*H04W 12/041* (2021.01)
(Continued)

(52) U.S. Cl.
CPC ......... *H04W 12/08* (2013.01); *H04W 12/041* (2021.01); *H04W 12/06* (2013.01); *H04W 12/106* (2021.01); *H04W 84/12* (2013.01)

(58) Field of Classification Search
CPC . H04W 12/106; H04W 12/041; H04W 12/06; H04W 12/122; H04L 63/123; H04L 63/205
See application file for complete search history.

(56) References Cited

U.S. PATENT DOCUMENTS

2004/0073797 A1\* 4/2004 Fascenda ............ H04L 63/0869
713/171
2011/0047603 A1\* 2/2011 Gordon ............... H04L 63/0823
726/5
(Continued)

FOREIGN PATENT DOCUMENTS

| CN | 103298072 A | 9/2013 |
|---|---|---|
| CN | 105050081 A | 11/2015 |

(Continued)

OTHER PUBLICATIONS

YounSun et al. , Oct. 2006 IEEE International Conference on Mobile Ad Hoc and Sensor Systems; Secure Access Control for Location-Based Applications in WLAN Systems (Year: 2006).\*

(Continued)

*Primary Examiner* — Benjamin E Lanier
*Assistant Examiner* — Lydia L Noel
(74) *Attorney, Agent, or Firm* — Sughrue Mion, PLLC

(57) ABSTRACT

A wireless network access method, apparatus, device, and system are provided. The method includes: receiving a user account and identification information of a wireless access point from a guest terminal, the identification information including first identification information and second identification information; generating a dynamic key according to the user account and the first identification information, and transmitting the dynamic key to the guest terminal; receiving a first check request from the wireless access point, the first check request including a media access control (MAC) address, the first identification information, and a first mes- (Continued)

sage integrity code (MIC); verifying the first message integrity code according to the dynamic key obtained by using the media access control address, and generating a first authorization result according to a verification result of the first message integrity code; and transmitting the first authorization result to the guest terminal through the wireless access point.

19 Claims, 33 Drawing Sheets

(51) Int. Cl.
*H04W 12/06* (2021.01)
*H04W 12/106* (2021.01)
*H04W 84/12* (2009.01)

(56) References Cited

U.S. PATENT DOCUMENTS

| | | | |
|---|---|---|---|
| 2013/0019298 A1* | 1/2013 | Jover Segura | H04L 63/1466 726/7 |
| 2014/0273958 A1* | 9/2014 | Messana | H04L 63/0892 455/411 |
| 2017/0374551 A1* | 12/2017 | Shen | H04L 9/40 |
| 2018/0332471 A1 | 11/2018 | Zhu | |
| 2018/0376523 A1* | 12/2018 | Li | H04W 76/10 |

FOREIGN PATENT DOCUMENTS

| | | | | |
|---|---|---|---|---|
| CN | 105898743 A | * | 8/2016 | ............ H04W 12/04 |
| CN | 106792266 A | * | 5/2017 | ............ H04N 17/00 |
| CN | 107613491 A | | 1/2018 | |
| CN | 108769992 A | | 11/2018 | |
| CN | 109548018 A | | 3/2019 | |
| WO | WO-2014189262 A1 | * | 11/2014 | ......... H04L 63/0876 |
| WO | 2015/106798 A1 | | 7/2015 | |
| WO | WO-2017129089 A1 | * | 8/2017 | ......... H04L 63/0442 |
| WO | WO-2017190616 A1 | * | 11/2017 | ........... H04L 63/061 |

OTHER PUBLICATIONS

International Search Report for PCT/CN2019/126136 dated Mar. 19, 2020 (PCT/ISA/210).
Written Opinion for PCT/CN2019/126136 dated Mar. 19, 2020 (PCT/ISA/237).
Translation of Written Opinion dated Mar. 19, 2020 from the International Searching Authority in International Application PCT/CN2019/126136.
Extended European Search Report dated Jan. 26, 2022 from the European Patent Office in EP Application No. 19909154.7.
Communication issued Aug. 12, 2024 in European Application No. 19 909 154.7.

* cited by examiner

WIRELESS NETWORK ACCESS METHOD, APPARATUS, DEVICE, EQUIPMENT AND SYSTEM

CROSS-REFERENCE TO RELATED APPLICATION(S)

This application is a bypass continuation application of PCT/CN2019/126136, entitled "WIRELESS NETWORK ACCESS METHOD, DEVICE, EQUIPMENT AND SYSTEM" and filed Dec. 18, 2019, which claims priority to Chinese Patent Application No. 201910028708.0, entitled "WIRELESS NETWORK ACCESS METHOD, DEVICE, EQUIPMENT AND SYSTEM," filed with the National Intellectual Property Administration, PRC, on Jan. 11, 2019, the disclosures of which are incorporated by reference in their entirety.

FIELD

The disclosure relates to the field of network security, and in particular, to a wireless network access method, apparatus, device, and system.

BACKGROUND

A wireless network has become an important form of accessing the Internet by terminals such as a smartphone, a tablet computer, and a smart household. Usually, the wireless network is a Wireless-Fidelity (Wi-Fi) network.

A related art provides guest access manner for a password-type Wi-Fi hotspot. When a terminal scans a connectable Wi-Fi hotspot, a Wi-Fi connection program in the terminal transmits a query request to a server, where the query request is used for requesting a password of the Wi-Fi hotspot. The server transmits an access password of the Wi-Fi hotspot to the Wi-Fi connection program. The Wi-Fi connection program transmits an access request according to a service set identifier (SSID) and the access password of the Wi-Fi hotspot. When successfully verifying the SSID and the access password, the Wi-Fi hotspot allows access to the Internet by the terminal.

In the foregoing process, the server transmits the access password of the Wi-Fi hotspot to the terminal, and the access password is buffered in an operating system of the terminal. When the access password is buffered, there is a risk that the access password is shared with a third-party application program indirectly without authorization.

SUMMARY

According to various embodiments, a wireless network access method, apparatus, device, and system are provided.

According to an embodiment, there is provided a wireless network access method performed by a server. The method includes: receiving a user account and identification information of a wireless access point from a guest terminal, the identification information including first identification information and second identification information; generating a dynamic key according to the user account and the first identification information, and transmitting the dynamic key to the guest terminal; receiving a first check request from the wireless access point, the first check request including a media access control (MAC) address, the first identification information, and a first message integrity code (MIC); verifying the first message integrity code according to the dynamic key obtained by using the media access control address, and generating a first authorization result according to a verification result of the first message integrity code; and transmitting the first authorization result to the guest terminal through the wireless access point.

According to an embodiment, there is provided a wireless network access method, performed by a guest terminal running a first application program. The method includes: obtaining identification information of at least one wireless access point around the guest terminal; displaying a wireless network access interface, the wireless network access interface including a classified secure wireless network area and a common wireless network area, the secure wireless network area being used for displaying first identification information and a first connection control, and the common wireless network area being used for displaying second identification information and a second connection control; displaying a wireless network connection interface in response to receiving a trigger signal for the first connection control, the wireless network connection interface being used for displaying progress prompt information of a wireless network connection process, and the wireless network connection process being an authentication process performed based on a user account, a media access control (MAC) address of the guest terminal, and the first identification information; and displaying a network connection result interface based on the wireless network connection process being completed, the network connection result interface being used for displaying a connection result of a wireless access point corresponding to the first identification information.

According to an embodiment, there is provided a wireless network access apparatus, the apparatus including: at least one memory storing computer program code; at least one processor configured to access the at least one memory and operate as instructed by the computer program code. The computer program code includes: second receiving code configured to cause at least one processor to receive a user account and identification information of a wireless access point from a guest terminal, the identification information including first identification information and second identification information; generation code configured to cause at least one processor to generate a dynamic key according to the user account and the first identification information, and transmit the dynamic key to the guest terminal; second receiving module further configured to cause at least one processor to receive a first check request transmitted by the wireless access point, the first check request including a media access control (MAC) address, the first identification information, and a first message integrity code (MIC); verification code configured to cause at least one processor to verify the first message integrity code according to the dynamic key obtained by using the media access control address, and generate a first authorization result according to a verification result of the first message integrity code; and second transmission code configured to cause at least one processor to transmit the first authorization result to the guest terminal through the wireless access point.

According to an embodiment, there is provided a non-transitory computer readable recording medium storing a program code, when executed by at least one processor, the at least one processor is configured to: receive a user account and identification information of a wireless access point from a guest terminal, the identification information including first identification information and second identification information; generating a dynamic key according to the user account and the first identification information, and transmit the dynamic key to the guest terminal; receive a first check request from the wireless access point, the first check request including a media access control (MAC) address, the first identification information, and a first message integrity code (MIC); verify the first message integrity code according to the dynamic key obtained by using the media access control address, and generate a first authorization result according to a verification result of the first message integrity code; and transmit the first authorization result to the guest terminal through the wireless access point.

According to an embodiment, there is provided a non-transitory computer readable recording medium storing a program code, when executed by at least one processor, the at least one processor is configured to: obtain identification information of at least one wireless access point around the guest terminal; display a wireless network access interface, the wireless network access interface including a classified secure wireless network area and a common wireless network area, the secure wireless network area being used for displaying first identification information and a first connection control, and the common wireless network area being used for displaying second identification information and a second connection control; display a wireless network connection interface in response to receiving a trigger signal for the first connection control, the wireless network connection interface being used for displaying progress prompt information of a wireless network connection process, and the wireless network connection process being an authentication process performed based on a user account, a media access control (MAC) address of the guest terminal, and the first identification information; and display a network connection result interface based on the wireless network connection process being completed, the network connection result interface being used for displaying a connection result of a wireless access point corresponding to the first identification information.

BRIEF DESCRIPTION OF THE DRAWINGS

To describe the technical solutions in the embodiments more clearly, the following briefly introduces the accompanying drawings for describing the embodiments. Apparently, the accompanying drawings in the following description show only some embodiments, and a person of ordinary skill in the art may still derive other accompanying drawings from these accompanying drawings without creative efforts.

DESCRIPTION

To make the objectives, technical solutions, and advantages of the disclosure clearer, the following describes one or more embodiments in detail with reference to the accompanying drawings. It is to be understood that the specific embodiments described herein are only used to describe example embodiments, and should not be construed as limiting the one or more embodiments of the disclosure.

In a related art, a guest terminal may establish a wireless network connection by using an application program. Using a Wi-Fi connection program as an example, the Wi-Fi connection program is a program used for connecting a password-type Wi-Fi hotspot. The Wi-Fi connection program obtains a Wi-Fi password by using a network, and fills a connection password field with the Wi-Fi password to connect to a wireless network.

Figure 1:
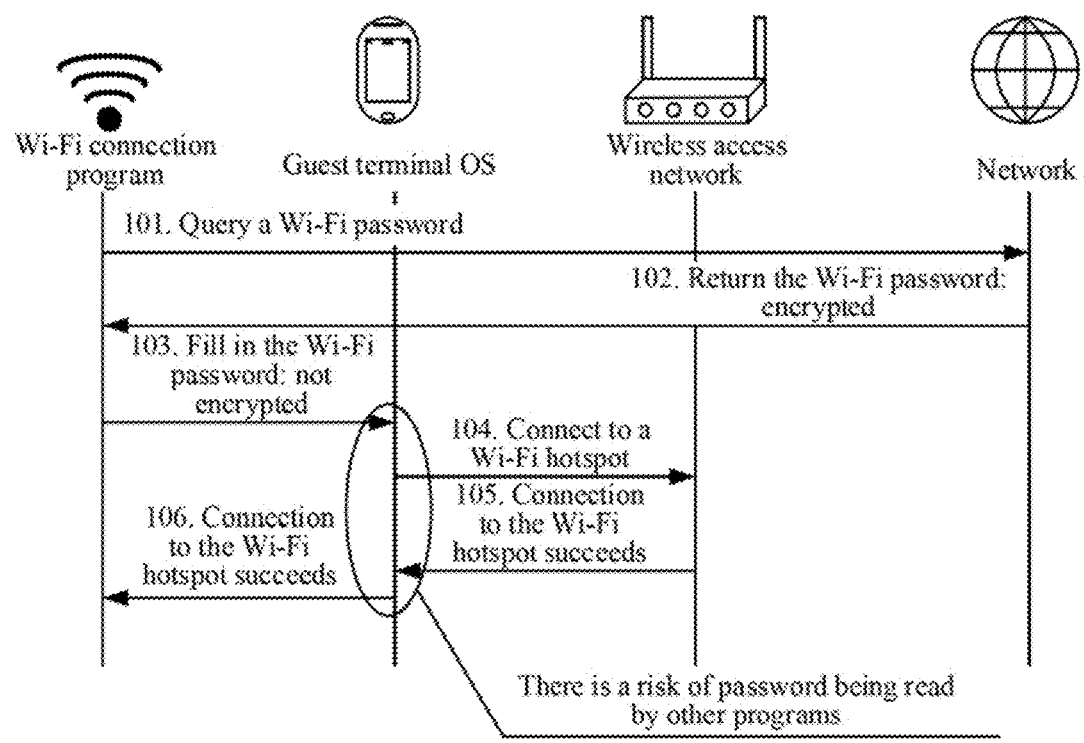
FIG. 1 is a flowchart illustrating a wireless network connection method by a Wi-Fi connection program of a related art.

FIG. 1 is a flowchart of implementing a wireless network connection method by a Wi-Fi connection program in a related art. The method includes the following steps:

Step 101: Query a Wi-Fi password.

When a Wi-Fi module in an operating system (OS) of a guest terminal obtains a connectable Wi-Fi hotspot, a Wi-Fi connection program in the guest terminal transmits a Wi-Fi password query request to a network, to request the network to transmit a connection password of the Wi-Fi hotspot. The Wi-Fi password request carries a user account of the guest terminal and a Service Set Identifier (SSID) and a Basic Service Set Identifier (BSSID) of a router.

Step 102: Return an encrypted Wi-Fi password.

After receiving the Wi-Fi password query request transmitted by the Wi-Fi connection program, the network transmits a Wi-Fi password corresponding to a Wi-Fi hotspot scanned by the guest terminal to the Wi-Fi connection program, and the network encrypts the returned Wi-Fi password.

Step 103: Fill in the unencrypted Wi-Fi password.

The Wi-Fi connection program decrypts the received Wi-Fi password, and stores the decrypted Wi-Fi password in the operating system of the guest terminal. In addition, the guest terminal fills a connection password field with the decrypted Wi-Fi password.

Step 104: Connect to the Wi-Fi hotspot.

After filling the connection password field with the Wi-Fi password, the operating system of the guest terminal connects to the Wi-Fi hotspot. The Wi-Fi hotspot is a hotspot provided by the router.

Step 105: Connection to the Wi-Fi hotspot between the wireless access network and the guest terminal OS.

The router verifies that the Wi-Fi password filled in by the guest terminal has access permission and allows the guest terminal to access the Wi-Fi hotspot. The router transmits Wi-Fi connection success information to the operating system of the guest terminal.

Step 106: Connection to the Wi-Fi hotspot between the guest terminal OS and the Wi-Fi connection program.

The operating system of the guest terminal receives the Wi-Fi connection success information, and the Wi-Fi connection program obtains the Wi-Fi connection success information from the operating system of the guest terminal.

In the foregoing process, the Wi-Fi password transmitted by the network is decrypted by the Wi-Fi connection program and then stored in the operating system of the guest terminal. Consequently, there is a risk that the Wi-Fi password is shared indirectly without authorization after being read by a third-party application program. For example, a hotspot owner may inform a guest the Wi-Fi password, and the guest may inform a third person unauthorized by the hotspot owner the Wi-Fi password. Alternatively, the Wi-Fi password is shared on the network by password sharing software installed on the guest terminal.

Embodiments of the disclosure provide a wireless network access method, apparatus, device, and system, to resolve the problem in the foregoing related art by improving security measures of the Wi-Fi connection.

Figure 2:
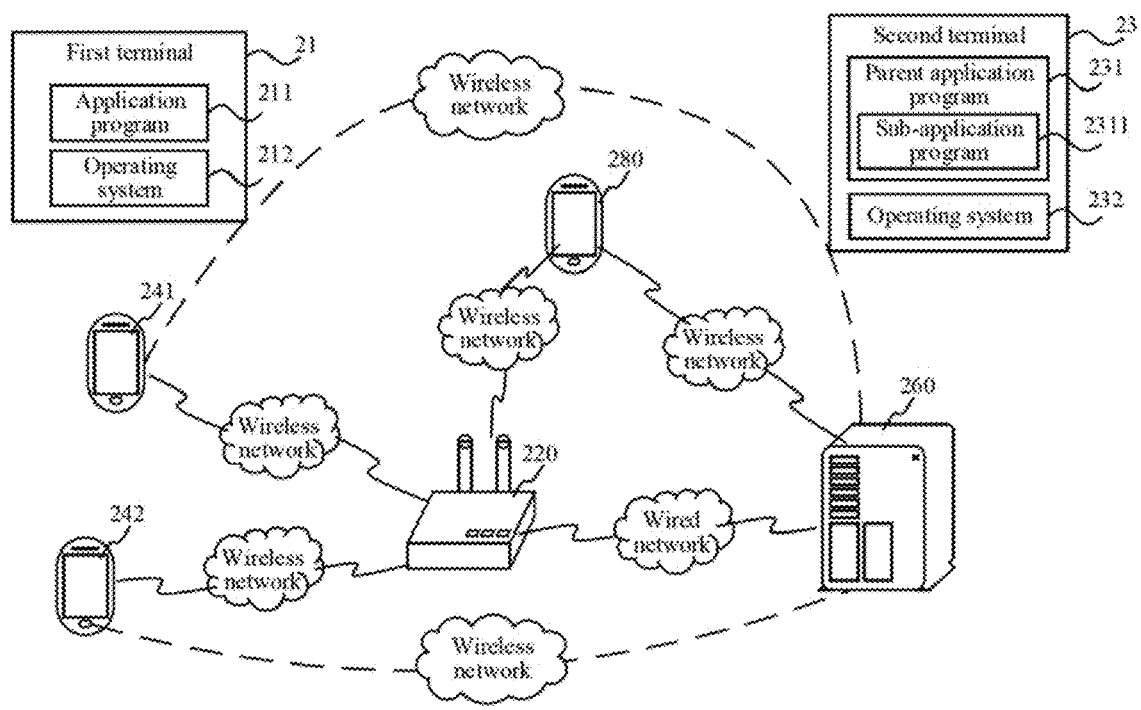
FIG. 2 is a schematic diagram of a wireless network connection system according to an embodiment.

FIG. 2 is a diagram of a wireless network access system according to an embodiment. The wireless network access system includes a wireless access point 220, a first guest terminal 241, a second guest terminal 242, a server 260, and an authorizer terminal 280.

The wireless access point 220 may be a general term for devices providing a wireless network access service, for example, a router, a Wi-Fi hotspot, and a wireless gateway. In this embodiment, for example, the wireless access point 220 is a wireless router, that is, the wireless router 220 provides a wireless network access service. The wireless access point 220 is controlled by the authorizer terminal 280. The wireless access point 220 is connected to the authorizer terminal 280 by using a wireless network, the wireless access point 220 is connected to the first guest terminal 241 and the second guest terminal 242 by using a wireless network, and the wireless access point 220 is connected to the server 260 by using a wired network.

In addition, the wireless access point 220 is connected to the first guest terminal 241 and the second guest terminal 242 by using a Wi-Fi network.

The authorizer terminal 280 is a terminal corresponding to first identification information of the wireless access point 220, that is, a person (e.g., an authorizer) possessing the authorizer terminal 280 is an owner of the wireless access point 220. The authorizer terminal 280 is configured to authorize the first guest terminal 241 or the second guest terminal 242 that requests to access a wireless network, so as to allow the first guest terminal 241 and/or the second guest terminal 242 to access a Wi-Fi hotspot. The authorizer terminal 280 runs a second application program. The authorizer terminal 280 is connected to the server 260 by using a wireless network.

The first guest terminal 241 and the second guest terminal 242 each may be a mobile phone, a tablet computer, an e-book reader, a laptop, a desktop computer, or the like. The first guest terminal 240 is connected to the server 260 by using a wireless network, and the second guest terminal 242 is connected to the server 260 by using a wireless network.

The first guest terminal 241 may be connected to the server 260 by using a mobile communications network, the second guest terminal 242 may be connected to the server 260 by using a mobile communications network, and the mobile communications network includes a 4G network or a 5G network.

Both the first guest terminal 241 and the second guest terminal 242 may be installed with a first application program used for connecting to a Wi-Fi hotspot, for example, QQ and WeChat. For example, while FIG. 2 only shows two guest terminals, in an actual use scenario, a quantity of guest terminals is not limited thereto, and there may be one or more guest terminals. This embodiment sets no limitation on the quantity of guest terminals.

The server 260 stores an authorization library, and the authorization library stores a correspondence among first identification information of a wireless access point, a user account and a Media Access Control (MAC) address that are authorized by the authorizer terminal. The server 260 is configured to verify, according to information stored in the authorization library, a guest terminal that requests to access a Wi-Fi hotspot. The server 260 may be one server, a server cluster formed by multiple servers, or a cloud computing center.

The authorizer terminal 280 may replace the server 260, that is, the authorizer terminal 280 implements a function implemented by the server 260, or the server 260 is integrated in the authorizer terminal 280. Therefore, the authorizer terminal 280 may store an authorization library, and the authorization library stores the correspondence among first identification information of a wireless access point, a user account and a MAC address that are authorized by the authorizer terminal. The authorizer terminal 280 is configured to verify, according to the information stored in the authorization library, a guest terminal that requests to access a Wi-Fi hotspot.

In an embodiment, a first terminal 21 may be any one of the first guest terminal 241, the second guest terminal 242, and the authorizer terminal 280, and the first terminal 21 includes an application program 211 and an operating system 212.

The application program 211 may be any one of the first application program and the second application program. When the first terminal 21 is the first guest terminal 241 or the second guest terminal 242, the application program 211 is used for performing an operation of accessing a wireless network. When the first terminal 21 is the guest terminal 280, the application program 211 is used for performing an operation of authorizing a guest terminal to access a wireless network.

The operating system 212 is used for providing storage space and user account security measures for running the application program 211.

In an embodiment, a second terminal 23 may be any one of the first guest terminal 241 and the second guest terminal 242, the second terminal 23 includes a parent application program 231 and an operating system 232, and the parent application program 231 includes a sub-application program 2311.

The parent application program 231 is an application program used for carrying the sub-application program 2311, and provides an environment for implementing the sub-application program. The parent application 231 is a native application. The native application is an application that may be directly run on the OS. The parent application program 231 may be a social application program, a dedicated application program specially supporting the sub-application program, a file management application program, an email application program, a game application program, or the like. The social application includes an instant messaging application, a social network service (SNS), a live broadcast application, or the like.

The sub-application program 2311 is an application program that depends on the parent application program 231 to run. The child application 2311 may be specifically a social application, a file management application, a mail application, a game application, or the like. The sub-application program may be referred to as a mini program. A user may directly open the sub-application program 2311 by scanning a two-dimensional code corresponding to the sub-application program 2311 or searching for a name of the sub-application program 2311. The sub-application program 2311 may be conveniently obtained and propagated in the parent application program 231.

The operating system 232 is used for providing storage space and user account security measures for running the parent application program 231 and the sub-application program 2311.

Figure 3:
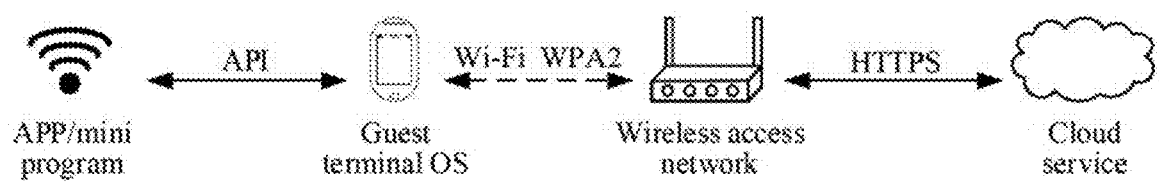
FIG. 3 is a schematic diagram of a wireless access point system according to another embodiment.

In the implementation environment shown in FIG. 2, and referring to FIG. 3, for example, a wireless network is a Wi-Fi hotspot, and a server may be a cloud server or a plurality of servers in a cluster providing a cloud service. A first application program running on a guest terminal is an APP/mini program. An operating system of the guest terminal is used for obtaining, by using a Wi-Fi module, a Wi-Fi hotspot distributed around the guest terminal. The first application program is used for obtaining, by using an application programming interface (API), the Wi-Fi hotspot and first identification information of a wireless access point that are obtained by the Wi-Fi module in the operating system of the guest terminal, and fill a connection password field of the Wi-Fi hotspot with a dynamic key by using the API.

The guest terminal is configured to transmit a request for accessing the Wi-Fi hotspot to the wireless access point. After filling the connection password field with the dynamic key, the operating system of the guest terminal establishes a connection to the wireless access point according to Wi-Fi Protected Access (WPA) 2. The wireless access point and the cloud service verify, according to the Hyper Text Transfer Protocol over Secure Socket Layer (HTTPS), whether the guest terminal has connection permission. If the guest terminal has the connection permission, the guest terminal is allowed to access the Wi-Fi hotspot. If the guest terminal does not have the connection permission, the guest terminal is not allowed to access the Wi-Fi hotspot.

Figure 4:
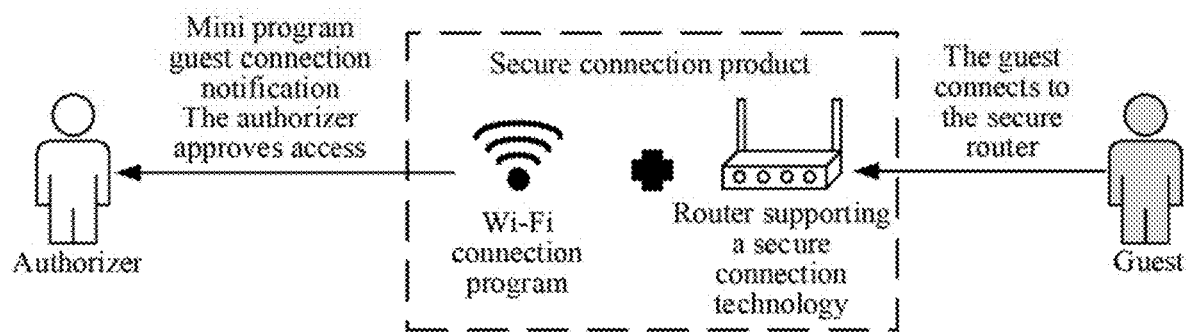
FIG. 4 is a schematic diagram of a secure connection product architecture based on a wireless access point system according to an embodiment.

In the implementation environment of the wireless access point system shown in FIG. 2 to FIG. 4, the one or more embodiments show a secure connection product architecture based on the wireless access point system and provided based on the implementation environment. The secure connection product architecture includes a Wi-Fi connection program and a secure router. The secure router is a router that supports a secure connection technology, the Wi-Fi connection program is a first application program, the Wi-Fi connection program is a mini program that depends on an instant messaging program (such as WeChat) to run, and the router is a wireless access point.

A guest terminal requests to connect to the secure router by using the Wi-Fi connection program, and the Wi-Fi connection program verifies, at a server (not shown in the figure) corresponding to the instant messaging program and a server (not shown in the figure) corresponding to the Wi-Fi connection program, whether the guest terminal has connection permission by using a secure router. If the guest does not have the connection permission, the guest needs to query, by using the Wi-Fi connection program, an authorizer requesting to authorize the guest to connect to the secure router. After the authorizer agrees to authorize the guest, the guest can connect to the secure router, and after the guest successfully connects to the secure router, the secure connection product transmits a connection notification of the guest to the authorizer. If the guest has the connection permission, the secure connection product transmits the connection notification of the guest to the authorizer.

A scenario in which the secure connection product architecture shown in FIG. 4 is used includes: a house, an office, a public place, and the like. In addition, the Wi-Fi connection program in the secure connection product architecture may be capable of obtaining identification of a securely controlled hotspot, an access request/authorization, hotspot configuration management, hotspot sharing and propagation, hotspot marketing, and the like.

Figure 5:
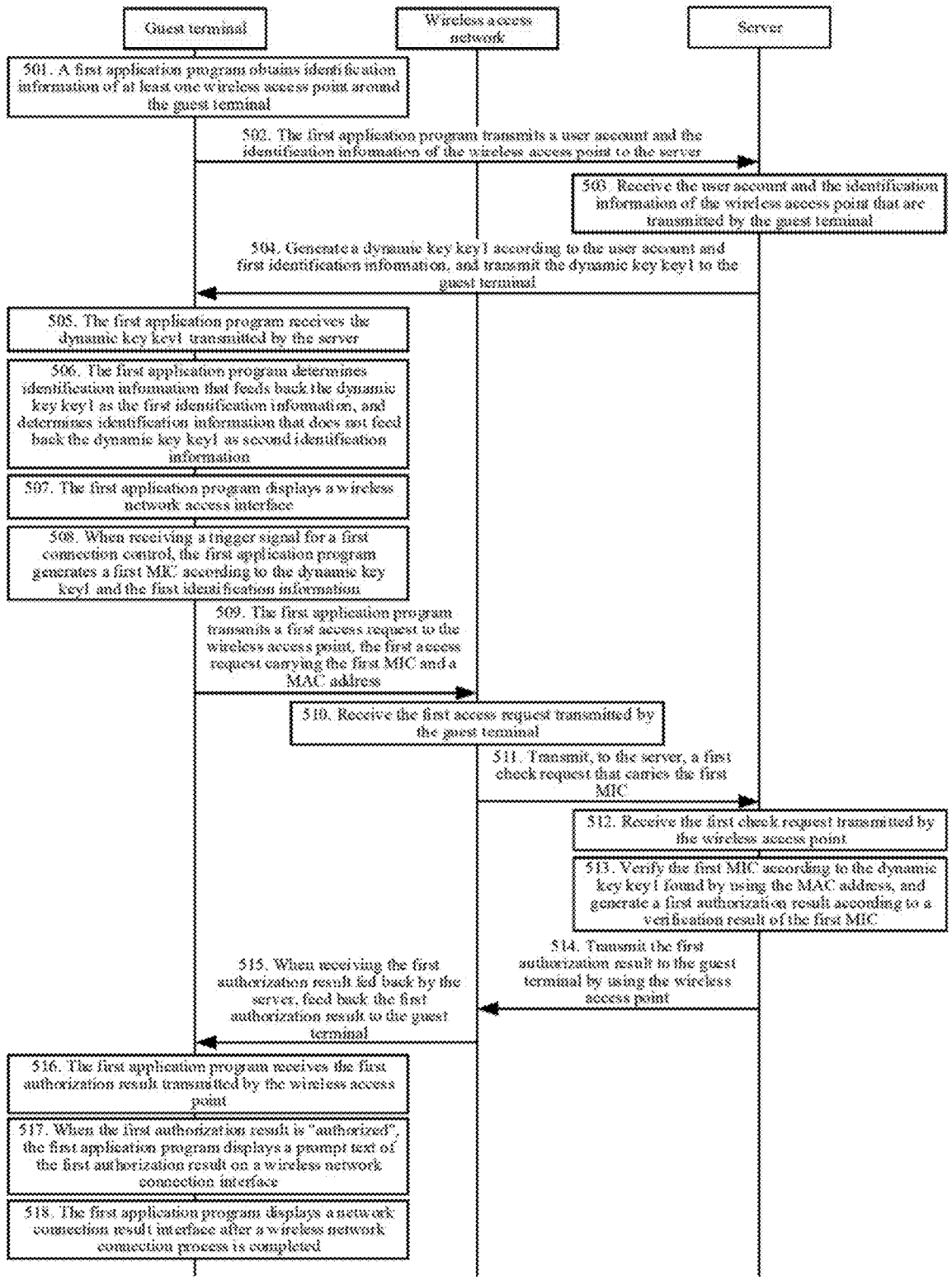
FIG. 5 is a flowchart of a wireless network access method according to an embodiment.

FIG. 5 is a flowchart of a wireless network access method according to an embodiment. The method may be applied to the implementation environment shown in FIG. 2 and/or FIG. 3. The method may alternatively be applied to the secure connection product architecture shown in FIG. 4. The method includes the following steps:

Step 501: A first application program obtains identification information of at least one wireless access point around a guest terminal.

The first application program runs on the guest terminal, and the first application program includes an application program used for connecting to a wireless network.

The first application program obtains, by using a wireless network module in an operating system of the guest terminal, identification information of at least one wireless access point around the guest terminal. The wireless access point is a device that provides a wireless network service, and the identification information of the wireless access point includes a service set identifier (SSID) and a basic service set identifier (BSSID).

The first application program further obtains a user account, and the user account is an account that a guest logs in to on the first application program.

Step 502: The first application program transmits the user account and the identification information of the wireless access point to a server.

The first application program transmits the obtained user account and identification information of the wireless access point to the server.

The identification information of the wireless access point includes first identification information and second identification information. The first identification information includes an SSID and a BSSID, and the first identification information is identification information corresponding to a secure wireless network. The second identification information includes an SSID and a BSSID, and the second identification information is identification information corresponding to a common wireless network.

Step 503: The server receives the user account and the identification information of the wireless access point that are transmitted by the guest terminal.

The server receives the user account, the SSID, and the BSSID that are transmitted by the guest terminal.

Step 504: The server generates a dynamic key key1 according to the user account and the first identification information, and transmits the dynamic key key1 to the guest terminal.

The server generates the dynamic key key1 according to the user account, the SSID, and the BSSID. Therefore, the dynamic key key1 is generated by the server according to the user account of the guest terminal and the first identification information of the wireless access point. The server transmits the generated dynamic key key1 to the guest terminal.

Step 505: The first application program receives the dynamic key key1 transmitted by the server.

After receiving the dynamic key key1, the first application program on the guest terminal fills a connection password field in a first access request with the dynamic key key1.

Step 506: The first application program determines identification information that includes the dynamic key key1 as the first identification information, and determines identification information that does not include the dynamic key key1 as the second identification information.

Step 507: The first application program displays a wireless network access interface.

The first application program displays the wireless network access interface according to the obtained first identification information and second identification information. The wireless network access interface includes a classified secure wireless network area and a common wireless network area. The secure wireless network area is used for displaying the first identification information and a first connection control, and the common wireless network area is used for displaying the second identification information and a second connection control. The first connection control is a connection control used for triggering connection to the secure wireless network. The second connection control is a connection control used for triggering connection to the common wireless network.

The wireless network access interface displays names of several wireless access points obtained by the guest terminal, and each name and an area in which each name is located include a connection control of a wireless access point. A connection control is used for generating a trigger signal according to a location triggered by a guest on the wireless network access interface. Therefore, the first connection control is used for generating a trigger signal based on the guest terminal triggering the secure wireless network in the secure wireless network area, and the second connection control is used for generating a trigger signal based on the guest terminal triggering the common wireless network in the common wireless network area.

The secure wireless network area is an area displayed on the wireless network access interface according to the dynamic key key1.

Step 508: When receiving the trigger signal for the first connection control, the first application program generates a first message integrity check (MIC) according to the dynamic key key1 and the first identification information.

The first application program determines, according to the trigger signal generated for the first connection control, a wireless access point to which the guest is connecting, and fills, with the dynamic key key1, a connection password field corresponding to the wireless access point to which the guest needs to connect. The first application program generates the first MIC according to the dynamic key key1 and the first identification information. The dynamic key key1 is used for filling the connection password field in the first access request. The first MIC is generated by the guest terminal according to the dynamic key key1 and the first identification information.

Step 509: The first application program transmits the first access request to the wireless access point, the first access request carrying the first MIC and a MAC address.

The first application program transmits the first access request to the wireless access point. The first access request includes a MAC packet, and the MAC packet includes a MAC header and a payload. The MAC header stores a real MAC address of the guest terminal, and the payload stores the first MIC generated by the guest terminal.

Step 510: The wireless access point receives the first access request transmitted by the guest terminal.

The first access request includes the MAC address and the first MIC of the guest terminal, and the first MIC is generated by the guest terminal according to the dynamic key key1 and the first identification information of the wireless access point.

Step 511: The wireless access point transmits a first check request that includes the first MIC to the server.

The first check request includes a MAC packet, and the MAC packet includes a MAC header and a payload. The MAC header stores the real MAC address of the guest terminal, and the payload stores the first MIC generated by the guest terminal. The first check request further carries the first identification information of the wireless access point, and the first identification information of the wireless access point includes a serial number (Serial Number, SN), an SSID, and a BSSID.

Step 512: The server receives the first check request transmitted by the wireless access point.

The first check request includes the MAC address of the guest terminal, the first identification information of the wireless access point, and the first MIC generated by the guest terminal.

Step 513: The server verifies the first MIC according to the dynamic key key1 found by using the MAC address, and generates a first authorization result according to a verification result of the first MIC.

The server stores an authorization library, and the authorization library is used for storing information corresponding to a guest terminal authorized by an authorizer terminal. The information includes a MAC address of the authorized guest terminal, a dynamic key key1 corresponding to the guest terminal, and the first MIC.

The server extracts the MAC address in the first check request, queries, according to the MAC address, whether the MAC address is stored in the authorization library, and if the MAC address is stored, verifies the first MIC according to the dynamic key key1 corresponding to the stored MAC address. The server generates the first authorization result according to the verification result of the first MIC. The first MIC is used for verifying information that is corresponding to the guest terminal and that is found by the server according to the MAC address.

The first authorization result may be "authorized" or "unauthorized". The "Authorized" result is generated when the server successfully verifies the information, and the "unauthorized" result is generated when the server does not successfully verify the information.

Step 514: The server transmits the first authorization result to the guest terminal by using the wireless access point.

The first authorization result is transmitted by the server to the wireless access point, and then the wireless access point transmits the first authorization result to the guest terminal.

Step 515: Based on the first authorization result fed back by the server to the wireless access point, the wireless access point feeds back the first authorization result to the guest terminal.

Step 516: The first application program receives the first authorization result transmitted by the wireless access point.

The first application program of the guest terminal receives the first authorization result, and determines whether the guest terminal is authorized by the authorizer terminal to connect to the wireless network.

Step 517: When the first authorization result is "authorized", the first application program displays a prompt text of the first authorization result on a wireless network connection interface.

The wireless network connection interface is used for displaying progress prompt information of a wireless network connection process, and the wireless network connection process is an authentication process performed based on the user account and the MAC address of the guest terminal, and the first identification information. The progress prompt information is used for prompting the progress of the wireless network connection process.

When the first authorization result is "authorized", the wireless network connection process on the wireless network connection interface on the first application program is displayed to be gradually completed, and the first application program displays the prompt text of the first authorization result on the wireless network connection interface. The prompt text is used for prompting that the guest terminal is authenticated by the authorizer terminal.

Step 518: The first application program displays a network connection result interface after the wireless network connection process is completed.

The network connection result interface is used for displaying a connection result of the wireless access point corresponding to the first identification information.

The first application program displays the network connection result interface according to a connection status of the guest terminal, and the network connection result interface displays the connection result of the wireless access point. The connection result includes connection success and connection failure.

According to the method provided in the one or more embodiments described above, the server authenticates, according to the user account and the MAC address of the guest terminal, and the first identification information of the wireless access point, the guest terminal that requests to access the wireless network. Even if information used by the guest terminal in the wireless network connection process is stolen by a third party terminal, because user accounts and/or MAC addresses of different terminals are different, the third party terminal cannot pass authentication at the server when attempting to establish a wireless network connection, thereby avoiding a risk that the wireless network is indirectly shared without authorization and improving the security of the wireless network.

Figure 6:
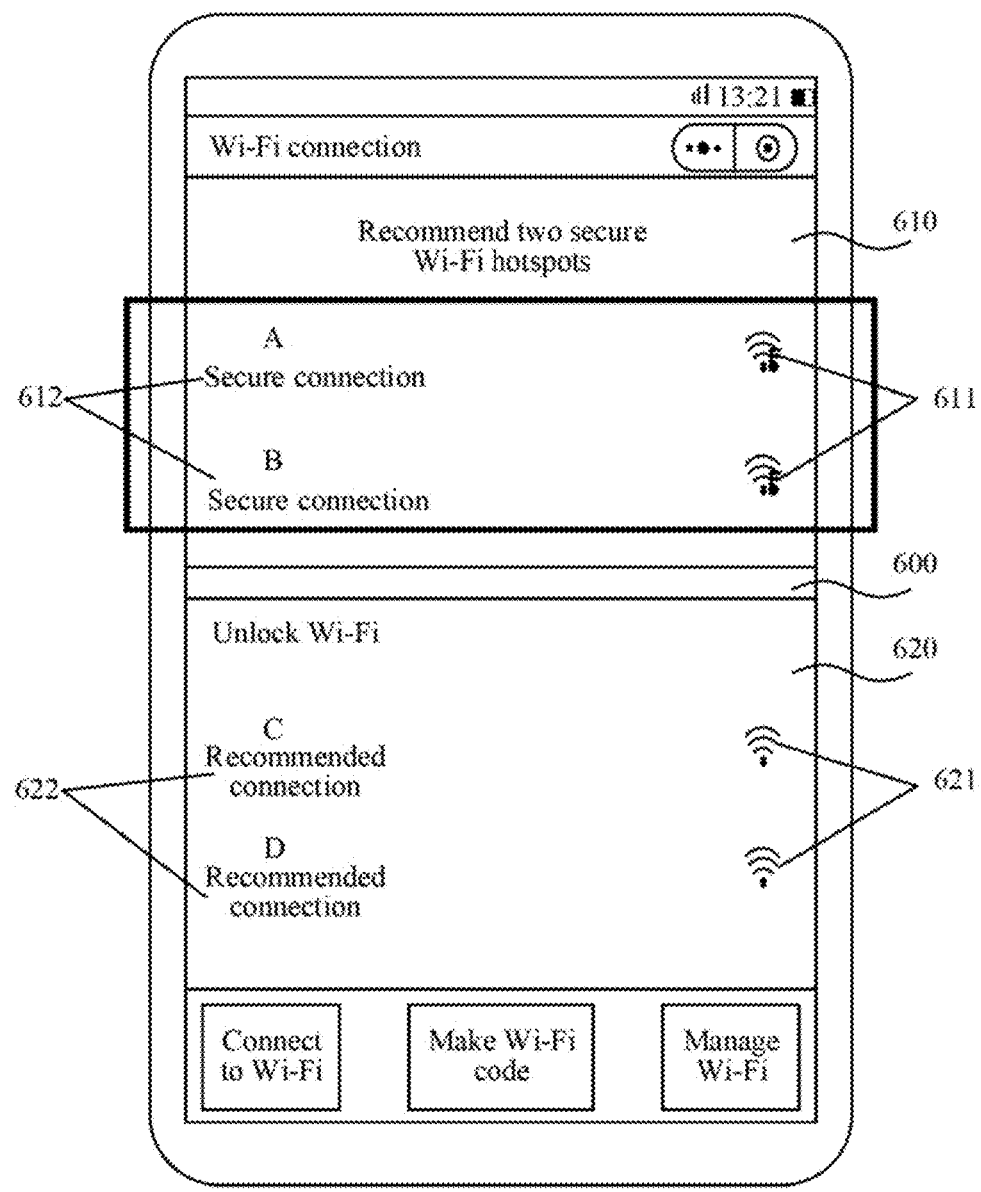
FIG. 6 is a schematic diagram of a wireless network access interface according to an embodiment.

FIG. 6 is a schematic diagram of a wireless network access interface according to an embodiment. A wireless network access interface 600 of the guest terminal is shown in FIG. 6. The first application program displays, on the wireless network access interface 600, names corresponding to one or more wireless networks obtained by the guest terminal. The wireless network access interface 600 includes a secure Wi-Fi area 610 and an unlocked Wi-Fi area 620. The secure Wi-Fi area 610 is a secure wireless network area, and the unlocked Wi-Fi area 620 is a common wireless network area. Each name on the wireless network access interface and an area in which each name is located cover a connection control. Each name in the secure Wi-Fi area 610 covers the first connection control, and each name in the unlocked Wi-Fi area 620 covers the second connection control. For example, the secure connections A and B located in the secure Wi-Fi area 610 are controlled under the first connection control. The unlocked Wi-Fi connections C and D located in the unlocked Wi-Fi area 620 are controlled under the second connection control.

The secure Wi-Fi area 610 is used for displaying a name of a wireless access point that has been securely registered with the server, that is, a Wi-Fi name displayed in the secure Wi-Fi area 610 indicates a secure Wi-Fi hotspot (a bold rectangular block in FIG. 6 indicates a secure Wi-Fi hotspot). The unlocked Wi-Fi area 620 is used for displaying a name of a wireless access point that is not securely registered with the server, that is, a Wi-Fi name displayed in the unlocked Wi-Fi area 620 indicates a common Wi-Fi hotspot. Moreover, the secure Wi-Fi area 610 may be located above the unlocked Wi-Fi area 620.

In addition, the secure Wi-Fi hotspot is identified by using a security identifier. The security identifier includes at least one of a text identifier 612, an icon identifier 611, a name of a highlighted secure Wi-Fi hotspot or an area in which a secure Wi-Fi hotspot is located, and a name of a secure Wi-Fi hotspot surrounded by a graphic frame or an area in which a secure Wi-Fi hotspot is located. For example, in FIG. 6, the text identifier 612 and the icon identifier 611 are used. In addition, the common Wi-Fi hotspot also uses a text identifier 622 and an icon identifier 621, but texts and icons of the two are different. The text identifier 612 of the secure Wi-Fi hotspot is "secure connection", the icon identifier 611 includes a key pattern, the text identifier 622 of the common Wi-Fi hotspot is "recommended connection", and the icon identifier 621 does not include a key pattern.

When receiving the trigger signal of the first connection control, the first application program displays the wireless network connection interface.

Figure 7:
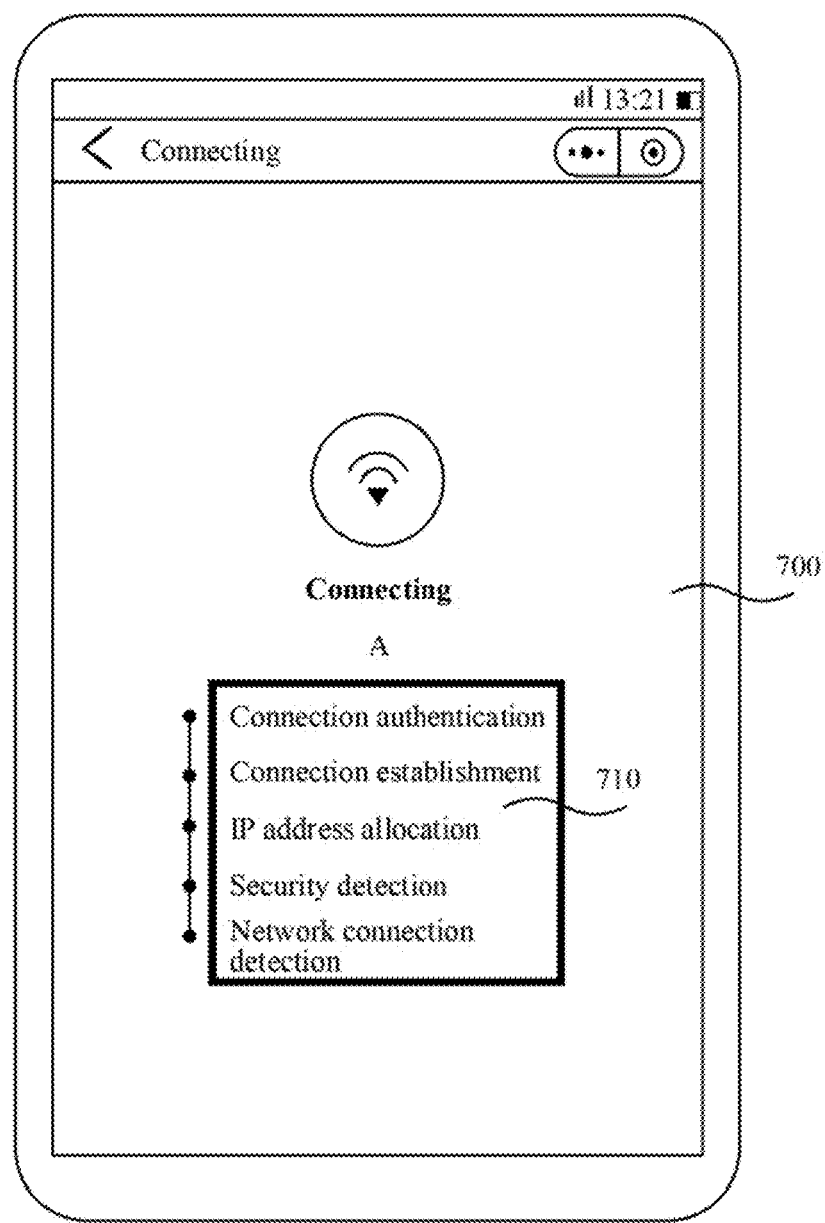
FIG. 7 is a schematic diagram of a wireless network connection interface according to an embodiment.

FIG. 7 is a schematic diagram of a wireless network connection interface according to an embodiment. Referring to FIG. 7, a wireless network connection interface 700 displays progress prompt information 710 of a wireless network connection process. For example, the progress prompt information 710 shown in FIG. 7 includes connection authentication, connection establishment, IP address allocation, security detection, and network connection detection.

Connection authentication is used for prompting the first authorization result verified by the server. If the first authorization result is "authorized", a connection authentication progress is completed, that is, the prompt text of the first authorization result is displayed on the wireless network connection interface 700. Otherwise, the connection authentication progress is not completed. Connection establishment is used for prompting that the guest terminal is establishing a connection to the wireless access point. If the guest terminal establishes a connection to the wireless access point, a connection establishment progress is completed. Otherwise, the connection establishment progress is not completed. IP address allocation is used for prompting that the wireless connection point is allocating an IP address to the guest terminal. If the wireless access point has allocated an IP address to the guest terminal, an IP address allocation progress is completed. Otherwise, the IP address allocation progress is not completed. Security detection and network connection detection are used for prompting that a connection environment and signal quality of the wireless network are being detected. If detection is completed, security detection and network connection detection progresses are completed. Otherwise, the security detection and network connection detection progresses are not completed.

In addition, a change for prompting progress completion on the wireless network connection interface 700 includes at least one of dots changing to "√", dots lightened one by one, and progress prompt information lightened one by one.

After receiving the first authorization result, the first application program displays the network connection result interface according to the first authorization result. The first authorization result includes "authorized" and "unauthorized".

Figure 8:
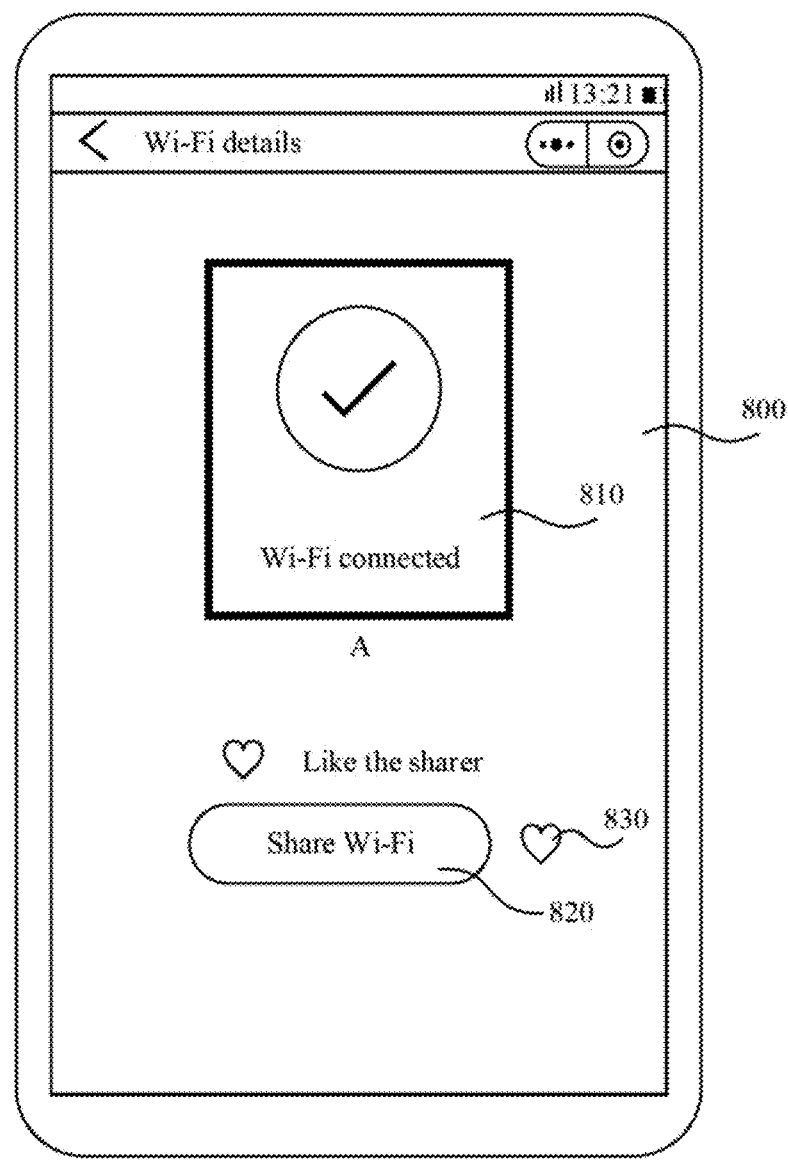
FIG. 8 is a schematic diagram of a network connection result interface according to an embodiment.

FIG. 8 is a schematic diagram of a network connection result interface according to an embodiment. In an embodiment, when the first authorization result is "authorized", as shown in FIG. 8, a connection result 810 of a wireless access point is displayed on a network connection result interface 800, and the connection result 810 is displayed in at least one manner of text display and icon display. For example, a text is displayed as "Wi-Fi connected", and an icon such as "√" may be displayed as shown in FIG. 8. However, text and icon are not limited thereto, and may include any other forms to indicate that the Wi-Fi connection is established successfully. The network connection result interface 800 further displays a share Wi-Fi control 820 and a like control 830. The share Wi-Fi control 820 is used by the guest terminal to share the wireless network with a third terminal other than the authorizer terminal and the guest terminal. The like control 830 is used by the guest terminal to like the authorizer terminal.

Figure 9:
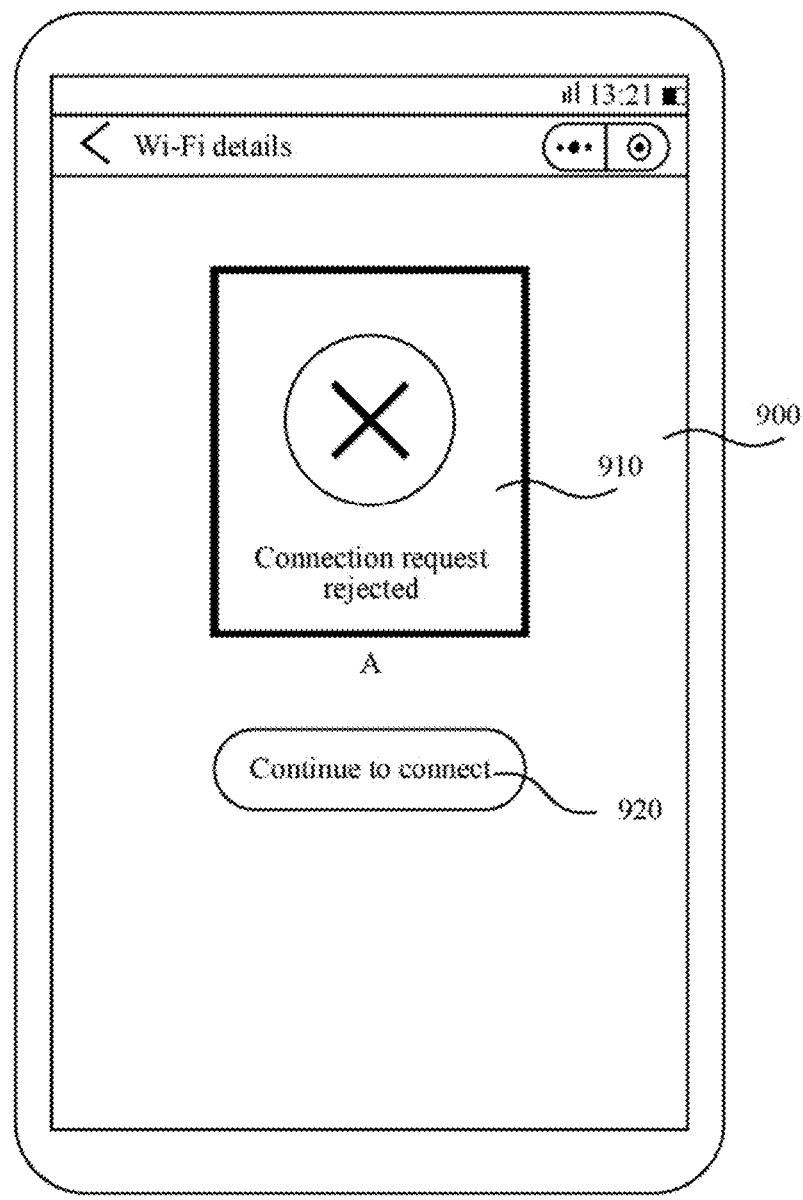
FIG. 9 is a schematic diagram of a network connection result interface according to another embodiment.

FIG. 9 is a schematic diagram of a network connection result interface according to another embodiment. In an embodiment, when the first authorization result is "unauthorized", as shown in FIG. 9, a connection result 910 of a wireless access point is displayed on a network connection result interface 900, and the connection result 910 is displayed in at least one manner of text display and icon display. For example, a text is displayed as "connection request rejected", and an icon is displayed as "x" in FIG. 9. Also, the network connection result interface 900 may further display a continue connection control 920. The continue connection control 920 is used by the guest terminal to continue to request authorization from the authorizer terminal to connect to the wireless access point.

In the embodiment shown in FIG. 5, the authorizer terminal runs a second application program. When the first authorization result is "unauthorized", the server transmits an authorization request to the authorizer terminal.

Figure 10:
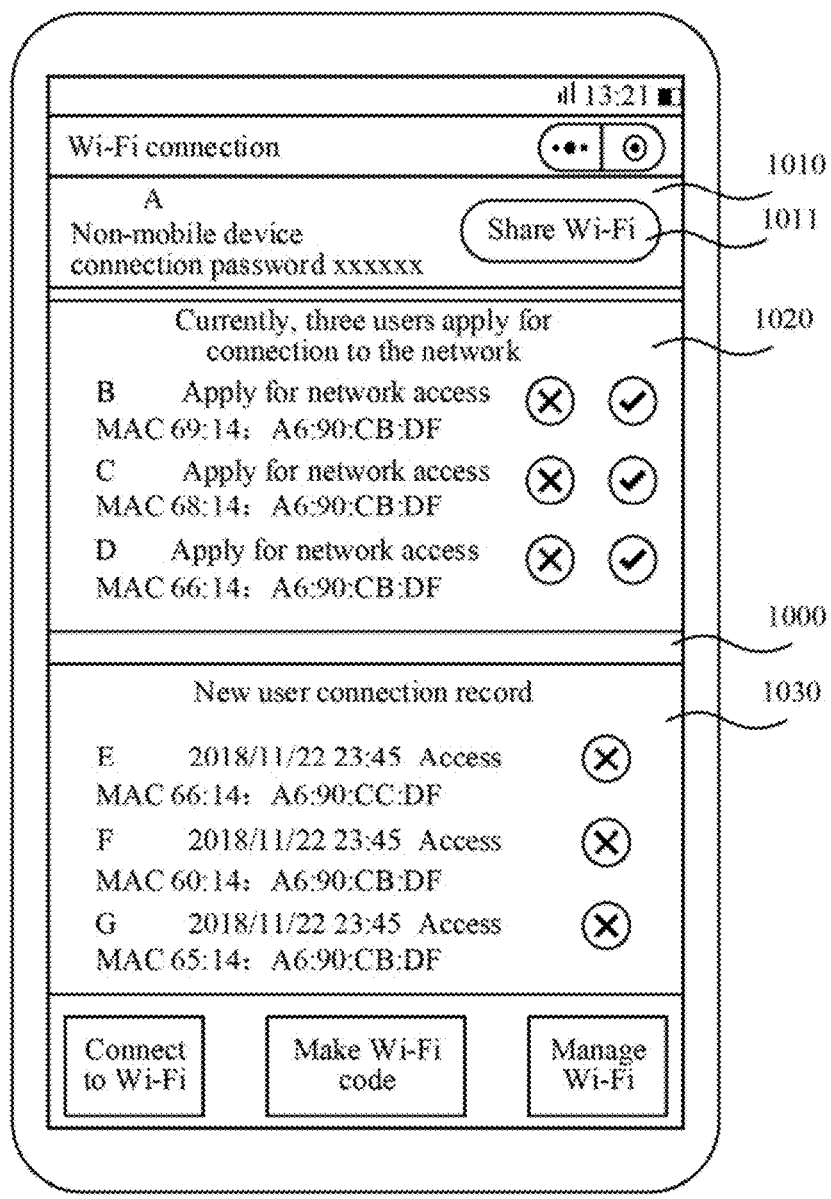
FIG. 10 is a schematic diagram of an authorization query interface according to an embodiment.

FIG. 10 is a schematic diagram of an authorization query interface according to an embodiment. As shown in FIG. 10, the authorizer terminal displays an authorization query interface 1000 according to the authorization request. The authorization query interface 1000 includes an information area 1010 of the authorizer terminal, a list 1020 of network connection applications of users, and a connection record list 1030 of new users.

The information area 1010 of the authorizer terminal displays a name of a wireless network corresponding to the authorizer terminal and a share Wi-Fi control 1011. The share Wi-Fi control 1011 is used for sharing a link to a wireless network with the guest terminal other than the authorizer terminal. In addition, the information area 1010 of the authorizer terminal further displays a connection password of the wireless network.

The list 1020 of network connection applications of users displays a name and a MAC address of a guest terminal that currently requests authorization from the authorizer terminal, and access authorized and unauthorized controls. For example, an agree to authorize control is "√", and a disagree to authorize control is "x" in FIG. 10. The connection record list 1030 of new users displays a name, a MAC address, and access time of an authorized guest terminal, and a control for rejecting continued access authorization. For example, the control for rejecting continued access authorization is "x" in FIG. 10.

Both the authorizer terminal and the guest terminal are installed with the same application program, and the application program includes a social application program, a dedicated application program that specially supports a sub-application program, a file management application program, an email application program, a game application program, or the like. The social application program includes an instant messaging application, an SNS application, a live application, or the like. Furthermore, when the same parent application program is installed on both the authorizer terminal and the guest terminal, the parent application program is a social application program and supports running of a sub-application program.

After the authorizer terminal authorizes the guest terminal that requests to access the wireless network, the authorizer terminal receives a first access notification transmitted by the server. The parent application program establishes an association relationship with the second application program, that is, the first access notification is not only displayed in the second application program, but also displayed in the parent application program. As shown in FIG. 10, the first access notification is displayed in the connection record list 1030 of new users in the second application program. Display manners of the first access notification in the parent application program include, but are not limited to the following manners.

Figure 11:
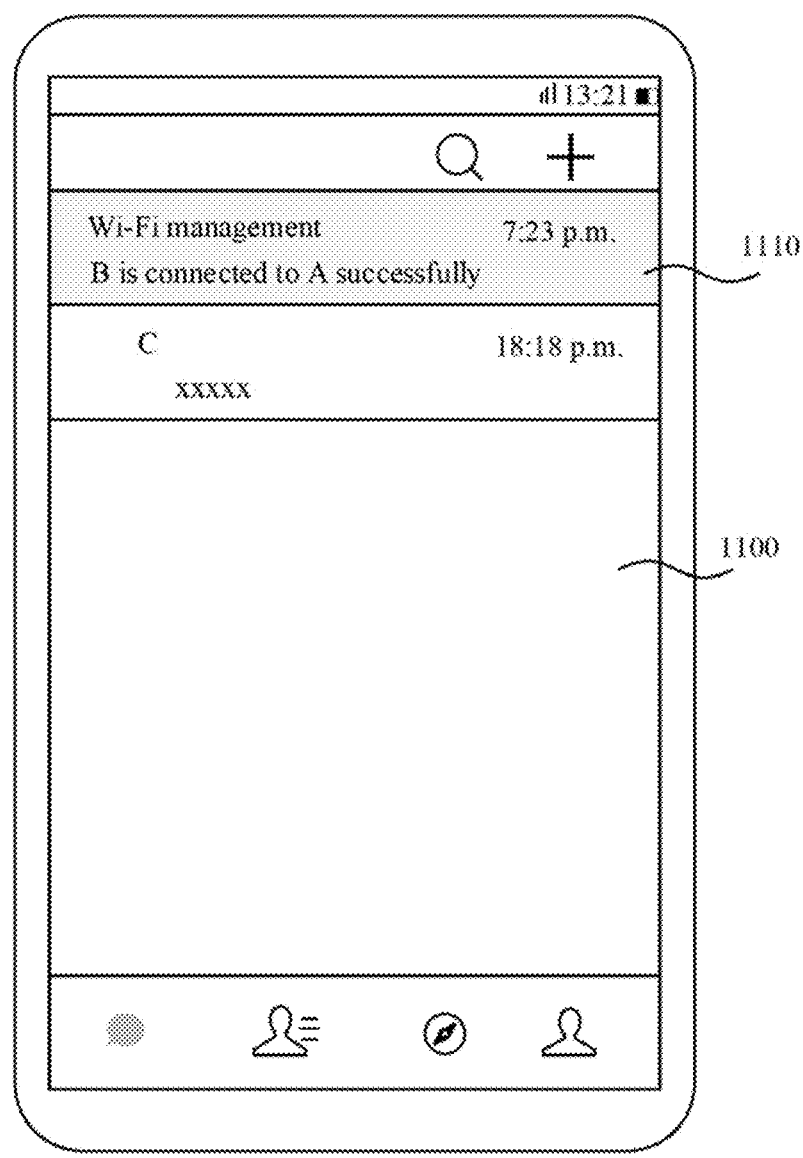
FIG. 11 is a schematic diagram of a communication service notification interface according to an embodiment.

FIG. 11 is a schematic diagram of a communication service notification interface according to an embodiment. In an embodiment, as shown in FIG. 11, the first access notification is displayed on a communication service notification interface 1100 of the parent application program of the authorizer terminal. The communication service notification interface 1100 is used for displaying a communication service notification list. The communication service notification interface 1100 displays a communication service notification bar 1110 corresponding to the second application program, the communication service notification bar 1100 corresponding to the second application program displays the first access notification, and a display manner of the first access notification in the communication service notification bar 1110 includes at least one of highlighting the communication service notification bar 1110 corresponding to the second application program and a text notification. For example, a text notification is "B successfully connects to A" in FIG. 11.

Figure 12:
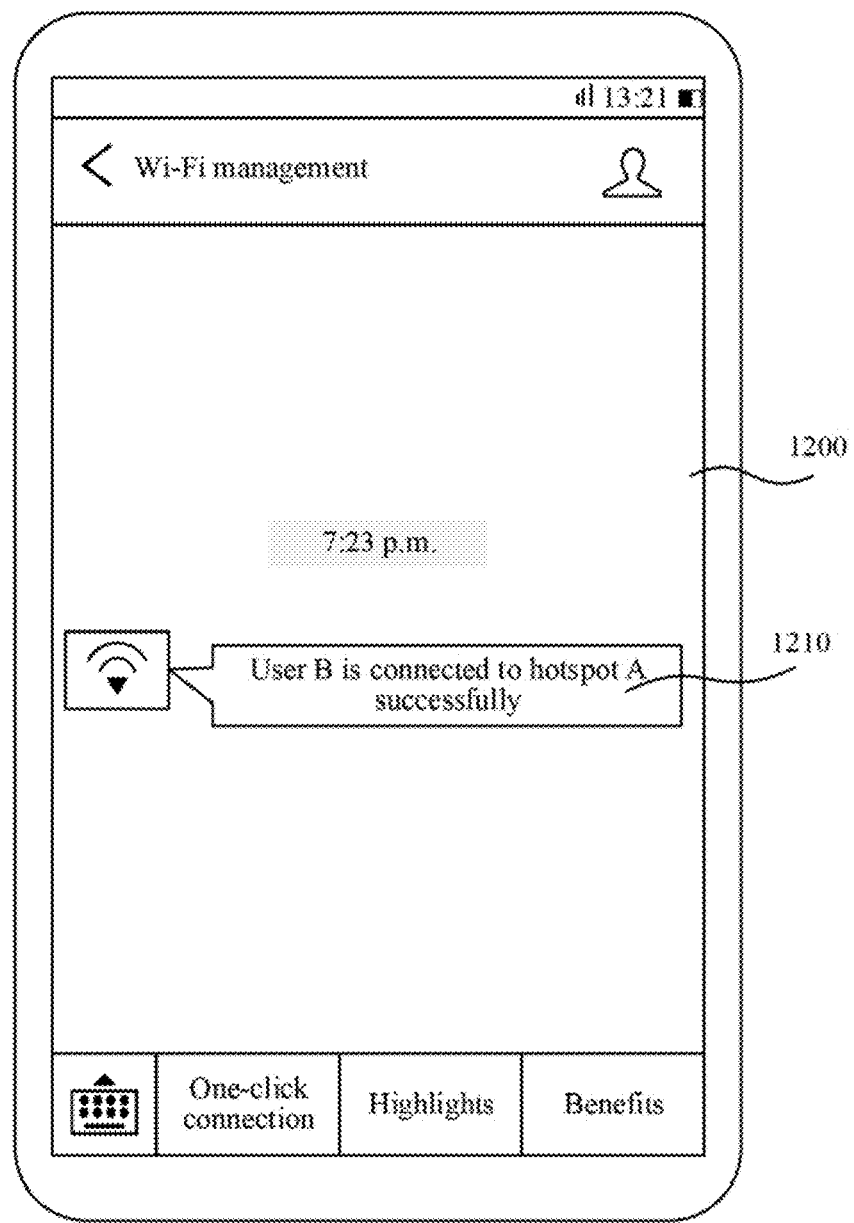
FIG. 12 is a schematic diagram of a setting interface according to an embodiment.

FIG. 12 is a schematic diagram of a setting interface according to an embodiment. In another embodiment, as shown in FIG. 12, the first access notification is displayed on a dialog interface 1200 of the parent application program of the authorizer terminal. The dialog interface 1200 is used for displaying a message transmitted by the second application program, and the message includes a push message, a notification message, and the like. The dialog interface 1200 displays a first access notification 1210. For example, the first access notification 1210 is "User B successfully connects to hotspot A" in FIG. 12.

The authorizer terminal shares the wireless network by using the share Wi-Fi control 1011 in FIG. 10.

Figure 13:
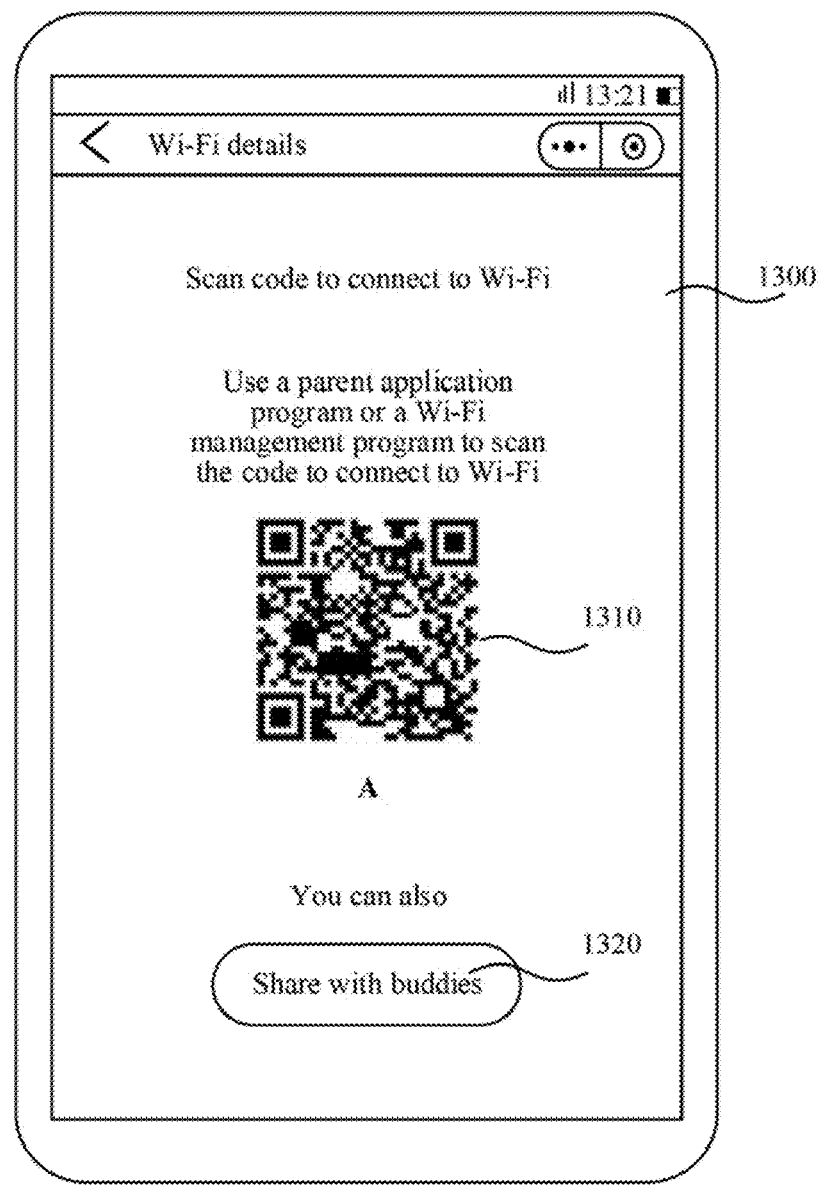
FIG. 13 is a schematic diagram of a first sharing interface according to an embodiment.

FIG. 13 is a schematic diagram of a first sharing interface according to an embodiment. In an embodiment, as shown in FIG. 13, after the share Wi-Fi control 1011 on the authorizer terminal is triggered, a first sharing interface 1300 is displayed. A sub-application program of the authorizer terminal displays a graphic code 1310, and the graphic code 1310 carries first identification information of the wireless access point and a shared key. For example, the graphic code 1310 may be a two-dimensional code (e.g., QR code or bar code). The guest terminal requests, from the authorizer terminal by scanning the two-dimensional code 1310 in the first sharing interface 1300, to access the wireless network. The first sharing interface 1300 further includes a share with buddy control 1320. A share with buddy control 1320 is used for sharing a link to the wireless network with the guest terminal other than the authorizer terminal.

The share with buddy control 1320 is used for sharing the link to the wireless network with a guest that has a buddy relationship with an authorizer, and the guest that has a buddy relationship with the authorizer is based on a buddy list in the parent application program of the authorizer terminal.

Figure 14:
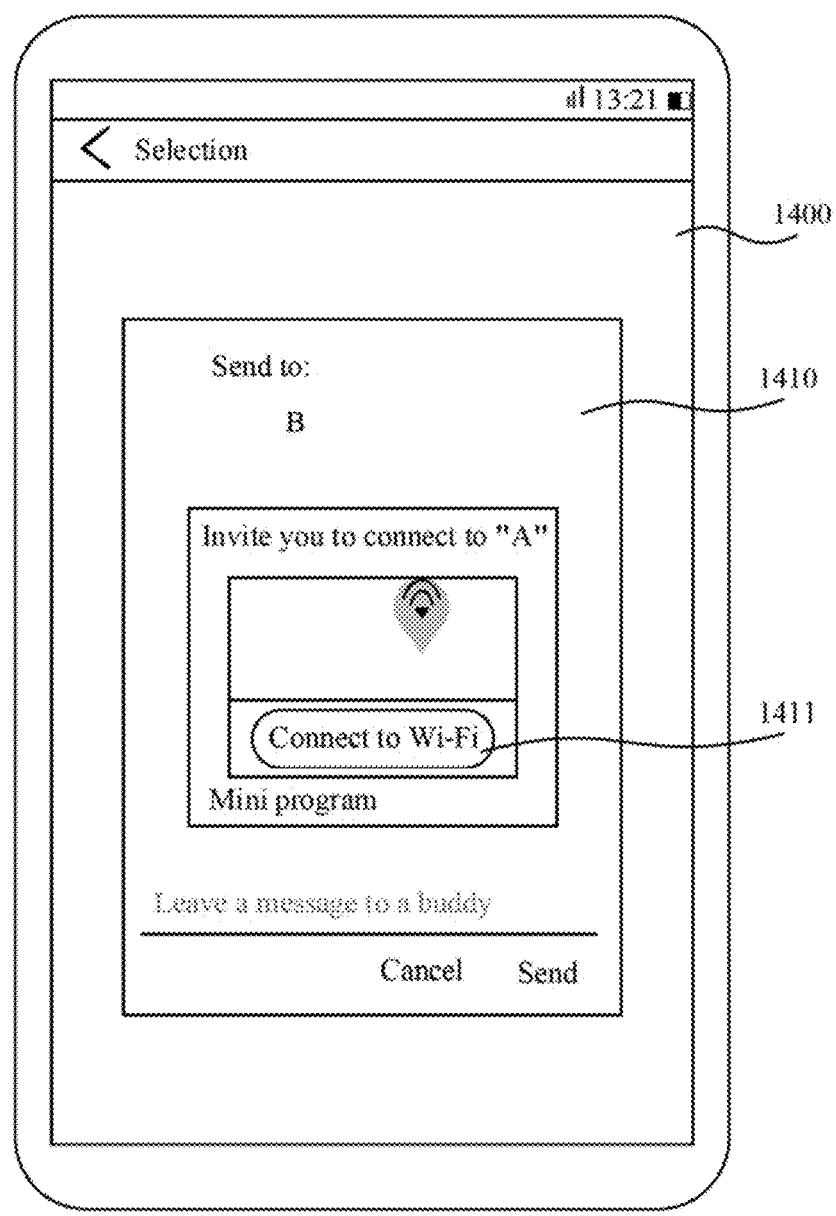
FIG. 14 is a schematic diagram of a second sharing interface according to an embodiment.

FIG. 14 is a schematic diagram of a second sharing interface according to an embodiment. In another embodiment, as shown in FIG. 14, after detecting that the share with buddy control 1320 is triggered, the authorizer terminal displays a second sharing interface 1400. The second sharing interface 1400 includes a card message 1410, the card message 1410 includes a connect to Wi-Fi control 1411. The connect to Wi-Fi control 1411 carries a link, and the link corresponds to the first identification information of the wireless access point and the shared key.

The authorizer terminal transmits the card message in FIG. 14 to a dialog interface corresponding to the guest terminal.

Figure 15:
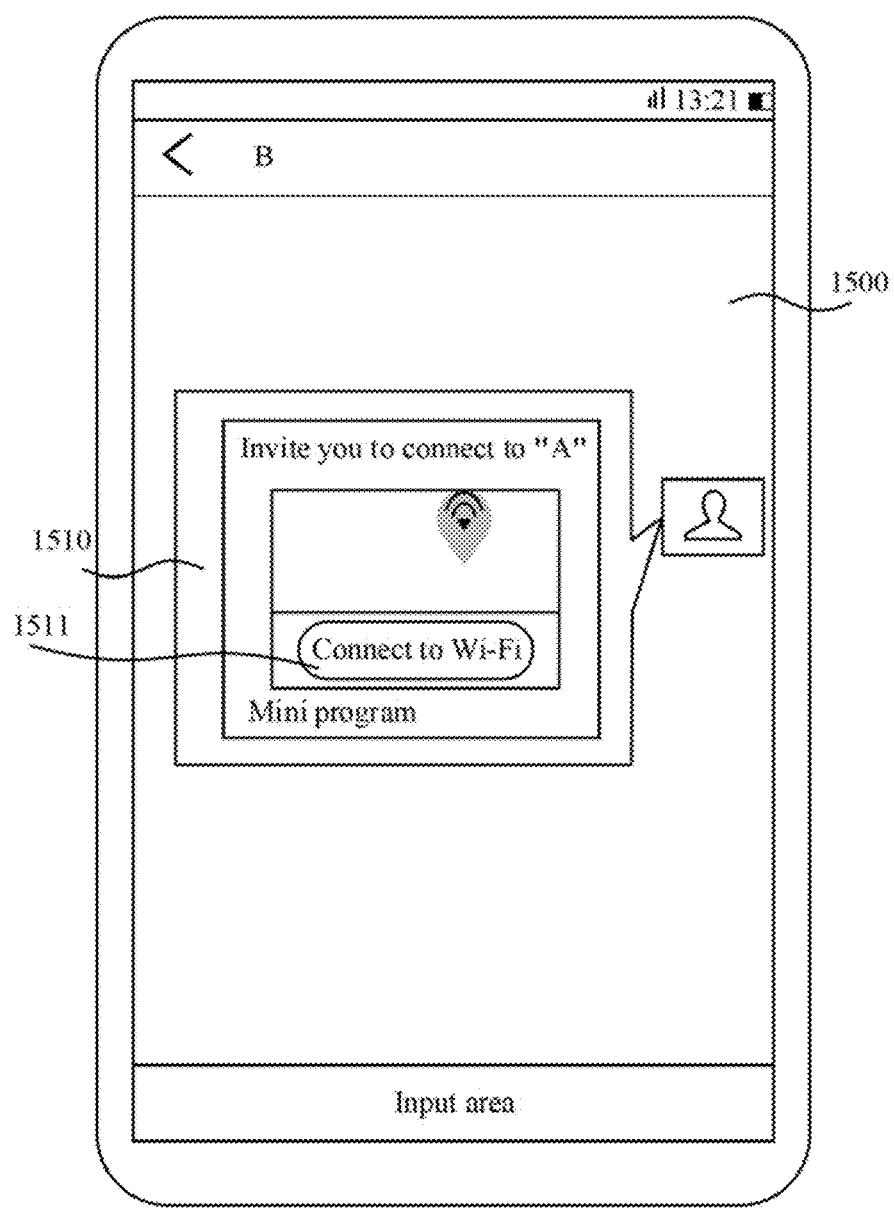
FIG. 15 is a schematic diagram of a dialog interface according to another embodiment.

FIG. 15 is a schematic diagram of a dialog interface according to another embodiment. As shown in FIG. 15, if authorizer A transmits a card message 1510 to guest B, and guest B is a buddy of the authorizer A in the parent application program, a dialog interface 1500 in the parent application program displays the card message 1510 transmitted by the authorizer terminal. The card message 1510 includes a connect to Wi-Fi control 1511, the connect to Wi-Fi control 1511 carries a link, and the link corresponds to the first identification information of the wireless access point and the shared key.

Figure 16:
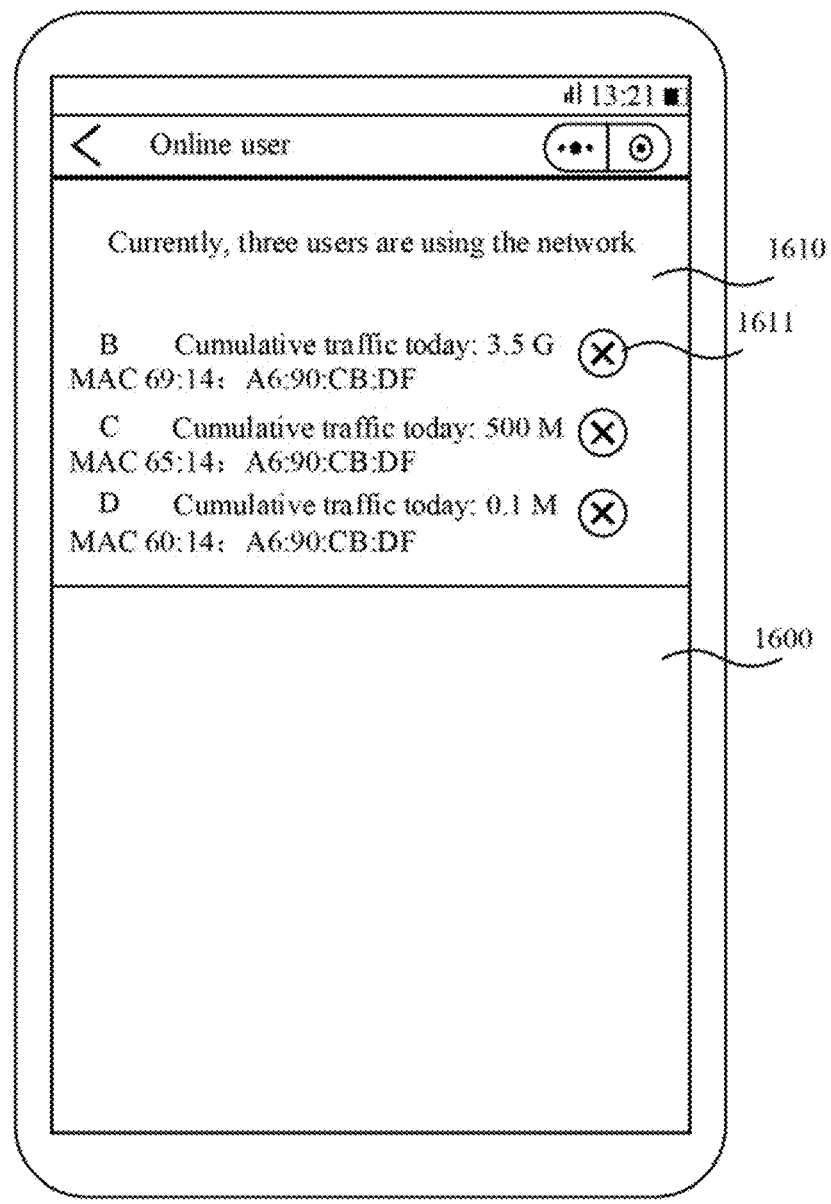
FIG. 16 is a schematic diagram of a first management interface according to an embodiment.

FIG. 16 is a schematic diagram of a first management interface according to an embodiment. As shown in FIG. 16, the second application program of the authorizer terminal further displays a first management interface 1600. The first management interface 1600 includes a usage list 1610 of authorized guests, and the usage list 1610 of authorized guests includes a name and a MAC address of an authorized guest, and traffic used by each authorized guest. In addition, the usage list 1610 of authorized guests further includes a first permission change control 1611. The first permission change control 1611 is used for changing an authorization permission of the authorized guest to "unauthorized". For example, the first permission change control 1611 is "x" in FIG. 16.

Moreover, the second application program of the authorizer terminal further displays a second management interface.

Figure 17:
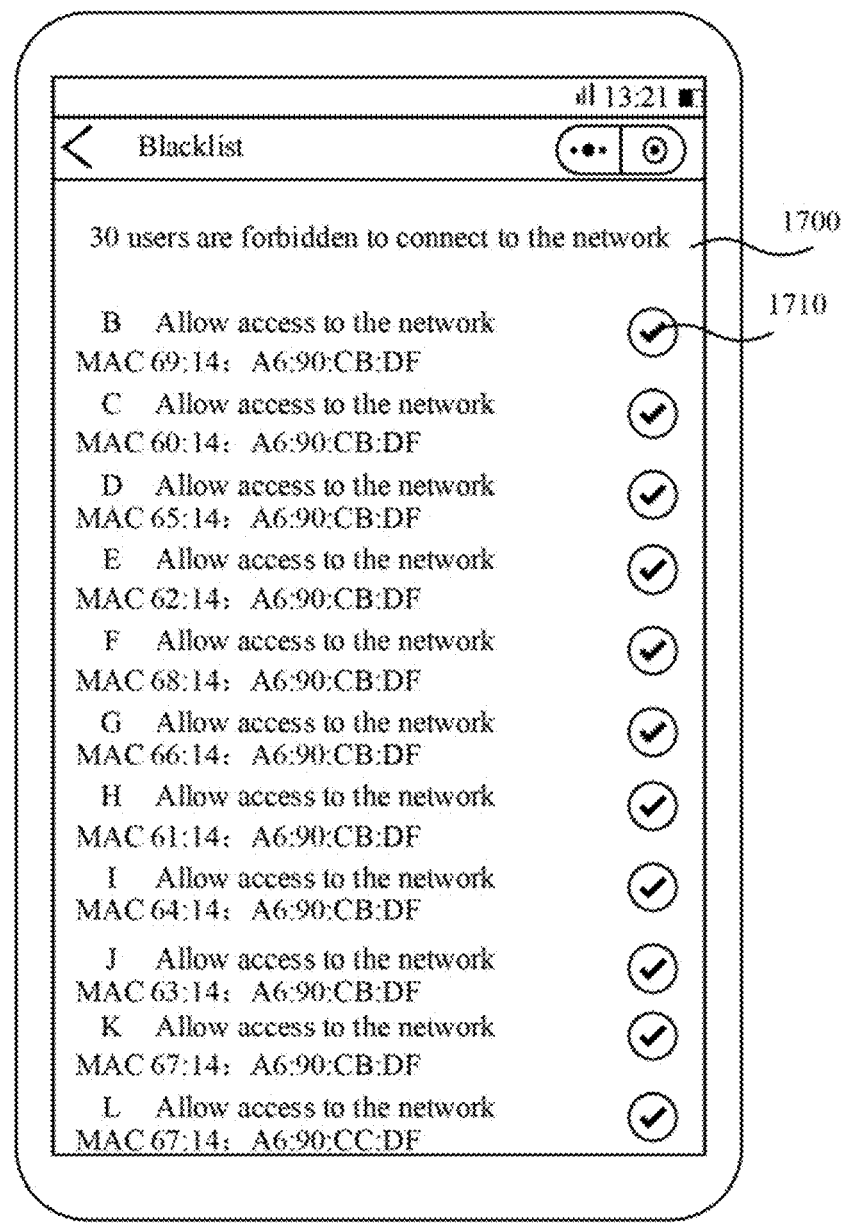
FIG. 17 is a schematic diagram of a second management interface according to an embodiment.

FIG. 17 is a schematic diagram of a second management interface according to an embodiment. As shown in FIG. 17, the second management interface includes a list 1700 of unauthorized guests, and the list 1700 of unauthorized guests includes a name and a MAC address of an unauthorized guest. In addition, the list 1700 of unauthorized guests further includes a second permission change control 1710, and the second permission change control 1710 is used for changing an authorization permission of the unauthorized guest to "authorized". For example, the second permission change control 1710 is displayed as "√".

Figure 18:
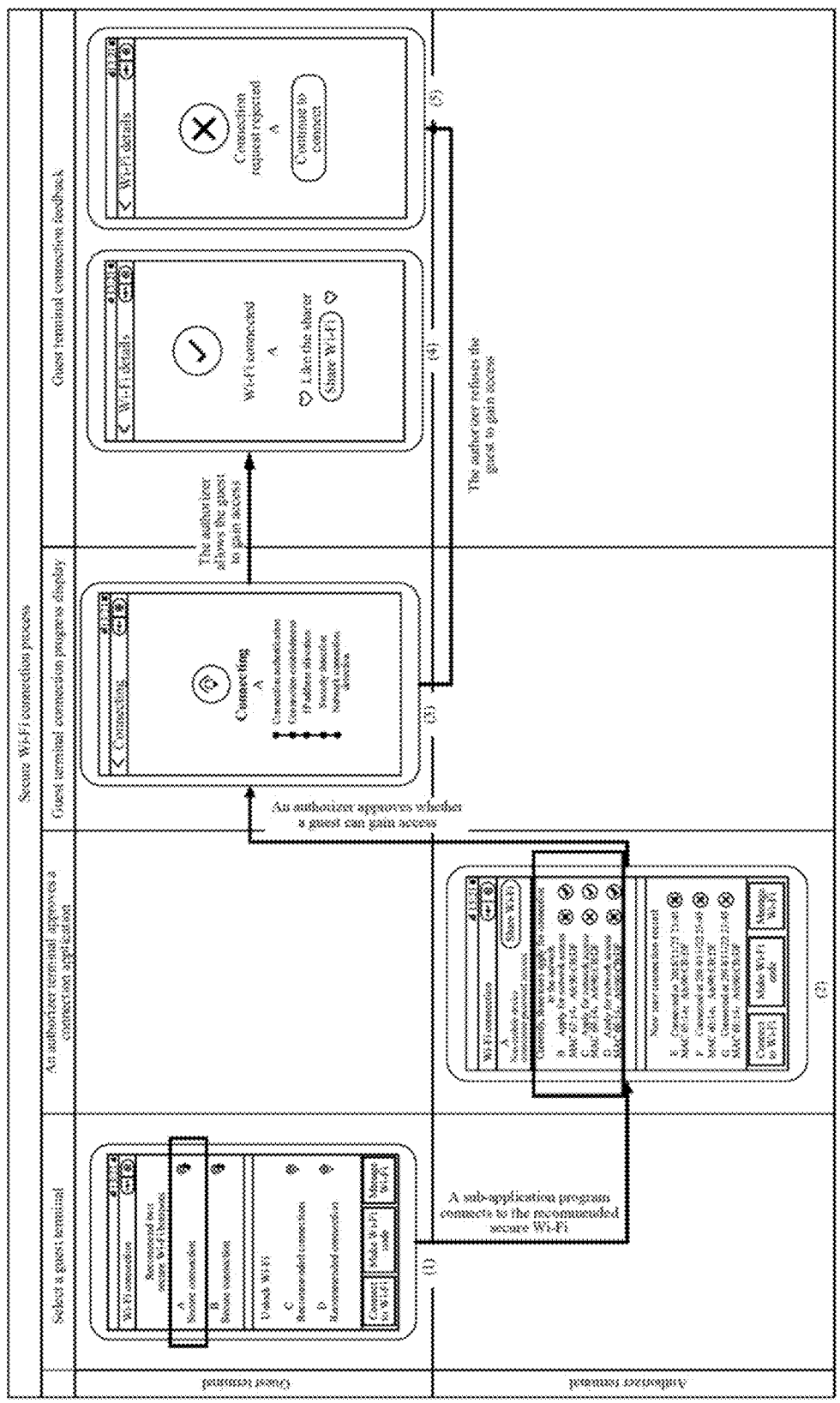
FIG. 18 is a flowchart of a secure Wi-Fi connection procedure between a guest terminal and an authorizer terminal according to an embodiment.

FIG. 18 is a flowchart of a secure Wi-Fi connection procedure between a guest terminal and an authorizer terminal according to an embodiment. The flowchart uses an example in which a first application program runs on the guest terminal, the first application program is a sub-application program, and a second application program runs on the authorizer terminal. When the same parent application program is installed on both the authorizer terminal and the guest terminal, the parent application program may be a social application program, and supports running of a sub-application program. The procedure is as follows:

(1) The guest terminal obtains identification information of at least one wireless access point around the guest terminal; and the first application program displays a wireless network access interface according to the obtained identification information, the wireless network access interface including a classified secure wireless network area and common wireless network area, the secure wireless network area being used for displaying first identification information and a first connection control, and the common wireless network area being used for displaying second identification information and a second connection control.

In FIG. 18, the wireless network access interface displays a secure Wi-Fi hotspot and a common Wi-Fi hotspot, a list in which the secure Wi-Fi hotspot is located is located above a list in which the common Wi-Fi hotspot is located, and a name of each Wi-Fi hotspot and a location of the name of the Wi-Fi hotspot are connection controls. The guest connects to a recommended secure Wi-Fi hotspot in the sub-application program, and the sub-application program requests, from the authorizer terminal by using a server, to access the recommended secure Wi-Fi hotspot.

(2) The second application program of the authorizer terminal displays a list of network connection applications of users, and the list of network connection applications of users displays a name and a MAC address of a guest terminal that requests authorization from the authorizer terminal. In addition, the list of network connection applications of users further includes an agree to authorize control and a disagree to authorize control. The authorizer terminal approves whether a guest can access the secure Wi-Fi hotspot by using the agree to authorize control and the disagree to authorize control.

(3) The first application program displays a wireless network connection interface in response to receiving a trigger signal for the first connection control, the wireless network connection interface being used for displaying progress prompt information of a wireless network connection process, and the wireless network connection process being an authentication process performed based on a user account and a MAC address of the guest terminal, and the first identification information.

In FIG. 18, when the sub-application program receives the trigger signal for the first connection control on the wireless network access interface, the sub-application program switches from the wireless network access interface to the wireless network connection interface, and the wireless network connection interface displays the progress prompt information of the wireless network connection process. The guest determines, according to the progress prompt information, the progress of connecting to the secure Wi-Fi hotspot by the guest terminal.

(4) and (5) are for displaying a network connection result interface after the wireless network connection process is completed, the network connection result interface being used for displaying a connection result of a wireless access point corresponding to the first identification information.

(4) When the authorizer allows the guest to gain access, that is, after the authorizer terminal authorizes the guest terminal, the first application program displays the network connection result interface, and the connection result of the wireless access point displayed on the network connection result interface is that Wi-Fi is connected.

(5) When the guest is refused by the authorizer to gain access, that is, after the authorizer terminal does not authorize the guest terminal, the first application program displays the network connection result interface, and the connection result of the wireless access point displayed on the network connection result interface is that a connection application is rejected.

Figure 19:
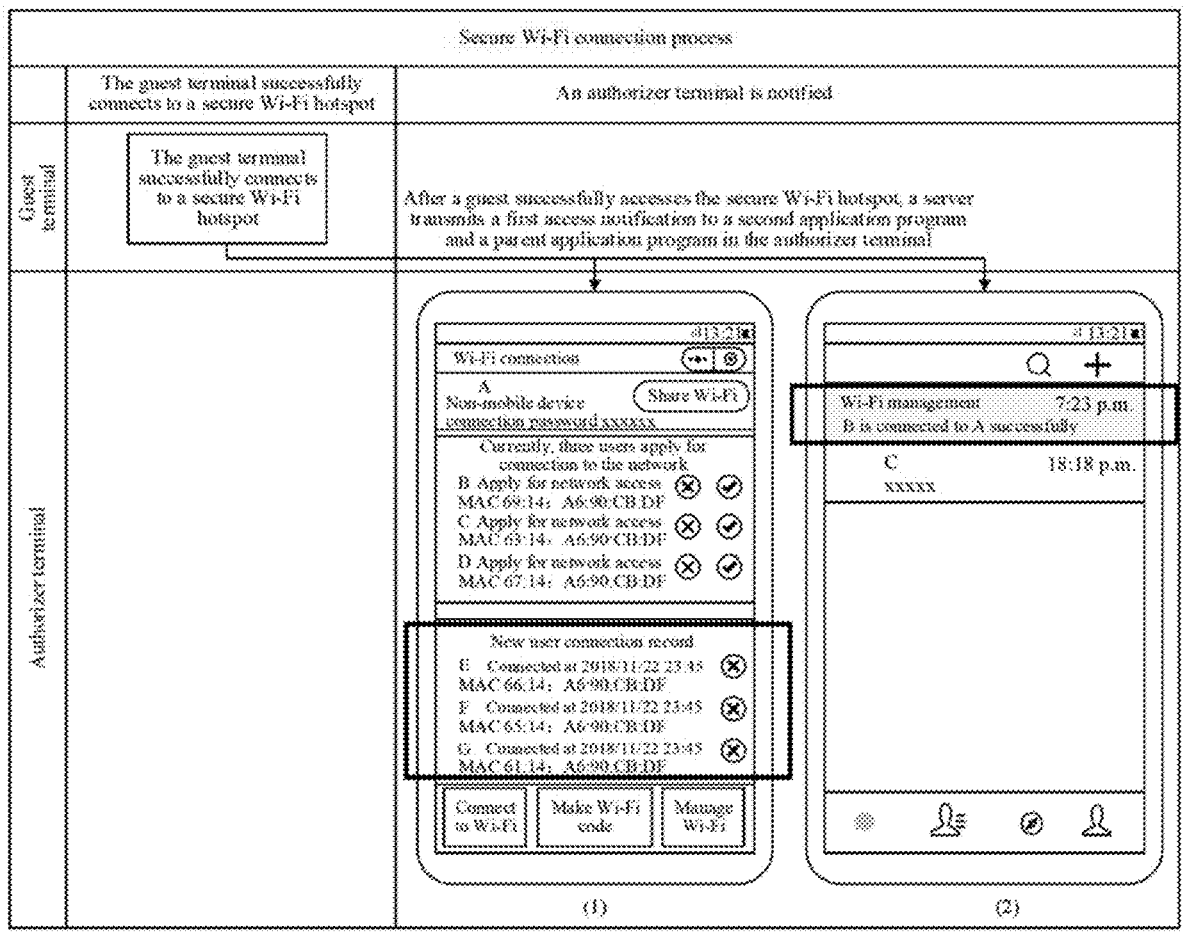
FIG. 19 is a flowchart of a secure Wi-Fi connection procedure between a guest terminal and an authorizer terminal according to another embodiment.

FIG. 19 is a flowchart of a secure Wi-Fi connection procedure between a guest terminal and an authorizer terminal according to another embodiment. The flowchart uses an example in which a first application program runs on the guest terminal, the first application program is a sub-application program, and a second application program runs on the authorizer terminal. When the same parent application program is installed on both the authorizer terminal and the guest terminal, the parent application program is a social application program, and supports running of a sub-application program. The procedure is as follows:

The guest terminal successfully connects to a secure Wi-Fi hotspot. After the guest terminal successfully connects to the secure Wi-Fi hotspot, a server transmits a first access notification to the second application program and the parent application program in the authorizer terminal.

(1) The second application program of the authorizer terminal displays an authorization query interface, and a connection record list of new users in the authorization query interface displays the first access notification, content of the first access notification including a name and a MAC address of an authorized guest terminal, an access authorized time, and a control for rejecting continued authorization.

(2) A communication service notification interface of the parent application program of the authorizer terminal displays the first access notification, the communication service notification interface displays a communication service notification bar corresponding to the second application program, the communication service notification bar corresponding to the second application program displays the first access notification, and a display manner of the first access notification in the communication service notification bar includes at least one of highlighting the communication service notification bar corresponding to the second application program and a text notification.

Figure 20:
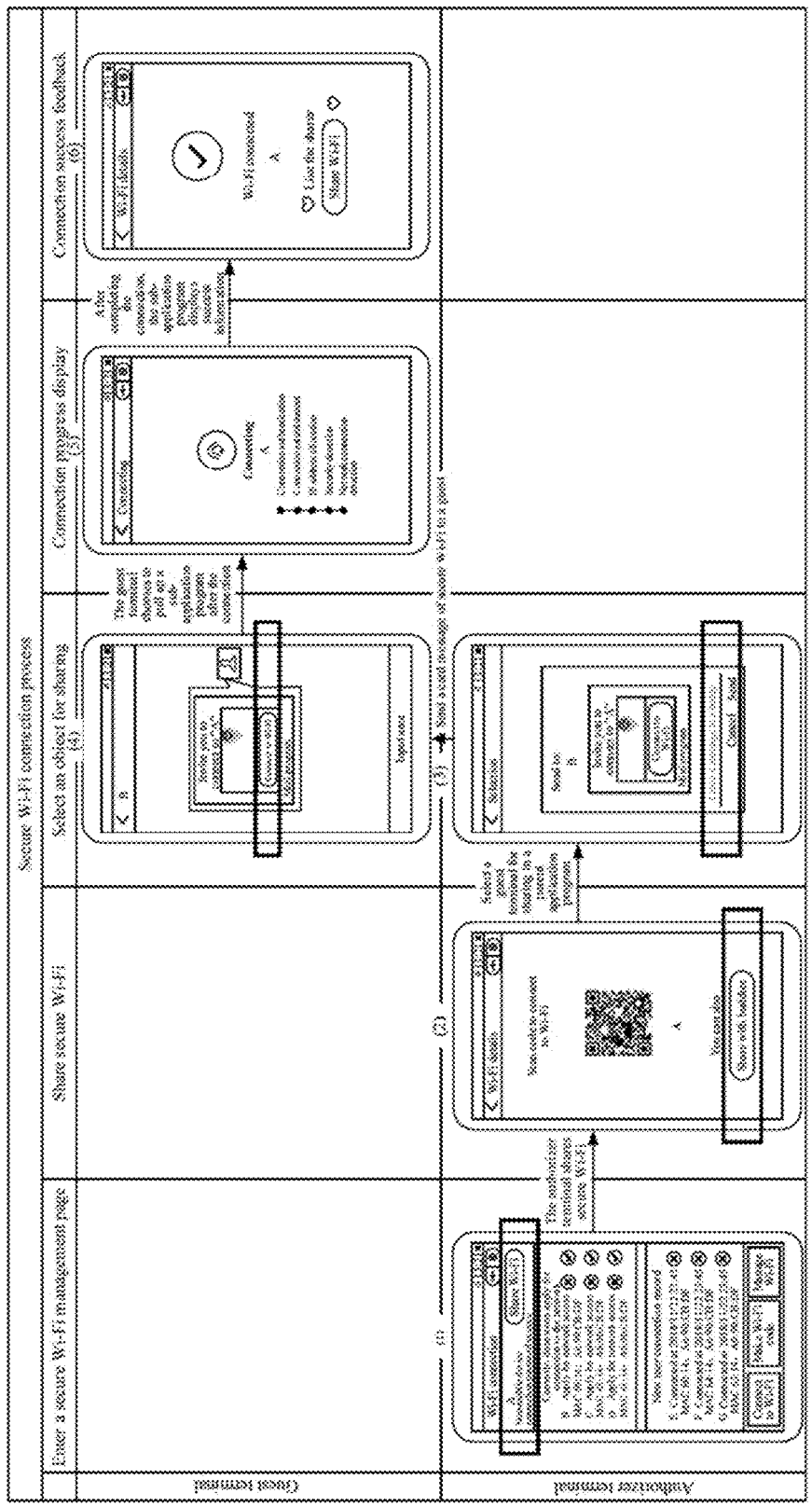
FIG. 20 is a flowchart of a secure Wi-Fi connection procedure between a guest terminal and an authorizer terminal according to another embodiment.

FIG. 20 is a flowchart of a secure Wi-Fi connection procedure between a guest terminal and an authorizer terminal according to another embodiment. The flowchart uses an example in which a first application program runs on the guest terminal, the first application program is a sub-application program, and a second application program runs on the authorizer terminal. When the same parent application program is installed on both the authorizer terminal and the guest terminal, the parent application program is a social application program, and supports running of a sub-application program. The procedure is as follows:

(1) The second application program of the authorizer terminal displays an authorization query interface, and the authorization query interface includes a share Wi-Fi control. The share Wi-Fi control is used for sharing a link to the wireless network with the guest terminal other than the authorizer terminal. The authorizer terminal shares a secure Wi-Fi hotspot by using the share Wi-Fi control.

(2) After receiving a trigger signal for the share Wi-Fi control, the authorizer terminal displays a first sharing interface, the first sharing interface displays a graphic code, and the graphic code carries first identification information of a wireless access point and a shared key. The first sharing interface further includes a share with buddy control, and the share with buddy control is used for sharing a link to the secure Wi-Fi hotspot with the guest terminal.

(3) The authorizer terminal displays a card message that carries the first identification information of the wireless access point and the shared key in a second sharing interface of the parent application program, and selects a guest terminal for sharing from the parent application program. The second sharing interface includes a card message, the card message includes a connect to Wi-Fi control, the connect to Wi-Fi control carries a link, and the link corresponds to the first identification information of the wireless access point and the shared key.

(4) The authorizer terminal transmits the card message of the secure Wi-Fi hotspot to the guest by using the parent application program. The card message is displayed in a dialog interface of the parent application program. The dialog interface displays the card message transmitted by the authorizer terminal. The card message includes the connect to Wi-Fi control, and the connect to Wi-Fi control carries the link. The link corresponds to the first identification information of the wireless access point and the shared key.

(5) After connecting to the Wi-Fi hotspot, the guest terminal may pull up the sub-application program. Here, the guest terminal may pull up the sub-application program according to an input by a user of the guest terminal or automatically by a predetermined configuration. The sub-application program displays a wireless network connection interface, and the wireless network connection interface displays progress prompt information of a wireless network connection process.

(6) Success information is displayed after the sub-application program completes the connection, that is, a network connection result interface is displayed after the sub-application program completes the connection, and success information is displayed on the network connection result interface. The success information includes that a connection result of the wireless access point is Wi-Fi connected.

There may be a usage time threshold on a secure Wi-Fi hotspot shared by the authorizer terminal. That is, starting from the time of access to the shared secure Wi-Fi hotspot by the guest terminal, an access to the secure Wi-Fi hotspot by the guest terminal for a specific time may not need authorization from the authorizer. When a connection time of the guest terminal reaches the usage time threshold, it is necessary to determine, according to an authorization permission of the guest terminal, whether the guest terminal can continue to connect to the secure Wi-Fi hotspot.

In addition, the usage time threshold may be set by the second application program itself, or may be set by the authorizer terminal by using the second application program.

Figure 21:
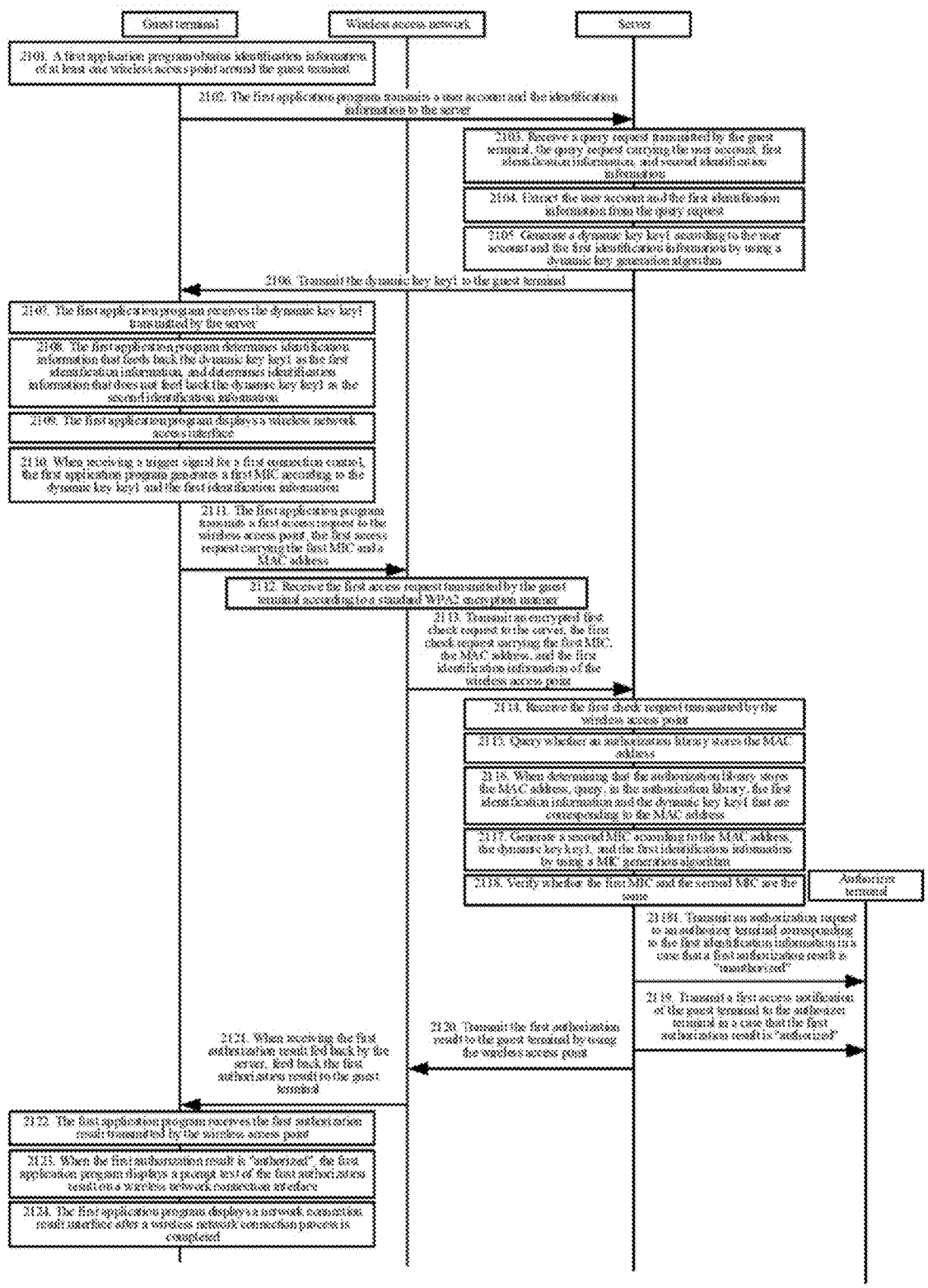
FIG. 21 is a flowchart of a wireless network access method according to another embodiment.

FIG. 21 is a flowchart of a wireless network access method according to another embodiment. The method may be applied to the implementation environment shown in FIG. 2 and/or FIG. 3. The method may alternatively be applied to the secure connection product architecture shown in FIG. 4. The method includes the following steps:

Step 2101: A first application program obtains identification information of at least one wireless access point around a guest terminal.

The first application program is an application program running on the guest terminal, and the first application program includes an application program used for connecting to a wireless network.

An operating system of the guest terminal includes a wireless network module. The wireless network module is configured to obtain a wireless network distributed around the guest terminal. That is, the wireless network module is configured to obtain identification information of a wireless access point corresponding to the wireless network. The wireless access point is a device that provides a wireless network service, and the identification information of the wireless access point includes an SSID and a BSSID. The first application program obtains the identification information of the wireless access point from the operating system of the guest terminal.

The first application program may further obtain a user account from the operating system of the guest terminal, the user account is an account that a guest uses to login to the first application program, and user accounts of guests are different.

Step 2102: The first application program transmits the user account and the identification information to a server.

The first application program transmits the obtained user account and identification information of the wireless access point to the server.

Here, the identification information of the wireless access point includes first identification information and second identification information. The first identification information includes an SSID and a BSSID, and the first identification information is identification information corresponding to a secure wireless network. The second identification information includes an SSID and a BSSID, and the second identification information is identification information corresponding to a common wireless network.

Step 2103: The server receives a query request transmitted by the guest terminal, the query request carrying the user account, the first identification information, and the second identification information.

The server receives the query request transmitted by the guest terminal, the query request carrying the user account, the first identification information, and the second identification information. The query request is used for requesting the server to generate a dynamic key key1 according to the user account and the first identification information.

Step 2104: The server extracts the user account and the first identification information from the query request.

The server extracts the user account and the SSID and the BSSID of the first identification information from the query request.

Step 2105: The server generates a dynamic key key1 according to the user account and the first identification information by using a dynamic key generation algorithm.

The server generates the dynamic key key1 according to the user account, the SSID, and the BSSID that are extracted from the query request and by using the dynamic key generation algorithm. Therefore, the dynamic key key1 is generated by the server according to the user account of the guest terminal, the SSID, and the BSSID.

Step 2106: The server transmits the dynamic key key1 to the guest terminal.

Step 2107: The first application program receives the dynamic key key1 transmitted by the server.

After receiving the dynamic key key1 transmitted by the server, the first application program fills a connection password field with the dynamic key key1. The connection password field is used for being filled with a password for connecting to the wireless network. A first access request includes the connection password field.

Step 2108: The first application program determines identification information that includes the dynamic key key1 as the first identification information, and determines identification information that does not include the dynamic key key1 as the second identification information.

Step 2109: The first application program displays a wireless network access interface.

The first application program displays the wireless network access interface according to the obtained first identification information and second identification information. The wireless network access interface includes a classified secure wireless network area and common wireless network area. The secure wireless network area displays the first identification information and a first connection control, and the common wireless network area displays the second identification information and a second connection control. The first connection control is a connection control used for triggering connection to the secure wireless network. The second connection control is a connection control used for triggering connection to the common wireless network.

The wireless network access interface displays names of several wireless access points obtained by the guest terminal, and each name and an area in which each name is located include a connection control of a wireless access point. A connection control is used for generating a trigger signal according to a location triggered by a guest on the wireless network access interface. Therefore, the first connection control is used for generating a trigger signal when the guest triggers the secure wireless network in the secure wireless network area, and the second connection control is used for generating a trigger signal when the guest triggers the common wireless network in the common wireless network area.

After receiving the dynamic key key1, the first application program displays the first identification information in the secure wireless network area of the wireless network access interface according to the dynamic key key1.

Step 2110: When receiving the trigger signal for the first connection control, the first application program generates a first MIC according to the dynamic key key1 and the first identification information.

When the guest triggers the first connection control, the first connection control generates a trigger signal. When receiving the trigger signal for the first connection control, the first application program determines, according to the trigger signal generated for the first connection control, that the guest chooses to connect to the secure wireless network, and the first application program fills, with the dynamic key key1, a connection password field corresponding to the wireless network selected for connecting. The first application program generates the first MIC according to the dynamic key key1 and the first identification information by using an MIC generation algorithm. The dynamic key key1 is used for filling the connection password field in the first access request. The first MIC is generated by the guest terminal according to the dynamic key key1 and the first identification information by using the MIC generation algorithm.

In addition, the first MIC is generated according to the dynamic key key1, the first identification information, and an authentication parameter by using the MIC generation algorithm. The authentication parameter is a random parameter obtained through message interaction between the guest terminal and the wireless access point.

Step 2111: The first application program transmits the first access request to the wireless access point, the first access request carrying the first MIC and a MAC address.

The first application program transmits the first access request to the wireless access point. The first access request includes a MAC packet, and the MAC packet includes a MAC header and a payload. The MAC header stores a real MAC address of the guest terminal, and the payload stores the first MIC generated by the guest terminal.

Figure 22:
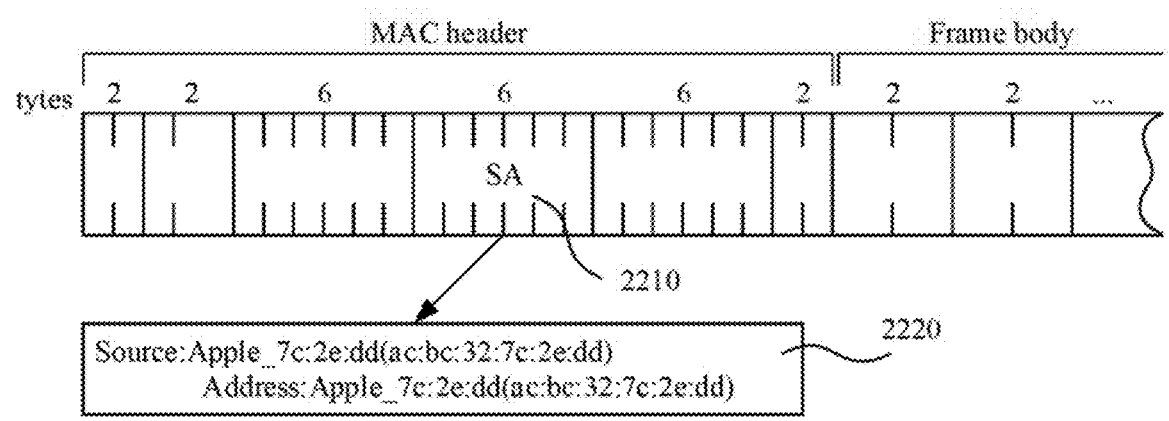
FIG. 22 is a schematic diagram of a media access control header according to an embodiment.

FIG. 22 is a schematic diagram of a media access control header according to an embodiment. As shown in FIG. 22, an SA location 2210 in a MAC header carries a real MAC address 2220 of the guest terminal. FIG. 22 shows a method for reading a MAC address of a guest terminal from a required field in a header of a standard 802.11 protocol. This can effectively avoid a problem of "using a forged MAC address in a hotspot scanning phase" of an iOS device and some versions of Android devices.

Here, the guest terminal encrypts the MAC packet in a standard WPA2 encryption manner, and transmits the encrypted MAC packet to the wireless access point.

Furthermore, the first access request carries the first MIC, the MAC address, and the authentication parameter.

Step 2112: The wireless access point receives the first access request transmitted by the guest terminal in the standard WPA2 encryption manner.

The wireless access point receives the first access request, and the first access request includes the MAC packet encrypted in the standard WPA2 encryption manner. The wireless access point extracts the MAC address of the guest terminal and the first MIC from the encrypted MAC packet, and the first MIC is generated by the guest terminal according to the dynamic key key1 and the first identification information.

The wireless access point generates a first check request according to the first MIC, the MAC address, and the first identification information of the wireless access point. The first identification information of the wireless access point includes the SSID, the BSSID, and an SN. Therefore, the wireless access point generates the first check request according to the first MIC, the MAC address, the SSID, the BSSID, and the SN.

Step 2113: The wireless access point transmits an encrypted first check request to the server, the first check request carrying the first MIC, the MAC address, and the first identification information of the wireless access point.

The first check request carries the first MIC, the MAC address, the SSID, the BSSID, and the SN.

The first check request includes a MAC packet, and the MAC packet includes a MAC header and a payload. The MAC header carries the real MAC address of the guest terminal, and the payload stores the first MIC generated by the guest terminal. The first check request further carries the SN, the SSID, and the BSSID.

The first check request carries the first MIC, the MAC address, the first identification information, and the authentication parameter.

Step 2114: The server receives the first check request transmitted by the wireless access point.

Step 2115: The server queries whether an authorization library stores the MAC address.

The server stores the authorization library, and the authorization library is used for storing information corresponding to a guest terminal authorized by an authorizer terminal. The information includes a MAC address of the authorized guest terminal, a dynamic key key1 corresponding to the guest terminal, and the first MIC.

The first check request carries a MAC packet, and the server extracts a MAC address from a header of the MAC packet. The server queries, according to the MAC address, whether the extracted MAC address is stored in the authorization library.

Step 2116: When determining whether the authorization library stores the MAC address, the server queries, in the authorization library, the first identification information and the dynamic key key1 that are corresponding to the MAC address.

When determining whether the authorization library stores the extracted MAC address, the server queries, in the authorization library, the SSID, the BSSID, and the dynamic key key1 that are corresponding to the MAC address.

Step 2117: The server generates a second MIC according to the MAC address, the dynamic key key1, and the first identification information by using the MIC generation algorithm.

The server generates the second MIC according to the MAC address, the dynamic key key1, the SSID, and the BSSID by using the MIC generation algorithm.

Step 2118: The server verifies whether the first MIC and the second MIC are the same.

The server verifies whether the first MIC and the second MIC are the same. If a verification result obtained after the verification is that they are the same, the server determines that the guest terminal corresponding to the MAC address is an authorized guest terminal. If the verification result obtained after the verification is that they are different, the server determines that the guest terminal corresponding to the MAC address is an unauthorized guest terminal.

Step 2119: The server transmits a first access notification of the guest terminal to an authorizer terminal when a first authorization result is "authorized".

The authorizer terminal runs a second application program and a parent application program. The second application program includes an application program used for authorizing a guest terminal that requests to access the wireless access point. The parent application program is the same social application program installed on both the authorizer terminal and the guest terminal, and the parent application program supports a sub-application program.

When the first authorization result is "authorized", the server transmits the first access notification to the second application program and the parent application program of the authorizer terminal.

Step 2120: The server transmits the first authorization result to the guest terminal by using the wireless access point.

The server transmits the first authorization result to the wireless access point, and the first authorization result is transmitted to the guest terminal by using the wireless access point.

Step 2121: Based on the first authorization result fed back by the server, the wireless access point transmits the first authorization result to the guest terminal.

Step 2122: The first application program receives the first authorization result transmitted by the wireless access point.

The first application program of the guest terminal determines, according to the received first authorization result, whether the authorizer terminal has authorized the guest terminal.

Step 2123: When the first authorization result is "authorized", the first application program displays a prompt text of the first authorization result on a wireless network connection interface.

The wireless network connection interface is used for displaying progress prompt information of a wireless network connection process, and the wireless network connection process is an authentication process performed based on the user account and the MAC address of the guest terminal, and the first identification information. The progress prompt information is used for prompting the progress of the wireless network connection process.

When the first authorization result is "authorized", the wireless network connection process of the first application program on the wireless network connection interface is displayed to be gradually completed, and the first application program displays the prompt text of the first authorization result on the wireless network connection interface. The prompt text is used for prompting that the guest terminal is authenticated by the authorizer terminal.

Step 2124: The first application program displays a network connection result interface after the wireless network connection process is completed.

The network connection result interface is used for displaying a connection result of the wireless access point corresponding to the first identification information.

The first application program displays the network connection result interface, and the network connection result interface is a user interface displayed according to a connection status of the guest terminal. The network connection result interface displays a connection result of the wireless access point. The connection result includes connection success and connection failure.

According to the methods provided in the one or more embodiments described above, the server authenticates, according to the user account and the MAC address of the guest terminal, and the first identification information of the wireless access point, the guest terminal that requests to access the wireless network. Even if information used by the guest terminal in the wireless network connection process is stolen or breached to a third party terminal, because user accounts and/or MAC addresses of different terminals are different, the third party terminal cannot pass authentication at the server when establishing a wireless network connection, thereby avoiding a risk that the wireless network is indirectly shared without authorization and improving the security of the wireless network.

According to this embodiment, the first access request is transmitted in the WPA2 encryption manner, and the first access request is transmitted between the guest terminal and the wireless access point in the WPA2 encryption manner, thereby ensuring privacy of the first access request and avoiding a risk that the real MAC address of the guest terminal is intercepted by a third party due to the first access request.

According to this embodiment, the server queries, according to a received MAC address, whether the MAC address exists in the authorization library. If the MAC address is stored in the authorization library, the server queries first identification information and a dynamic key key1 that are corresponding to the MAC address according to the MAC address, and generates a second MIC according to the MAC address, the dynamic key key1, and the first identification information, so as to verify whether the first MIC matches the second MIC. If the first MIC matches the second MIC, the server determines that the guest terminal is an authorized guest terminal; otherwise, the server determines that the guest terminal is an unauthorized guest terminal. Whether the first MIC matches the second MIC is verified, so that the server does not need to perform a reverse operation on the first MIC, that is, accuracy of an authentication result is ensured, and a calculation amount during authentication is reduced.

Figure 23:
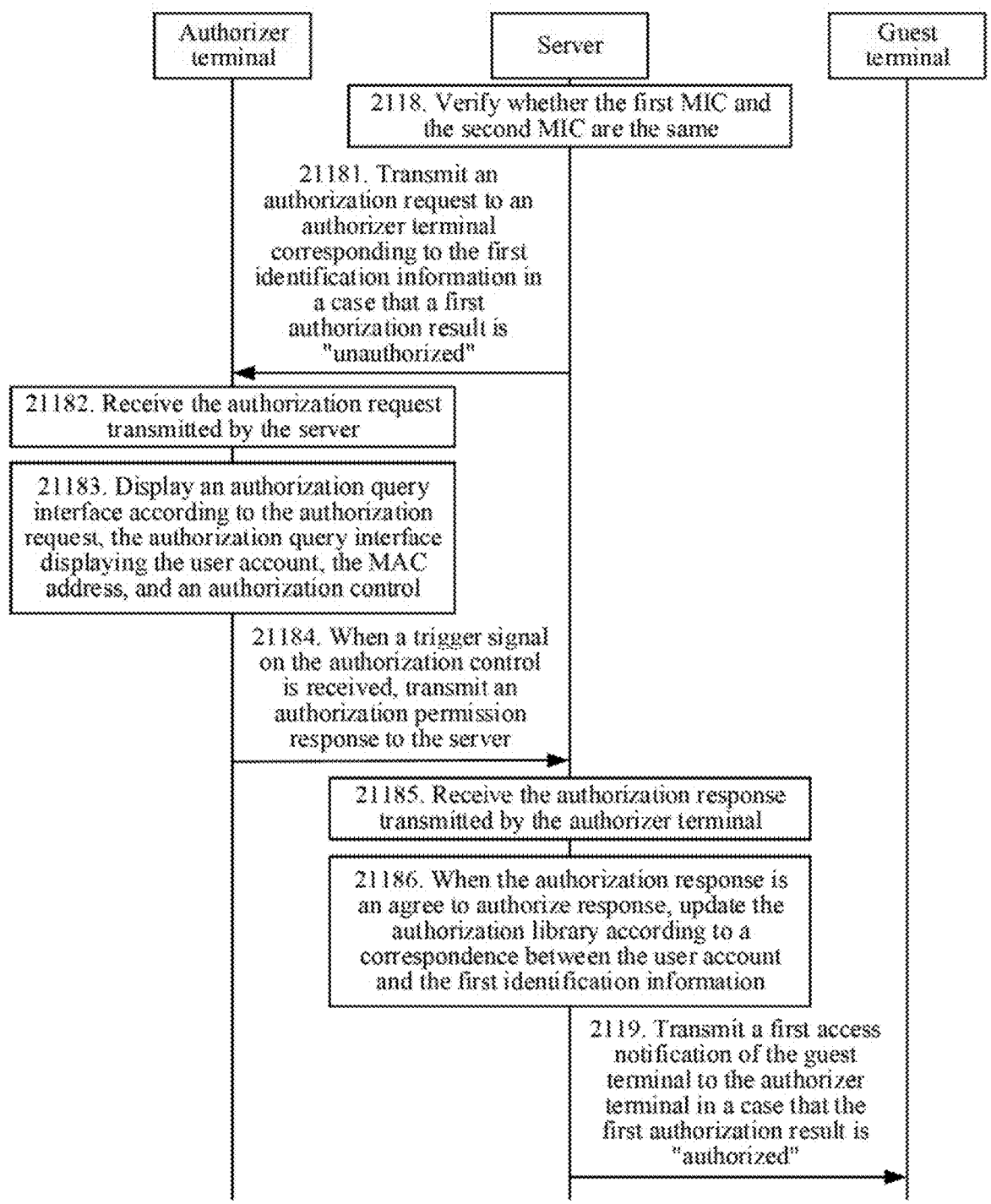
FIG. 23 is a flowchart of a method for querying, by a server, an authorizer terminal according to an embodiment.

In the embodiment provided in FIG. 21, after step 2118, the server may verify whether the first MIC and the second MIC are the same. When the server verifies that the two MICs are different, that is, the first authorization result is "unauthorized", the server queries the authorizer terminal whether to provide authorization. FIG. 23 is a flowchart of a method for querying, by a server, an authorizer terminal according to an embodiment. The method may be applied to the implementation environment shown in FIG. 2 and/or FIG. 3. The method may alternatively be applied to the secure connection product architecture shown in FIG. 4. The method includes the following steps:

Step 21181: The server transmits an authorization request to an authorizer terminal corresponding to the first identification information when the first authorization result is "unauthorized".

The server queries the authorization library according to the MAC address. If the MAC address is not found or the MAC address is found, but the first MIC and the second MIC are different, the first authorization result outputted by the server is "unauthorized". The server transmits the authorization request to the authorizer terminal corresponding to the first identification information of the wireless access point, and requests the authorizer terminal to authorize the unauthorized guest terminal.

The authorization request is used by the server to request the authorizer terminal to authorize the unauthorized guest terminal, that is, the server requests, according to the authorization request, the authorizer terminal to allow the unauthorized guest terminal to access the wireless network.

Step 21182: The authorizer terminal receives the authorization request transmitted by the server.

The authorization request is a request for authorization transmitted by the server to the authorizer terminal according to a guest terminal that is not in the authorization library. The authorization request carries the user account of the guest terminal.

Step 21183: The authorizer terminal displays an authorization query interface according to the authorization request, the authorization query interface displaying the user account, the MAC address, and an authorization control.

The authorizer terminal extracts the user account of the guest terminal from the authorization request, and displays the authorization query interface according to the authorization request. The authorization query interface displays the user account of the guest terminal. The authorization query interface also displays the MAC address of the guest terminal requesting authorization, and the authorization control. The authorization control includes an agree to authorize control and a disagree to authorize control. A schematic diagram of the authorization query interface is shown in FIG. 10, and details are not described herein again.

Step 21184: When a trigger signal on the authorization control is received, the authorizer terminal transmits an agree to authorize response to the server.

When a trigger signal on the disagree to authorize control is received, an authorization response transmitted by the authorizer terminal to the server is a disagree to authorize response, and the authorizer terminal does not allow the guest terminal to access the wireless network.

When a trigger signal on the agree to authorize control is received, an authorization response transmitted by the authorizer terminal to the server is an agree to authorize response, and the authorizer terminal allows the guest terminal to access the wireless network.

Step 21185: The server receives the authorization response transmitted by the authorizer terminal.

The authorization response includes the disagree to authorize response and the agree to authorize response. The disagree to authorize response is an authorization response transmitted by the authorizer terminal to the server according to a received trigger signal on the disagree to authorize control. The agree to authorize response is an authorization response transmitted by the authorizer terminal to the server according to a received trigger signal on the agree to authorize control.

Step 21186: When the authorization response is an agree to authorize response, the server updates the authorization library according to a correspondence between the user account and the first identification information.

The server stores the authorization library, and the authorization library is used for storing information corresponding to a guest terminal authorized by the authorizer terminal. The information includes a MAC address of the authorized guest terminal, a dynamic key key1 corresponding to the guest terminal, and the first MIC.

When the received authorization response is an agree to authorize response, the server updates the authorization library according to the correspondence between the user account and the first identification information, and transmits an authorized notification to the guest terminal.

The agree to authorize response is used for triggering the server to update the authorization library according to the correspondence between the user account and the first identification information.

According to this embodiment by transmitting the authorization request to the authorizer terminal, the server requests authorization for the unauthorized guest terminal, and by using the authorization response fed back by the authorizer terminal, the server determines whether the authorizer terminal has authorized the unauthorized guest terminal, so as to determine whether to update the authorization library. By using the authorizer terminal, selectivity of the guest terminal accessing the wireless network is implemented, security of the guest terminal accessing the wireless network is ensured, and security of information of the authorizer terminal is avoided.

Figure 24:
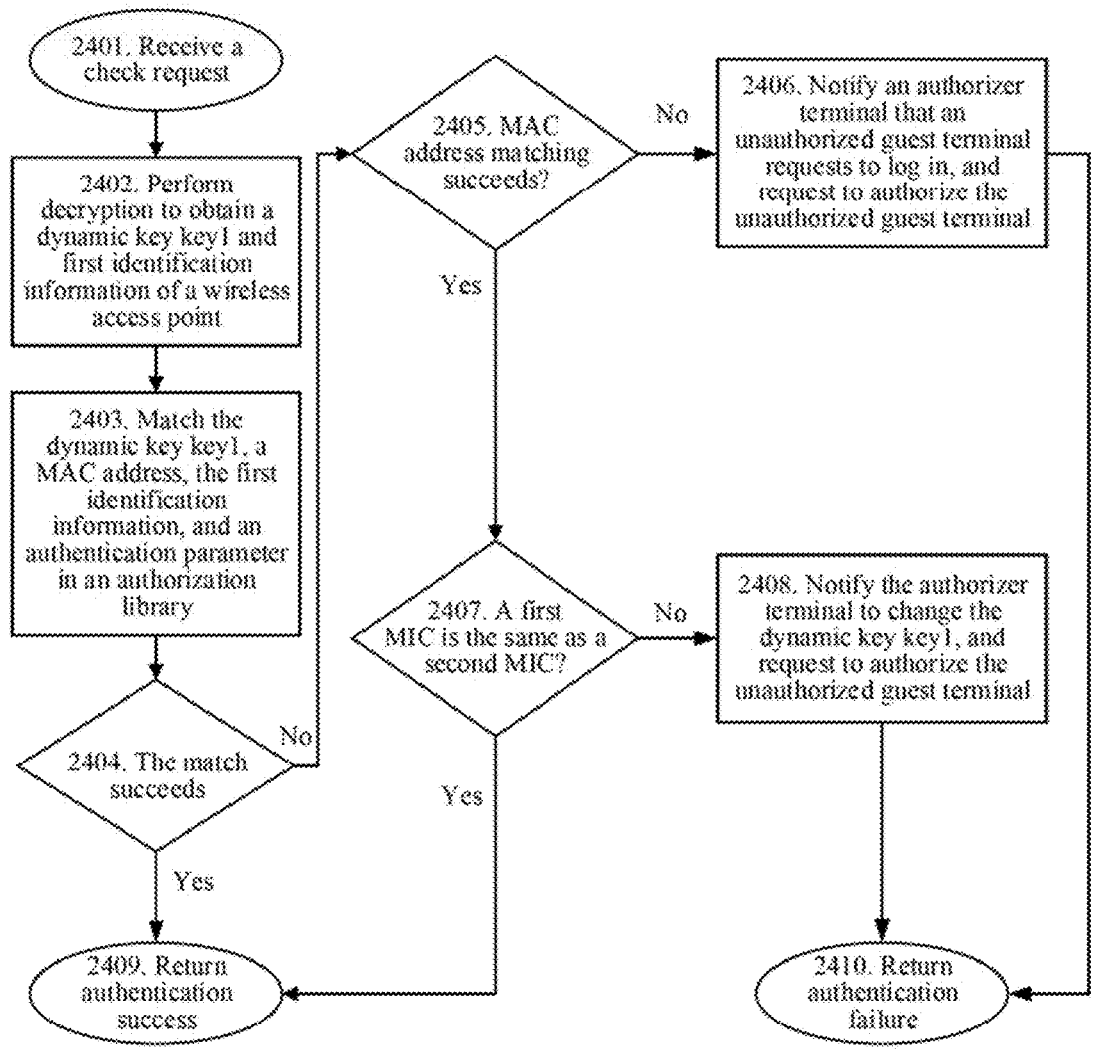
FIG. 24 is a flowchart of a method for verifying a first message integrity code and a second message integrity code by a server according to an embodiment.

In the embodiments provided in FIG. 21 and FIG. 23, a method for verifying a first MIC and a second MIC by a server is shown in FIG. 24. The method includes the following steps:

Step 2401: Receive a check request.

The server receives a first check request transmitted by a wireless access point. The first check request carries a MAC address of a guest terminal, the first MIC, and first identification information of the wireless access point, and the first identification information of the wireless access point includes an SN, an SSID, and a BSSID.

The first check request further includes an authentication parameter, and the authentication parameter is a random parameter generated when the guest terminal and the wireless access point perform transmission in a standard WPA2 encryption manner.

Step 2402: Perform decryption to obtain a dynamic key key1 and the first identification information of the wireless access point.

The server decrypts the first check request to obtain the MAC address, the first MIC, and the first identification information of the wireless access point in the first check request. The server further obtains the dynamic key key1 of the guest terminal according to the first check request.

Step 2403: Match the dynamic key key1, the MAC address, the first identification information, and the authentication parameter in an authorization library.

The server matches the dynamic key key1, the MAC address, the first identification information, and the authentication parameter in the authorization library according to the MAC address carried in the first check request.

Step 2404: Determine whether the match is successful.

If the server successfully matches the dynamic key key1, the MAC address, the first identification information, and the authentication parameter in the authorization library (Step 2404: Yes), the server performs step 2409. If the server fails to match the dynamic key key1, the MAC address, the first identification information, and the authentication parameter in the authorization library (Step 2404: No), the server performs step 2405.

Step 2405: Determine whether MAC address matching is successful.

The server matches the MAC address in the first check request with a MAC address stored in the authorization library. If the MAC address in the first check request successfully matches the MAC address stored in the authorization library (Step 2405: Yes), the server performs step 2407. If the MAC address in the first check request fails to match the MAC address stored in the authorization library (Step 2405: No), the server indicates that the guest terminal is an unauthorized guest terminal and then performs step 2406.

Step 2406: Notify an authorizer terminal that an unauthorized guest terminal requests to log in, and request to authorize the unauthorized guest terminal.

When the MAC address in the first check request does not match the MAC address stored in the authorization library, the server transmits an authorization request to the authorizer terminal to request the authorizer terminal to authorize the unauthorized guest terminal.

The authorization request is used for notify the authorizer terminal that the unauthorized guest terminal requests to log in, and requesting to authorize the unauthorized guest terminal.

Step 2407: Determine whether the first MIC is the same as the second MIC.

When the MAC address in the first check request matches the MAC address stored in the authorization library (Step 2405: Yes), the server queries, according to the MAC address stored in the authorization library, the dynamic key key1 corresponding to the MAC address, the first identification information of the wireless access point, and the authentication parameter, and generates the second MIC according to a MIC generation algorithm.

The server verifies whether the first MIC and the second MIC are the same (Step 2407). If the first MIC and the second MIC are the same (Step 2407: Yes), the server performs step 2409. If the first MIC is different from the second MIC (Step 2407: No), the server indicates that the dynamic key key1 of the guest terminal is changed; and then performs step 2408.

The server sets default processing for matching failure. For a guest terminal that fails in matching, an authorizer makes adjustment appropriately according to a security requirement and a hotspot user. For example, when a Wi-Fi hotspot is a Wi-Fi hotspot in which a free Internet access service is provided in a public place, for a guest terminal that fails in matching, the server sets by default that authentication success is to be returned and the guest terminal is allowed to connect to the hotspot, but records a matching failure record for subsequent audit queries.

Step 2408: Notify the authorizer terminal to change the dynamic key key1, and request to authorize the unauthorized guest terminal.

When the first MIC is different from the second MIC, the server notifies the authorizer terminal to change the dynamic key key1, and requests to authorize the unauthorized guest terminal.

Step 2409: Return an authentication success message.

When the matching succeeds, the server returns authentication success to the guest terminal, that is, a returned first authorization result is "authorized".

Step 2410: Return an authentication failure message.

When the matching fails, the server returns authentication failure to the guest terminal, that is, the returned first authorization result is "unauthorized".

In the embodiment provided in FIG. 21, the wireless access point needs to first register with the server, and the registered wireless access point is a wireless access point that supports a secure connection technology.

Figure 25:
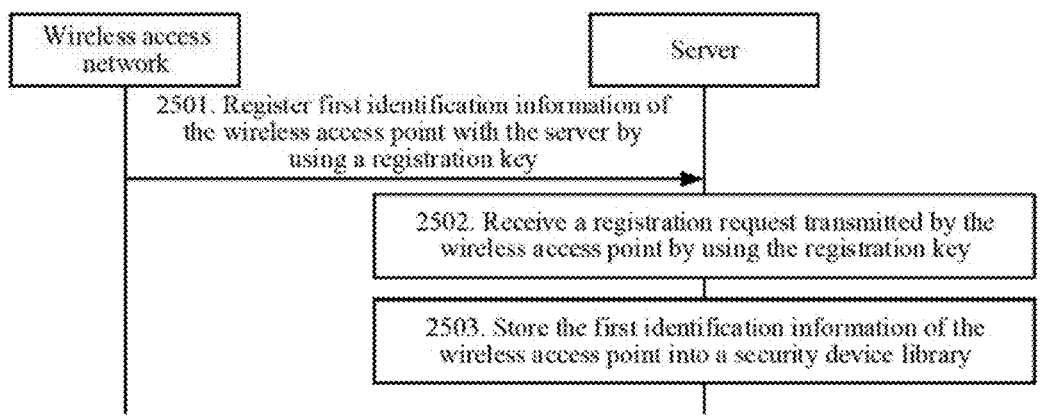
FIG. 25 is a flowchart of a method for registering a wireless access point with a server according to an embodiment.

FIG. 25 is a flowchart of a method for registering a wireless access point with a server according to an embodiment. The method may be applied to the implementation environment shown in FIG. 2 and/or FIG. 3. The method may alternatively be applied to the secure connection product architecture shown in FIG. 4. The method includes the following steps:

Step 2501: The wireless access point registers first identification information of the wireless access point with the server by using a registration key.

The wireless access point transmits the registration key to the server, and the registration key is a key pre-allocated by the server for a registration process. The registration key is used by the wireless access point to register with the server.

The registration key carries the first identification information of the wireless access point, and the first identification information of the wireless access point includes an SN, an SSID, and a BSSID.

Step 2502: The server receives a registration request transmitted by the wireless access point by using the registration key.

The registration request includes the registration key, and the registration key carries the first identification information of the wireless access point. The server extracts the first identification information of the wireless access point from the registration request.

Step 2503: The server stores the first identification information of the wireless access point into a security device library.

The server stores the first identification information of the wireless access point extracted from the registration request into the security device library.

The security device library is a database of first identification information of wireless access points registered with the server by using registration keys. The security device library stores the first identification information of the wireless access point, and the first identification information of the wireless access point includes an SN, an SSID, and a BSSID.

Figure 26:
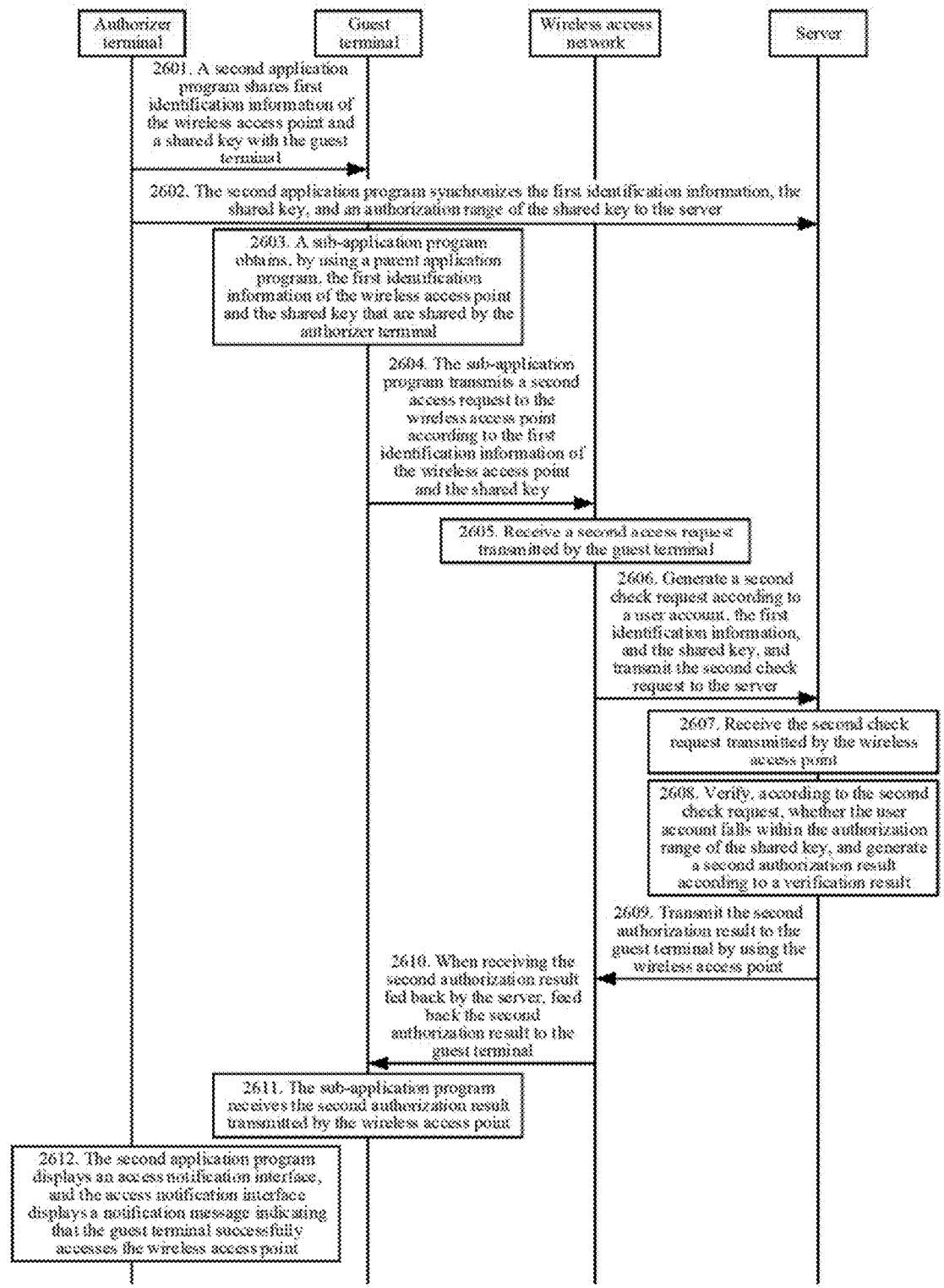
FIG. 26 is a flowchart of a method for sharing, by an authorizer terminal, a link to a wireless network with a guest terminal according to an embodiment.

In the embodiment provided in FIG. 21, the authorizer terminal shares a link to the wireless network with the guest terminal. FIG. 26 is a flowchart of a method for sharing a link to a wireless network with a guest terminal by an authorizer terminal according to an embodiment. The method may be applied to the implementation environment shown in FIG. 2 and/or FIG. 3. The method may alternatively be applied to the secure connection product architecture shown in FIG. 4. The method includes the following steps:

Step 2601: A second application program shares first identification information of the wireless access point and a shared key with the guest terminal.

When both the authorizer terminal and the guest terminal are installed with the same parent application program, the parent application program is a social application program, and the parent application program supports running of a sub-application program.

The second application program of the authorizer terminal shares the link with the guest terminal by using the parent application program, and the link includes the first identification information of the wireless access point and the shared key. The first identification information of the wireless access point includes an SSID and a BSSID.

In addition, there may be a buddy relationship between a user account of the guest terminal on the parent application program and a user account of the authorizer terminal on the parent application program.

The second application program may display a graphic code, and the graphic code carries the first identification information of the wireless access point and the shared key. Alternatively, the second application program transmits a card message to the guest terminal by using the parent application program, and the card message carries the first identification information of the wireless access point corresponding to the link, and the shared key.

Step 2602: The second application program synchronizes the first identification information, the shared key, and an authorization range of the shared key to a server.

The second application program shares the first identification information of the wireless access point and the shared key with a guest terminal other than the authorizer terminal by using the parent application program, and a quantity of shared guest terminals is at least one.

For example, when the second application program shares the first identification information of the wireless access point and the shared key with one guest terminal by using the parent application program, the quantity of shared guest terminals is one, and therefore the authorization range of the shared key is this guest terminal.

For example, when the second application program shares the first identification information of the wireless access point and the shared key with one guest terminal group by using the parent application program, the quantity of shared guest terminals is several, and therefore, the authorization range of the shared key is terminals in the guest terminal group except the authorizer terminal.

After sharing the first identification information of the wireless access point and the shared key with the guest terminal other than the authorizer terminal by using the parent application program, the second application program synchronizes the first identification information, the shared key, and the authorization range of the shared key with the server. The authorization range includes at least one user account.

Step 2603: The sub-application program obtains, by using the parent application program, the first identification information of the wireless access point and the shared key that are shared by the authorizer terminal.

A first application program of the guest terminal is a sub-application program, and the sub-application program is an application program that depends on the parent application program to run. The sub-application program of the guest terminal obtains, by using the parent application program, the first identification information of the wireless access point and the shared key that are shared by the authorizer terminal.

In addition, the parent application program scans a graphic code shared by the authorizer terminal. The parent application program invokes the sub-application program to extract the first identification information of the wireless access point and the shared key from the graphic code. Alternatively, the parent application program receives a card message shared by the authorizer terminal, and the card message corresponds to a link. When receiving a trigger signal for the card message, the parent application program extracts an identifier of the wireless access point and the shared key from the card message by invoking the sub-application program according to the link.

Step 2604: The sub-application program transmits a second access request to the wireless access point according to the first identification information of the wireless access point and the shared key.

The sub-application program transmits the second access request to the wireless access point according to the first identification information of the wireless access point and the shared key that are shared by the authorizer terminal. The second access request is generated by the guest terminal according to the first identification information of the wireless access point and the shared key.

Step 2605: The wireless access point receives the second access request transmitted by the guest terminal.

The second access request includes a MAC packet. The MAC packet includes a MAC header and a payload, the MAC header includes a MAC address of the guest terminal, and the payload includes the shared key. The second access request carries the MAC address of the guest terminal, the first identification information of the wireless access point, and the shared key.

Step 2606: The wireless access point generates a second check request according to the user account, the first identification information, and the shared key, and transmits the second check request to the server.

The wireless access point generates the second check request according to the user account of the guest terminal, the first identification information, and the shared key. The second check request includes a MAC packet, and the MAC packet includes a MAC header and a payload. The MAC header stores a real MAC address of the guest terminal, and the payload stores the shared key generated by the guest terminal. The second check request further carries the first identification information of the wireless access point, and the first identification information of the wireless access point includes an SN, an SSID, and a BSSID.

The second check request is used for checking, according to the user account, the first identification information of the wireless access point, and the shared key, the authorization range received by the server.

Step 2607: The server receives the second check request transmitted by the wireless access point.

Step 2608: The server verifies, according to the second check request, whether the user account falls within the authorization range of the shared key, and generates a second authorization result according to a verification result.

The server extracts the user account from the second check request, verifies whether the user account falls within the authorization range of the shared key, and generates the second authorization result according to the verification result.

In addition, an authorization policy of the server includes: allowing everyone to share for propagation, allowing only an owner to share for propagation, allowing propagation but requiring an owner's acknowledgment, and allowing propagation with an owner notified. Allowing everyone to share for propagation means that anyone who obtains a link to a wireless network can share the link to another person. Allowing only an owner to share for propagation means that a link to a wireless network can be shared only by an authorizer and cannot be shared by other guests. Allowing propagation but requiring an owner's acknowledgment means that a link to a wireless network can be repeatedly shared by other guests, but repeatedly shared guests need to be authorized by an authorizer when accessing the wireless network. Allowing propagation with an owner notified means that a link to a wireless network can be repeatedly shared by other guests, and an authorizer terminal receives a notification message after repeatedly shared guests access the wireless network.

In addition, the second authorization result includes "falling within the authorization range" and "not falling within the authorization range". For example, it may be determined whether the guest terminal falls within an authorization range based on a predetermined distance from the wireless access point.

Moreover, the server obtains, in a secure manner by using an encryption and decryption mechanism, a user account of a guest terminal that requests to gain access, the guest terminal, first identification information, an authorization range, and a shared key. The server traces a relationship chain between the wireless access point and the authorizer terminal according to whether the user account of the guest terminal falls within the authorization range, so that sharing of the authorizer terminal is controlled sharing.

Step 2609: The server transmits the second authorization result to the guest terminal by using the wireless access point.

The second authorization result is transmitted by the server to the wireless access point, and then the wireless access point transmits the second authorization result to the guest terminal.

Step 2610: Based on the second authorization result fed back by the server, the wireless access point transmits the second authorization result to the guest terminal.

Step 2611: The sub-application program receives the second authorization result transmitted by the wireless access point.

The sub-application program of the guest terminal receives the second authorization result, and determines whether the guest terminal belongs to the authorization range, so as to determine whether the wireless network can be connected.

When the second authorization result is "falling within the authorization range", the guest terminal belongs to the authorization range, and the guest terminal can connect to the wireless network.

When the second authorization result is "not falling within the authorization range", the guest terminal does not belong to the authorization range, and the guest terminal cannot connect to the wireless network.

Step 2612: The second application program displays an access notification interface, and the access notification interface displays a notification message indicating that the guest terminal successfully accesses the wireless access point.

When a guest terminal accesses the wireless network by using the shared key, the second application program displays the access notification interface, and the access notification interface displays a notification message indicating that the guest terminal successfully accesses the wireless access point. The schematic diagram of the access notification interface is shown in FIG. 10. The connection record list of new users in FIG. 10 is used for displaying a notification message indicating that a guest terminal successfully accesses a wireless access point. The connection record list of new users further displays a name, a MAC address, and access time of an authorized guest terminal, and a control for rejecting continued access authorization.

According to this embodiment, the wireless network shared by the authorizer terminal is a controllable wireless network. The server feeds back, to the authorizer terminal, a user account and a MAC address of a guest terminal that accesses the wireless network, and the authorizer terminal performs manual or automatic authorization processing according to the user account and the MAC address.

According to this embodiment, the authorizer terminal shares the first identification information of the wireless access point and the shared key with a guest terminal other than the authorizer terminal by using the parent application program, so that the wireless network of the authorizer terminal can be shared with a guest terminal that has a buddy relationship with a user account of the authorizer terminal in the parent application program. In addition, a link for sharing the wireless network carries the shared key. The server can ensure, according to the shared key and the authorization range, that a guest connected to the wireless network conform to an idea of the authorizer, so as to prevent the wireless network from being repeatedly shared by the shared guest.

For example, the wireless access point may be a router, and the server may be a cloud server providing a cloud service. This example is taken to describe a procedure in which the guest terminal requests to access a secure Wi-Fi hotspot from the wireless access point, and a procedure in which the authorizer terminal authorizes sharing for the guest terminal.

Figure 27:
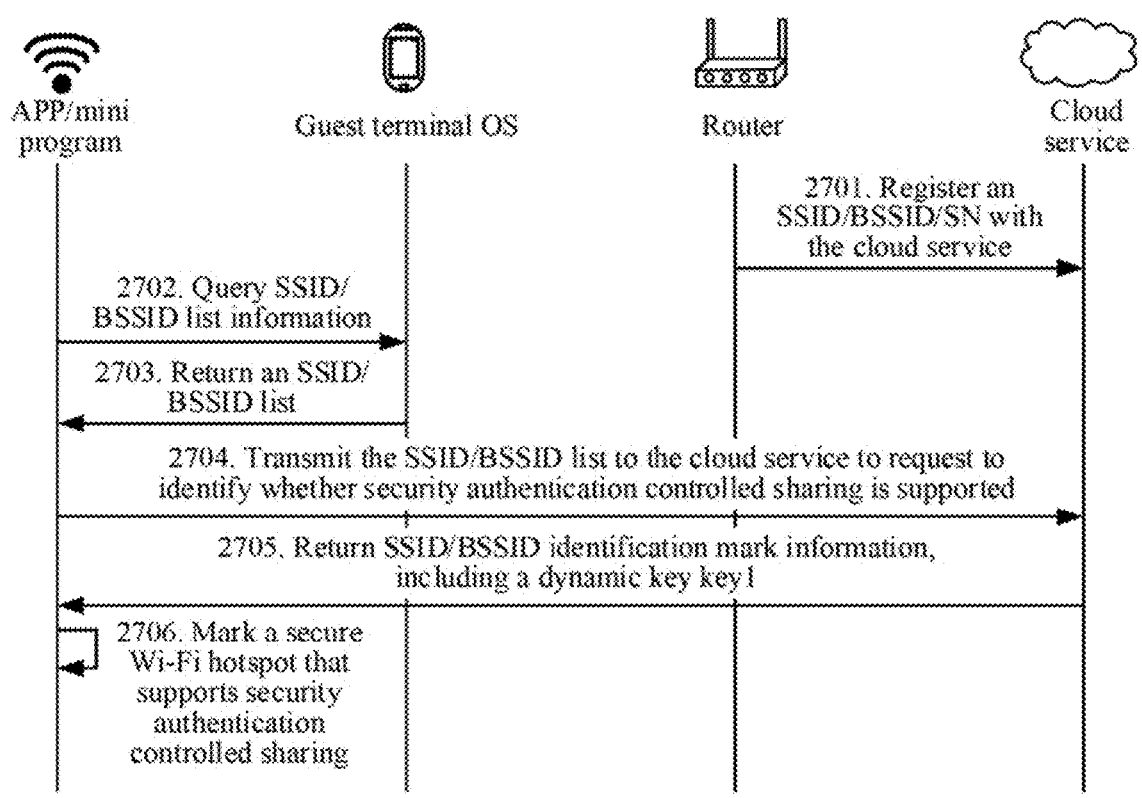
FIG. 27 is a flowchart of a method for identifying a secure Wi-Fi hotspot by a guest terminal according to an embodiment.

FIG. 27 is a flowchart of a method for identifying a secure Wi-Fi hotspot by a guest terminal according to an embodiment. The method may be applied to the implementation environment shown in FIG. 2 and/or FIG. 3. The method may alternatively be applied to the secure connection product architecture shown in FIG. 4. The method includes the following steps:

Step 2701: A router registers an SSID/BSSID/SN with a cloud service.

The router transmits first identification information of the router to the cloud server, and registers with the cloud service as a router that supports a secure connection technology. The first identification information of the router includes an SN/SSID/BSSID, and both the SSID and the BSSID need to exist to indicate the router.

When registering with the cloud service, the router transmits the SN and/or the SSID and the BSSID to the cloud service, and the SN and/or the SSID and the BSSID are used for identifying the router requesting to register.

After the router registers with the cloud service, the cloud service stores the first identification information of the router in a security device library. The security device library is stored in the cloud service, and the security device library includes first identification information of a router registered with the cloud service. The router corresponding to the first identification information stored in the security device library is a router that supports the secure connection technology.

Step 2702: An APP/mini program queries an operating system of a guest terminal for SSID/BSSID list information.

After the APP/mini program on the guest terminal is started, the APP/mini program queries the operating system of the guest terminal for first identification information that is of a router of a secure Wi-Fi hotspot located around the guest terminal and that is stored in the operating system of the guest terminal. The first identification information includes an SSID/BSSID.

Step 2703: The operating system of the guest terminal returns an SSID/BSSID list.

The operating system of the guest terminal obtains the secure Wi-Fi hotspot around the guest terminal by using a Wi-Fi module, and obtains the first identification information of the router corresponding to the secure Wi-Fi hotspot. The first identification information includes the SSID/BSSID.

The operating system of the guest terminal generates the SSID/BSSID list according to the SSID/BSSID of the router obtained by the Wi-Fi module, and returns the SSID/BSSID list to the APP/mini program.

Step 2704: The APP/mini program transmits the SSID/BSSID list to the cloud service to request to identify whether security authentication controlled sharing is supported.

The APP/mini program transmits the SSID/BSSID list to the cloud service. The cloud service receives the SSID/BSSID list, identifies the SSID/BSSID in the SSID/BSSID list, matches the SSID/BSSID that is the same as the SSID/BSSID stored in the security device library, and determines that a router corresponding to the SSID/BSSID that can be matched is a router that supports the secure connection technology. In addition, the router supports security authentication controlled sharing.

Step 2705: The cloud service returns SSID/BSSID identification mark information, including a dynamic key key1, to the APP/mini program.

After determining the matched SSID/BSSID, the cloud service generates the dynamic key key1 according to a MAC address of the guest terminal, the SSID/BSSID, and a user account corresponding to the APP/mini program. The cloud service transmits the matched SSID/BSSID and the dynamic key key1 to the APP/mini program.

Step 2706: The APP/mini program detects a hotspot that supports security authentication controlled sharing.

The APP/mini program receives the matched SSID/BSSID and the dynamic key key1, and detects the secure Wi-Fi hotspot corresponding to the matched SSID/BSSID according to the matched SSID/BSSID. The detected secure Wi-Fi hotspot is a hotspot that supports security authentication controlled sharing.

Figure 28:
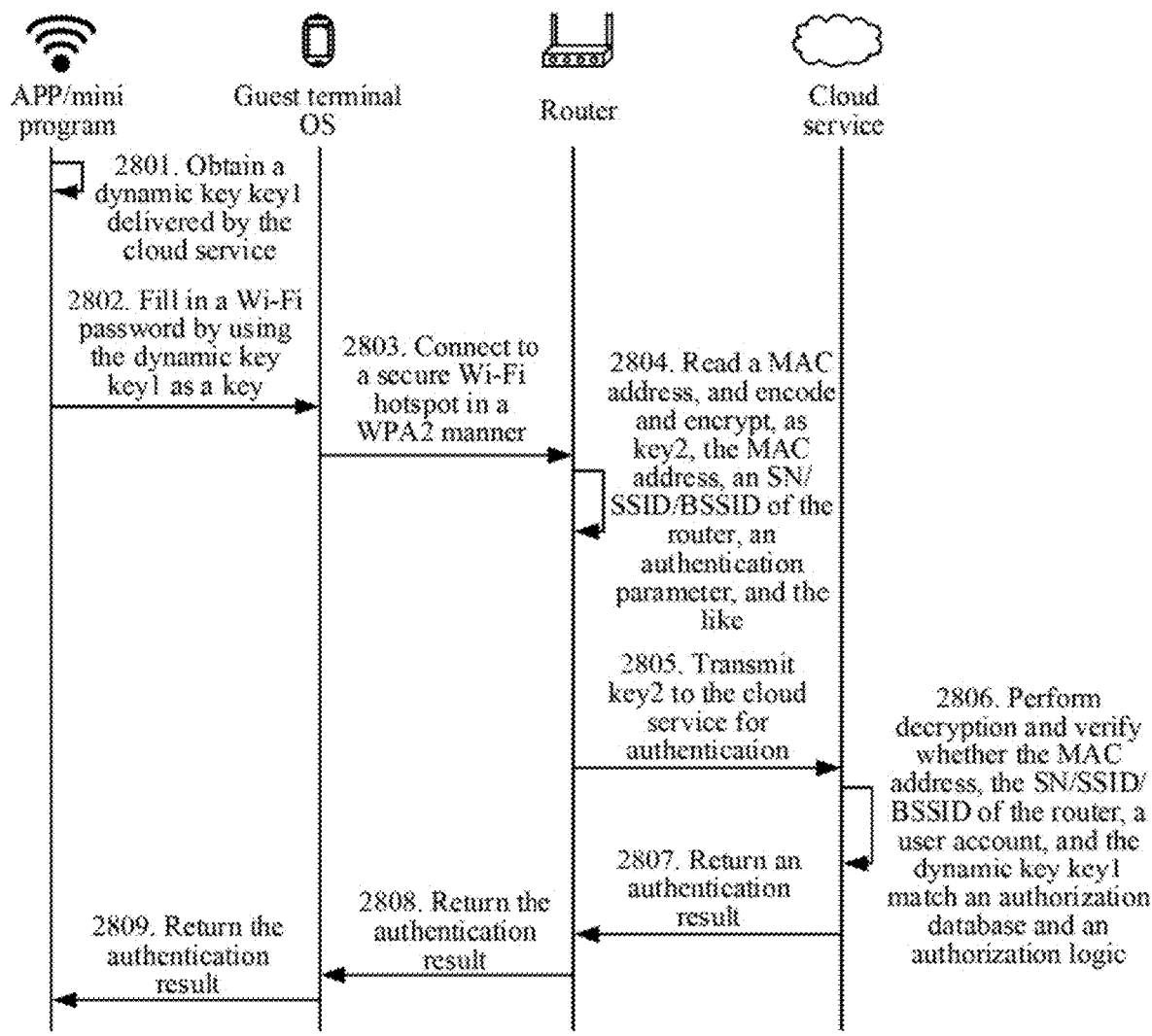
FIG. 28 is a flowchart of a method for connecting to a secure Wi-Fi hotspot by a guest terminal according to another embodiment.

FIG. 28 is a flowchart of a method for connecting to a secure Wi-Fi hotspot by a guest terminal according to another embodiment. The method may be applied to the implementation environment shown in FIG. 2 and/or FIG. 3. The method may alternatively be applied to the secure connection product architecture shown in FIG. 4. The method includes the following steps:

Step 2801: An APP/mini program obtains a dynamic key key1 delivered by a cloud service.

The APP/mini program transmits a user account and an SSID/BSSID of a router to the cloud service. The cloud service generates the dynamic key key1 according to the user account and the SSID/BSSID of the router. The cloud service delivers the dynamic key key1 to the APP/mini program, and the APP/mini program obtains the dynamic key key1 delivered by the cloud service.

Step 2802: The APP/mini program fills in a Wi-Fi password by using the dynamic key key1 as a key.

The APP/mini program fills, with the dynamic key key1, a connection password field of a Wi-Fi password in an operating system of a guest terminal.

Step 2803: The operating system of the guest terminal connects to a secure Wi-Fi hotspot in a WPA2 manner.

The operating system of the guest terminal establishes, according to a WPA2 encryption manner, a connection to a router that can provide a secure Wi-Fi hotspot. That is, the operating system of the guest terminal transmits a first access request to the router, and the first access request is generated in a standard WPA2 encryption manner. The first access request carries a MAC address of the guest terminal.

The first access request carries an authentication parameter, and the authentication parameter is a random parameter generated when the guest terminal and a wireless access point perform transmission in the standard WPA2 encryption manner.

Step 2804: The router reads the MAC address, and encodes and encrypts, as key2, the MAC address, an SN/SSID/BSSID of the router, the authentication parameter, and the like.

The router receives the first access request and reads the MAC address of the guest terminal, the SN/SSID/BSSID of the router, and the authentication parameter. The router encodes and encrypts the first access request as key2.

Step 2805: The router transmits key2 to the cloud service for authentication.

Here, key2 may include the MAC address, the SN/SSID/BSSID of the router, and the authentication parameter.

Step 2806: A server performs decryption and verifies whether the MAC address, the SN/SSID/BSSID of the router, the user account, and the dynamic key key1 match an authorization database and an authorization logic.

After receiving key2, the server decrypts key2 to obtain the MAC address, and determines, according to the MAC address, whether the authorization library stores the MAC address in key2. If the authorization library stores the MAC address in key2, the server determines, according to the MAC address, whether the SN/SSID/BSSID of the router, the user account, and the dynamic key key1 that are in the authorization library and that are corresponding to the MAC address match key2. The server obtains a first authorization result according to a matching result.

Moreover, the first authorization result includes "authorized" and "unauthorized". "Authorized" is generated when the verification result is that the server successfully verifies the information, and "unauthorized" is generated when the verification result is that the server does not successfully verify the information.

Step 2807: The server returns an authentication result to the router.

Step 2808: The router returns the authentication result to the operating system of the guest terminal.

Step 2809: The operating system of the guest terminal returns the authentication result to the APP/mini program.

Figure 29:
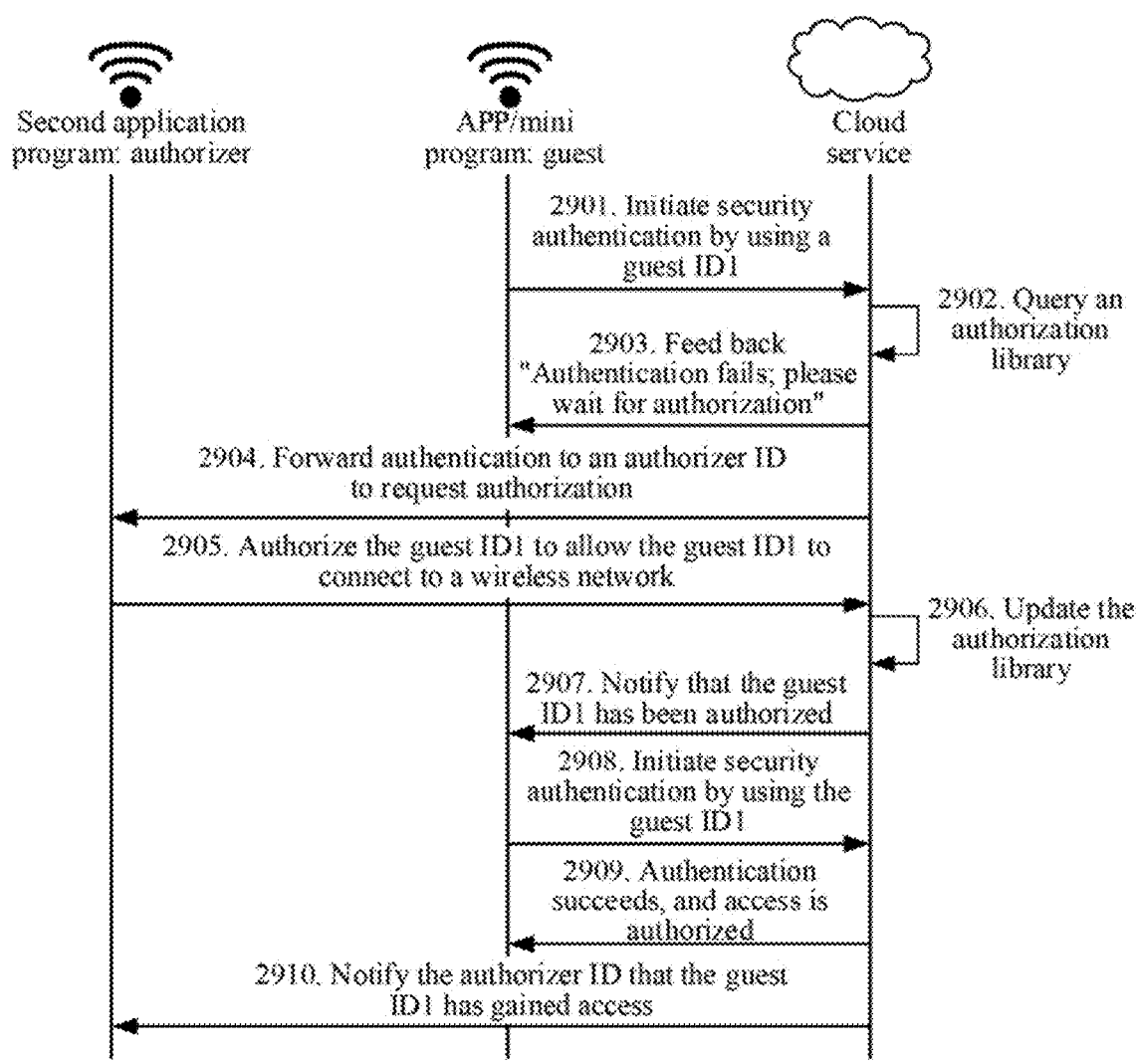
FIG. 29 is a flowchart of a method for requesting, by an unauthorized guest terminal, to access a secure Wi-Fi hotspot according to another embodiment.

FIG. 29 is a flowchart of a method for requesting to access a secure Wi-Fi hotspot by an unauthorized guest terminal according to another embodiment. The method may be applied to the implementation environment shown in FIG. 2 and/or FIG. 3. The method may alternatively be applied to the secure connection product architecture shown in FIG. 4. The method includes the following steps:

Step 2901: Initiate security authentication by using a guest ID1.

The guest ID1 is a user account of a parent application program running on a guest terminal, and an APP/mini program depends on the parent application program to run. The parent application program is a social application program installed on both the guest terminal and an authorizer terminal.

The APP/mini program initiates security authentication to a cloud service by using the guest ID1.

Step 2902: Query an authorization library.

After receiving a request, transmitted by the guest ID1, for requesting to access a wireless network, the cloud service extracts a MAC address transmitted by the guest ID1 with the access request, and queries the authorization library in the cloud service according to the MAC address. If the authorization library stores the MAC address, the cloud service determines that the guest ID1 is an authorized ID, and the guest terminal corresponding to the guest ID1 can directly connect to the wireless network. If the authorization library does not store the MAC address, the cloud service determines that the guest ID1 is an unauthorized ID and performs step 2903.

Step 2903: Transmit a message indicating "Authentication fails; please wait for authorization".

If the authorization library does not store the MAC address, the cloud service determines that the guest ID1 is an unauthorized ID, and transmits a message or information indicating "Authentication fails; please wait for authorization" to the guest terminal corresponding to the guest ID1.

Step 2904: Forward authentication to an authorizer ID to request authorization.

The authorizer ID is a user account of the parent application program running on the authorizer terminal, and the user account of the parent application program and a user account of a second application program are the same user account.

If the authorization library does not store the MAC address, the cloud service determines that the guest ID1 is an unauthorized ID, and forwards authentication to the authorizer ID to request the authorizer ID to authorize the guest ID1 to allow the guest ID1 to access the wireless network.

Step 2905: Authorize the guest ID1 to allow the guest ID1 to connect to the wireless network.

The authorizer authorizes the guest ID1 by using the second application program, so that the guest ID1 is allowed to connect to the wireless network. The authorizer terminal transmits an authorization response to the cloud service by using the second application program.

Step 2906: Update the authorization library.

The cloud service receives the agree to authorize response, and stores, according to the agree to authorize response, information such as the MAC address and the user account that are corresponding to the guest ID1 into the authorization library, so as to update the authorization library.

Step 2907: Notify that the guest ID1 has been authorized.

The cloud service transmits a first authorization result to the APP/mini program, and the first authorization result is "authorized", that is, the cloud service notifies that the guest ID1 has been authorized.

Step 2908: Initiate security authentication by using the guest ID1.

After the APP/mini program receives the first authorization result, the APP/mini program initiates security authentication again to the cloud service by using the guest ID1.

Step 2909: Authentication succeeds, and access is authorized.

According to the request for requesting to access the wireless network, the cloud service finds, according to the MAC address, that the guest ID1 is an authorized guest ID, and transmits a message "Authentication succeeds, and access is authorized" to the APP/mini program.

Step 2910: Notify the authorizer ID that the guest ID1 has gained access.

When the guest ID1 accesses the wireless network, the cloud service transmits an access notification to the second application program, to notify the authorizer ID that the guest ID1 has gained access.

Figure 30:
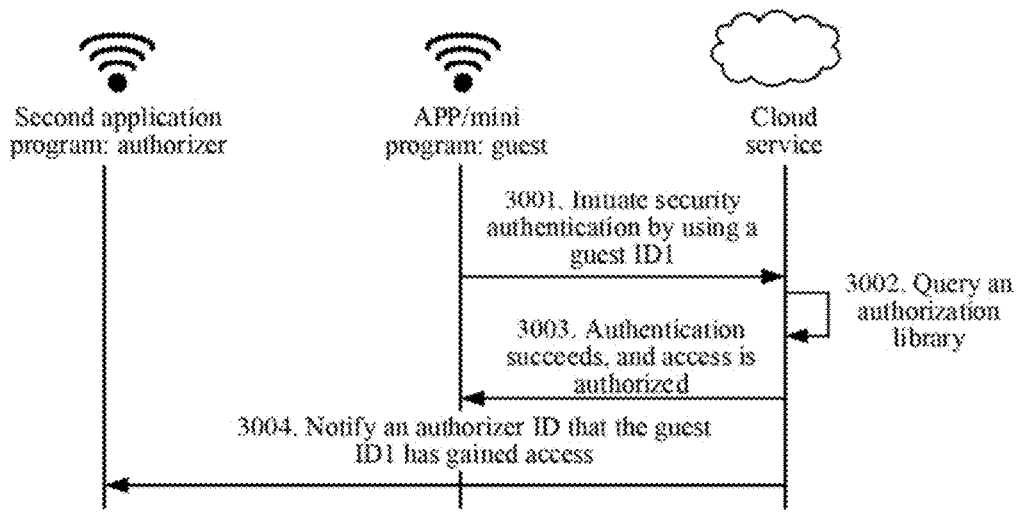
FIG. 30 is a flowchart of a method for requesting, by an authorized guest terminal, to access a secure Wi-Fi hotspot according to an embodiment.

In the embodiment shown in FIG. 29, a flowchart of accessing a wireless network by an unauthorized guest is shown. FIG. 30 is a flowchart of a method for requesting to access a secure Wi-Fi hotspot by an authorized guest terminal according to another embodiment. In this flowchart, when a cloud service stores a MAC address in an authorization library, the cloud service determines that a guest ID1 is an authorized ID, and a guest terminal corresponding to the guest ID1 can directly connect to a wireless network. Then, an alternative step of step 2904 to step 2910 is step 3004. The alternative step is as follows:

Step 3004: Notify the authorizer ID that the guest ID1 has gained access.

When the authorized guest ID1 directly accesses the wireless network, the cloud service transmits an access notification to the second application program, to notify the authorizer ID that the guest ID1 has gained access.

Figure 31:
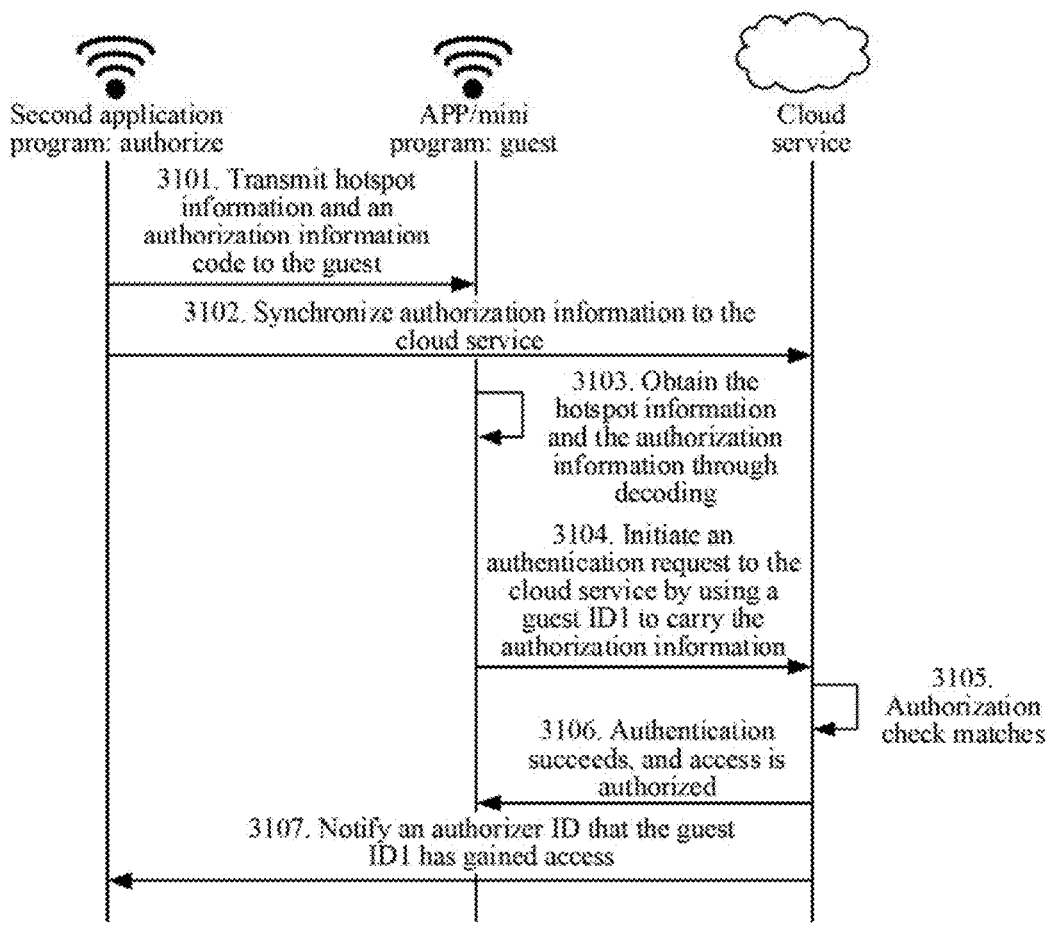
FIG. 31 is a flowchart of a method for sharing a secure Wi-Fi hotspot by an authorizer terminal according to an embodiment.

FIG. 31 is a flowchart of a method for sharing a secure Wi-Fi hotspot by an authorizer terminal according to an exemplary embodiment of this application. The method may be applied to the implementation environment shown in FIG. 2 and/or FIG. 3. The method may alternatively be applied to the secure connection product architecture shown in FIG. 4. The method is applied to a guest terminal running an APP/mini program, and an authorizer terminal running a second application program. The method includes the following steps:

Step 3101: Transmit hotspot information and an authorization information code to a guest.

The hotspot information refers to first identification information of a wireless access point, and the first identification information includes an SSID/BSSID. The authorization information code refers to a shared key, and the shared key is obtained through encoding according to an authorizer ID, an authorization policy, and the first identification information of the wireless access point.

The authorization policy includes: allowing everyone to share for propagation, allowing only an owner to share for propagation, allowing propagation but requiring an owner's acknowledgment, and allowing propagation with an owner notified. Allowing everyone to share for propagation means that anyone who obtains a link to a wireless network can share the link to another person. Allowing only an owner to share for propagation means that a link to a wireless network can be shared only by an authorizer and cannot be shared by other guests. Allowing propagation but requiring an owner's acknowledgment means that a link to a wireless network can be repeatedly shared by other guests, but repeatedly shared guests need to be authorized by an authorizer when accessing the wireless network. Allowing propagation with an owner notified means that a link to a wireless network can be repeatedly shared by other guests, and an authorizer terminal receives a notification message after repeatedly shared guests access the wireless network.

The second application program transmits the first identification information of the wireless access point and the shared key to the guest by using the parent application program.

Step 3102: Synchronize authorization information to the cloud service.

The second application program synchronizes the authorization information to the cloud service at the same time, the authorization information includes the first identification information, the shared key, and an authorization range, and the authorization range includes a user account of at least one guest on the parent application program.

Step 3103: Obtain the hotspot information and the authorization information through decoding.

The APP/mini program decodes the received first identification information and shared key.

Step 3104: Initiate an authentication request to the cloud service by using the guest ID1 to carry the authorization information.

The APP/mini program initiates, according to the decoded first identification information and shared key, the authentication request to the cloud service by using the guest ID1 to carry the shared key, to request to access the wireless network.

Step 3105: Authorization check matches.

The cloud service determines, according to the shared key and the guest ID1, whether the guest ID1 belongs to the authorization range. When determining that the guest ID1 belongs to the authorization range, the cloud service determines that authorization check matches.

Step 3106: Authentication succeeds, and access is authorized.

The cloud service transmits a message "Authentication succeeds, and access is authorized" to the APP/mini program.

Step 3107: Notify the authorizer ID that the guest ID1 has gained access.

When the authorized guest ID1 directly accesses the wireless network, the cloud service transmits an access notification to the second application program, to notify the authorizer ID that the guest ID1 has gained access.

FIG. 1, FIG. 5, FIG. 21, and FIG. 23 to FIG. 31 are schematic flowcharts of a wireless network access method according to various embodiments. It is to be understood that steps in flowcharts of FIG. 1, FIG. 5, FIG. 21 and FIG. 23 to FIG. 31 are displayed in sequence based on indication of arrows, but the steps are not necessarily performed in sequence based on a sequence indicated by the arrows. Unless otherwise specified, execution of the steps is not strictly limited, and the steps may be performed in other sequences. In addition, at least some steps in FIG. 1, FIG. 5, FIG. 21 and FIG. 23 to FIG. 31 may include a plurality of sub-steps or a plurality of stages. The sub-steps or the stages are not necessarily performed at the same moment, but may be performed at different moments. The substeps or the stages are not necessarily performed in sequence, but may be performed in turn or alternately with another step or at least some of substeps or stages of the another step.

The following describes apparatus embodiments, which can be used for executing the method embodiments. For details not disclosed in the apparatus embodiments, refer to the method embodiments of the disclosure.

Figure 32:
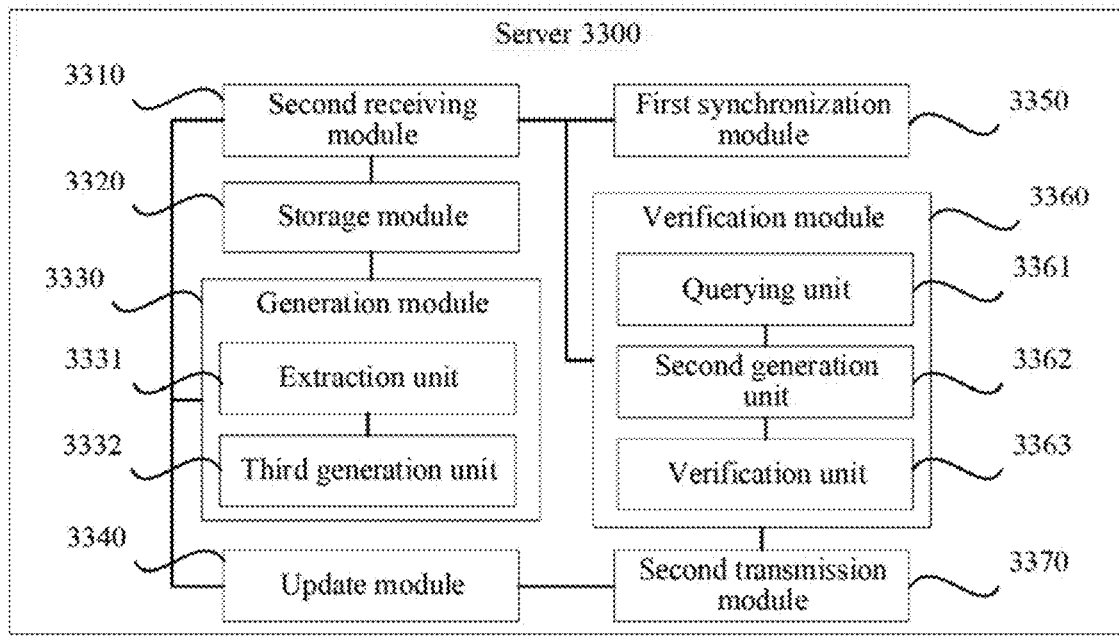
FIG. 32 is a schematic structural diagram of a wireless network connection apparatus according to an embodiment.

FIG. 32 is a schematic structural diagram of a wireless network access apparatus according to an embodiment. The apparatus is applied to a server 3300, and the apparatus includes: a second receiving module 3310 configured to receive a user account and identification information of a wireless access point that are transmitted by a guest terminal, the identification information including first identification information and second identification information; a generation module 3330 configured to: generate a dynamic key key1 according to the user account and the first identification information, and transmit the dynamic key key1 to the guest terminal; the second receiving module 3310 being configured to receive a first check request transmitted by the wireless access point, the first check request carrying a MAC address, the first identification information, and a first MIC; a verification module 3360 configured to verify the first MIC according to the dynamic key key1 found by using the MAC address, and generate a first authorization result according to a verification result of the first MIC; and a second transmission module 3370 configured to transmit the first authorization result to the guest terminal by using the wireless access point.

The verification module 3360 includes: a querying unit 3361 configured to query whether an authorization library stores the MAC address; the querying unit 3361 being configured to: when determining that the authorization library stores the MAC address, query, in the authorization library, the first identification information and the dynamic key key1 that are corresponding to the MAC address; a second generation unit 3362 configured to generate a second MIC according to the MAC address, the dynamic key key1, and the first identification information by using a MIC generation algorithm; and a verification unit 3363 configured to verify whether the first MIC and the second MIC are the same.

The apparatus further includes: the second transmission module 3370 configured to: transmit an authorization request to an authorizer terminal corresponding to the first identification information when the first authorization result is "unauthorized"; the second receiving module 3310 configured to receive an authorization response transmitted by the authorizer terminal; and an update module 3340 configured to: when the authorization response is an agree to authorize response, update the authorization library according to a correspondence between the user account and the first identification information; the second transmission module 3370 being configured to transmit an authorized notification to the guest terminal.

The apparatus further includes: the second transmission module 3370 configured to transmit a first access notification of the guest terminal to an authorizer terminal when a first authorization result is "authorized".

The second transmission module 3370 is configured to: separately transmit the first access notification of the guest terminal to a parent application program and a second application program in the authorizer terminal in the case that the first authorization result is "authorized".

The apparatus further includes: the second receiving module 3310 configured to receive a registration request transmitted by the wireless access point by using a registration key, the registration request carrying the first identification information of the wireless access point; a storage module 3320 configured to store the first identification information of the wireless access point into a security device library; and the generation module 3330 configured to: generate the dynamic key key1 according to the user account and the first identification information when the first identification information is first identification information that belongs to the security device library.

The second receiving module 3310 is configured to receive a query request transmitted by the guest terminal, the query request carrying the user account, the first identification information, and the second identification information; and the generation module 3330 includes: an extraction unit 3331 configured to extract the user account and the first identification information from the query request; and a third generation module 3332, configured to generate the dynamic key key1 according to the user account and the first identification information by using a dynamic key generation algorithm.

The apparatus further includes: a first synchronization module 3350 configured to synchronize the first identification information, a shared key, and an authorization range of the shared key with the authorizer terminal corresponding to the wireless access point, the authorization range including at least one user account; the second receiving module 3310 configured to receive a second check request transmitted by the wireless access point, the second check request being generated based on the user account of the guest terminal, the first identification information, and the shared key; the verification module 3360 configured to: verify, according to the second check request, whether the user account falls within the authorization range of the shared key, and generate a second authorization result according to a verification result; and the second transmission module 3370 configured to transmit the second authorization result to the guest terminal by using the wireless access point.

Figure 33:
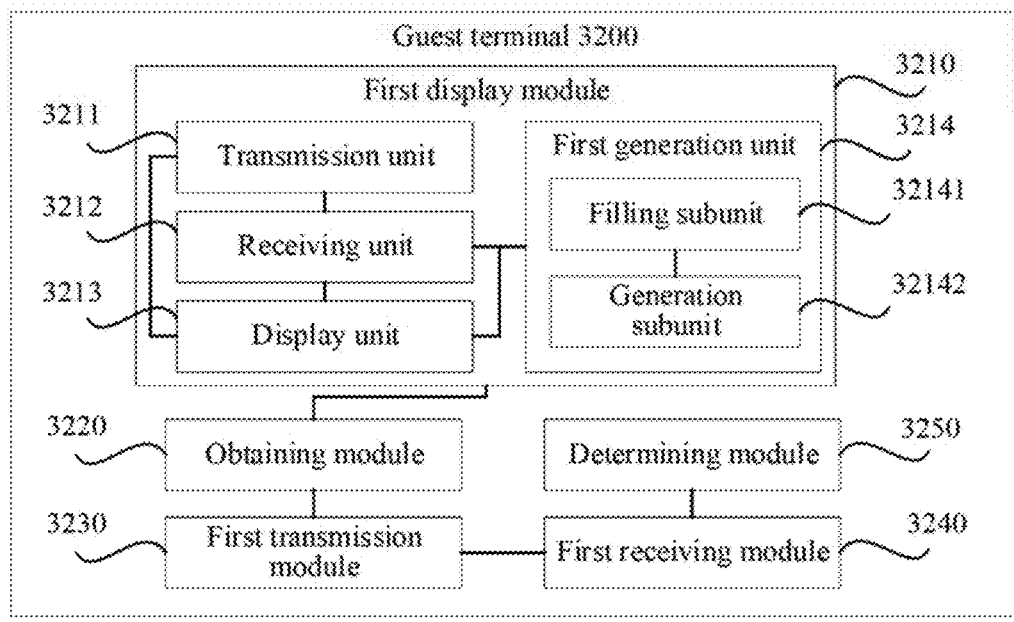
FIG. 33 is a schematic structural diagram of a wireless network connection apparatus according to another embodiment.

FIG. 33 is a schematic structural diagram of a wireless network access apparatus according to an exemplary embodiment. The apparatus may be applied to a guest terminal 3200 that runs a first application program. The apparatus includes: an obtaining module 3220 configured to obtain identification information of at least one wireless access point around the guest terminal; and a first display module 3210 configured to display a wireless network access interface, the wireless network access interface including a classified secure wireless network area and common wireless network area, the secure wireless network area being used for displaying first identification information and a first connection control, and the common wireless network area being used for displaying second identification information and a second connection control; the first display module 3210 being configured to: display a wireless network connection interface in response to receiving a trigger signal for the first connection control, the wireless network connection interface being used for displaying progress prompt information of a wireless network connection process, and the wireless network connection process being an authentication process performed based on a user account and a media access control address of the guest terminal, and the first identification information; and the first display module 3210 being configured to display a network connection result interface after the wireless network connection process is completed, the network connection result interface being used for displaying a connection result of a wireless access point corresponding to the first identification information.

The apparatus further includes: a first transmission module 3230 configured to transmit the user account and the identification information to a server; a first receiving module 3240 configured to receive a dynamic key key1 transmitted by the server, the dynamic key key1 being generated by the server according to the user account and the first identification information; and a determining module 3250 configured to: determine identification information that feeds back the dynamic key key1 as the first identification information, and determine identification information that does not include the dynamic key key1 as the second identification information.

The first display module 3210 includes: a first generation unit 3214 configured to generate a first MIC according to the dynamic key key1 and the first identification information; a transmission unit 3211 configured to transmit a first access request to the wireless access point, the first access request carrying the first MIC and a MAC address; a receiving unit 3212 configured to receive a first authorization result transmitted by the wireless access point, the first authorization result being generated by the server after verifying the first MIC by using the dynamic key key1 found according to the MAC address; and a display unit 3213 configured to display a prompt text of the first authorization result on the wireless network connection interface when the first authorization result is "authorized".

The first generation unit 3214 includes: a filling subunit 32141 configured to fill a connection password field with the dynamic key key1; and a generation subunit 32142 configured to generate the first MIC according to the dynamic key key1 and the first identification information by using a MIC generation algorithm.

In addition, the transmission unit 3211 is configured to transmit the first access request by the first application program in a standard WPA2 encryption manner, the first access request carrying the first MIC and the MAC address.

Further, the first application program is a sub-application program, and the sub-application program may depend on the parent application program to run.

The apparatus further includes: the obtaining module 3220 configured to obtain, by using the parent application program, first identification information of a wireless access point and a shared key that are shared by an authorizer terminal; the first transmission module 3230 configured to transmit a second access request to the wireless access point according to the first identification information of the wireless access point and the shared key; and the first receiving module 3240 configured to receive a second authorization result transmitted by the wireless access point, the second authorization result being determined by the server according to whether the user account falls within an authorization range of the shared key.

The obtaining module 3220 is configured to scan a graphic code shared by the authorizer terminal; and the parent application program invokes the sub-application program to extract the first identification information of the wireless access point and the shared key from the graphic code; or the obtaining module 3220 is configured to receive a card message shared by the authorizer terminal, the card message corresponding to a link; and when receiving a trigger signal for the card message, the parent application program extracts the first identification information of the wireless access point and the shared key from the card message by invoking the sub-application program according to the link.

Figure 34:
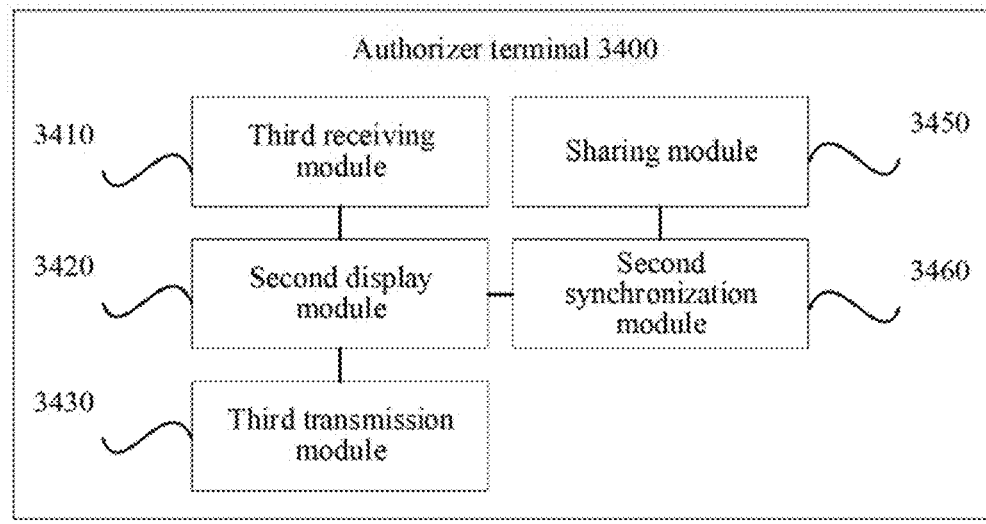
FIG. 34 is a schematic structural diagram of a wireless network connection apparatus according to another embodiment.

FIG. 34 is a schematic structural diagram of a wireless network access apparatus according to an embodiment. The apparatus may be applied to an authorizer terminal 3400 that runs a second application program. The apparatus includes: a third receiving module 3410 configured to receive an authorization request transmitted by a server, the authorization request being a request of a guest terminal for requesting to access a wireless access point, and the authorization request carrying a user account of the guest terminal; a second display module 3420 configured to display an authorization query interface according to the authorization request, the authorization query interface displaying the user account, a MAC address, and an authorization control; and a third transmission module 3430 configured to: transmit an agree to authorize response to the server in response to receiving a trigger signal on the authorization control, the agree to authorize response being used for triggering the server to update an authorization library according to a correspondence among the user account, the MAC address, and first identification information.

In addition, the second display module 3420 is configured to display the authorization query interface on a program interface of the second application program according to the authorization request.

The apparatus further includes: a sharing module 3450 configured to share first identification information of the wireless access point and a shared key with the guest terminal; a second synchronization module 3460 configured to synchronize the first identification information, the shared key, and an authorization range of the shared key to the server, the authorization range including at least one user account; and the second display module 3420 configured to display an access notification interface, the access notification interface displaying a notification message indicating that the guest terminal successfully accesses the wireless access point, the notification message being transmitted by the server based on the server verifying, according to a second check request, that the user account of the guest terminal falls within the authorization range of the shared key, and the second check request being generated by the guest terminal according to the user account, the first identification information, and the shared key.

In addition, the sharing module 3450 is configured to display a graphic code, the graphic code carrying the first identification information of the wireless access point and the shared key; or the sharing module 3450 is configured to transmit a card message to the guest terminal by using a parent application program, the card message carrying a link, and the link corresponding to the first identification information of the wireless access point and the shared key; and the parent application program including an application program installed on both the authorizer terminal and the guest terminal.

Figure 35:
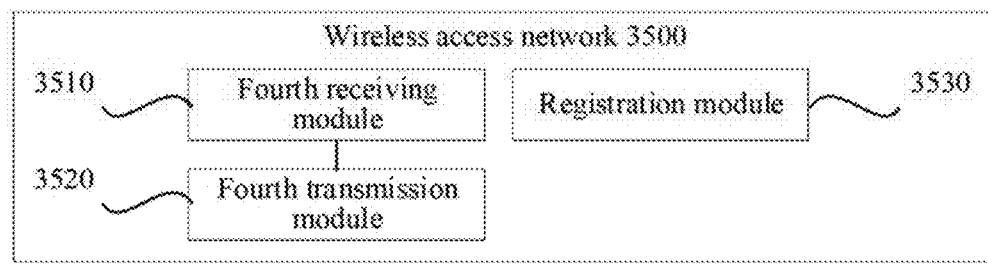
FIG. 35 is a schematic structural diagram of a wireless network connection apparatus according to another embodiment.

FIG. 35 is a schematic structural diagram of a wireless network access apparatus according to an embodiment. The apparatus may be applied to a wireless access point 3500, and the apparatus includes: a fourth receiving module 3510 configured to receive a first access request transmitted by a guest terminal, the first access request carrying a MAC address and a first MIC of the guest terminal, and the first MIC being generated by the guest terminal according to a dynamic key key1 and first identification information; and a fourth transmission module 3520 configured to transmit, to a server, a first check request that carries the first MIC;

The fourth transmission module 3520 may be further configured to: feedback a first authorization result to the guest terminal in response to receiving the first authorization result fed back by the server, the first authorization result being generated by the server according to a verification result of the first MIC.

The fourth transmission module 3520 may be further configured to transmit an encrypted first check request to the server, the first check request carrying the first MIC, the MAC address, and the first identification information of the wireless access point.

The fourth receiving module 3510 is configured to receive the first access request transmitted by the guest terminal in a standard WPA2 encryption manner.

The apparatus further includes: a registration module 3530 configured to register the first identification information of the wireless access point with the server by using a registration key, the registration key being a key pre-allocated by the server for a registration process.

The apparatus further includes: the fourth receiving module 3510 configured to receive a second access request transmitted by the guest terminal, the second access request being generated by the guest terminal according to a graphic code or a card message shared by an authorizer terminal, and the second access request carrying a user account of the guest terminal, the first identification information, and a shared key; and the fourth transmission module 3520 configured to: generate a second check request according to the user account, the first identification information, and the shared key, and transmit the second check request to the server;

The fourth transmission module 3520 may be further configured to: feedback a second authorization result to the guest terminal in response to receiving the second authorization result fed back by the server, the second authorization result being generated by the server by verifying, according to the second check request, whether the user account falls within an authorization range corresponding to the shared key.

The wireless network access apparatus provided in the foregoing embodiments is illustrated with an example of division of the foregoing function modules. In practical application, the foregoing functions may be allocated to and completed by different function modules according to requirements, that is, the structure of the apparatus is divided into different function modules, so as to describe all or part of the functions of the apparatus. In addition, the wireless network access apparatus provided by the foregoing embodiments are based on the same concept as the wireless network access method in the foregoing method embodiments. For the specific implementation process, refer to the method embodiments, and the details are not described herein again.

Figure 36:
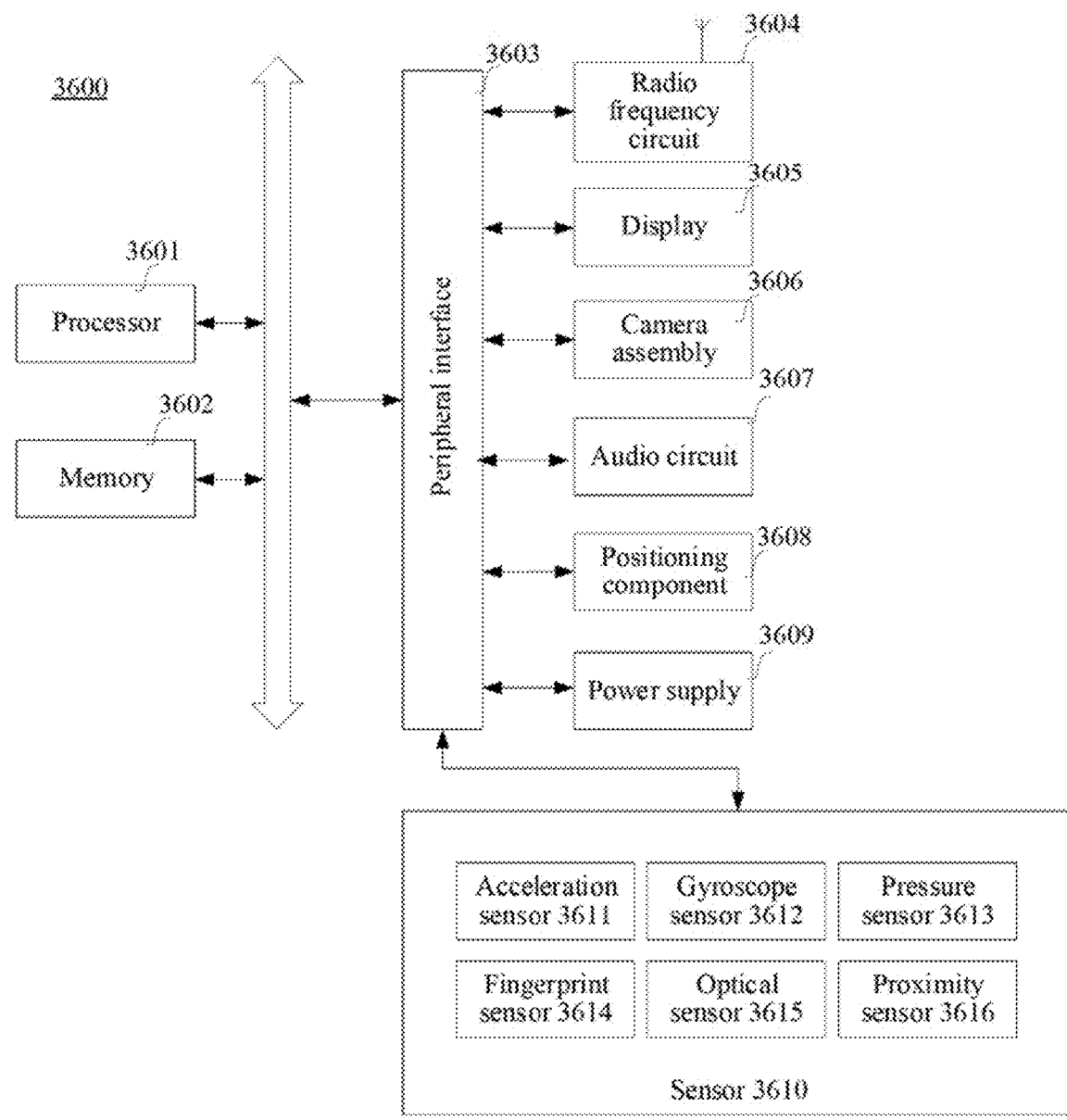
FIG. 36 is a structural block diagram of a terminal according to an embodiment.

FIG. 36 is a structural block diagram of a terminal 3600 according to an embodiment. The terminal 3600 may be a guest terminal or an authorizer terminal. The terminal 3600 may be a smartphone, a tablet computer, a Moving Picture Experts Group Audio Layer III (MP3) player, a Moving Picture Experts Group Audio Layer IV (MP4) player, a laptop computer, or a desktop computer. The terminal 3600 may also be referred to as another name such as user equipment, a portable terminal, a laptop terminal, or a desktop terminal.

The terminal 3600 includes a processor 3601 and a memory 3602.

The processor 3601 may include one or more processors including, for example, a 4-core processor or an 8-core processor. The processor 3601 may be implemented in at least one hardware form of a digital signal processor (DSP), a field-programmable gate array (FPGA), and a programmable logic array (PLA). The processor 3601 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 3601 may be integrated with a graphics processing unit (GPU). The GPU is configured to render and draw content that needs to be displayed on a display screen. In some embodiments, the processor 3601 may further include an artificial intelligence (AI) processor. The AI processor is configured to process computing operations related to machine learning.

The memory 3602 may include one or more computer-readable storage media. The computer-readable storage medium may be non-transient. The memory 3602 may further include a high-speed random access memory and a nonvolatile memory, for example, one or more disk storage devices or flash storage devices. In some embodiments, the non-transitory computer-readable storage medium in the memory 3602 is configured to store at least one instruction, and the at least one instruction being configured to be executed by the processor 3601 to implement the method for observing a virtual environment provided in the method embodiments.

In some embodiments, the terminal 3600 may alternatively include: a peripheral device interface 3603 and at least one peripheral device. The processor 3601, the memory 3602, and the peripheral device interface 3603 may be connected by a bus or a signal line. Each peripheral device may be connected to the peripheral device interface 3603 by using a bus, a signal cable, or a circuit board. Specifically, the peripheral device includes at least one of a radio frequency circuit 3604, a touch display screen 3605, a camera 3606, an audio circuit 3607, a positioning component 3608, and a power supply 3609.

The peripheral interface 3603 may be configured to connect the at least one peripheral related to input/output (I/O) to the processor 3601 and the memory 3602. In some embodiments, the processor 3601, the memory 3602 and the peripheral device interface 3603 are integrated on a same chip or circuit board. In some embodiments, any one or two of the processor 3601, the memory 3602, and the peripheral device interface 3603 may be implemented on a single chip or circuit board. However, the peripheral interface 3603 is not limited thereto.

The RF circuit 3604 is configured to receive and transmit an RF signal, also referred to as an electromagnetic signal. The RF circuit 3604 communicates with a communication network and other communication devices through the electromagnetic signal. The RF circuit 3604 converts an electrical signal into an electromagnetic signal for transmission, or converts a received electromagnetic signal into an electrical signal. The RF circuit 3604 includes: an antenna system, an RF transceiver, one or more amplifiers, a tuner, an oscillator, a digital signal processor, a codec chip set, a subscriber identity module card, and the like. The RF circuit 3604 may communicate with other terminals by using at least one wireless communication protocol. The wireless communication protocol includes, but is not limited to, a world wide web, a metropolitan area network, an intranet, generations of mobile communication networks (2G, 3G, 4G, and 5G), a wireless local area network and/or a wireless fidelity (Wi-Fi) network. In some embodiments, the RF 3604 may further include a circuit related to NFC, which is not limited in this application.

The display screen 3605 is configured to display a user interface (UI). The UI may include a graph, text, an icon, a video, and any combination thereof. When the display screen 3605 is a touch display screen, the display screen 3605 also has the capability to collect a touch signal on or above a surface of the display screen 3605. The touch signal may be inputted to the processor 3601 as a control signal for processing. In this case, the display screen 3605 may be further configured to provide a virtual button and/or a virtual keyboard, which is also referred to as a soft button and/or a soft keyboard. In some embodiments, there may be one display screen 3605 disposed on a front panel of the terminal 3600. In some other embodiments, there may be at least two display screens 3605 respectively disposed on different surfaces of the terminal 3600 or designed in a foldable shape. In still some other embodiments, the display screen 3605 may be a flexible display screen disposed on a curved surface or a folded surface of the terminal 3600. Even, the display screen 3605 may be further set in a non-rectangular irregular pattern, namely, a special-shaped screen. The display screen 3605 may be prepared by using materials such as a liquid crystal display (LCD), an organic light-emitting diode (OLED), or the like.

The camera component 3606 is configured to capture images or videos. The camera component 3606 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to render background blur through fusion of the main camera and the depth-of-field camera, panoramic photographing and virtual reality (VR) photographing through fusion of the main camera and the wide-angle camera, or other fusion photographing functions. In some embodiments, the camera component 3606 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 3607 may include a microphone and a speaker. The microphone is configured to collect sound waves of a user and an environment, and convert the sound waves into an electrical signal to input to the processor 3601 for processing, or input to the radio frequency circuit 3604 for implementing voice communication. For a purpose of stereo collection or noise reduction, there may be a plurality of microphones disposed at different portions of the terminal 3600 respectively. The microphone may further be an array microphone or an omni-directional collection type microphone. The speaker is configured to convert an electrical signal from the processor 3601 or the radio frequency circuit 3604 into acoustic waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 3607 may also include an earphone jack.

The positioning component 3608 is configured to position a current geographic location of the terminal 3600, to implement navigation or a location based service (LBS). The positioning component 3608 may be a positioning component based on the global positioning system (GPS) of the United States, the BeiDou System of China, and the GALILEO System of Russia.

The power supply 3609 is configured to supply power to components in the terminal 3600. The power supply 3609 may be an alternating current, a direct current, a disposable battery, or a rechargeable battery. When the power supply 3609 includes a rechargeable battery, and the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the terminal 3600 may further include one or more sensors 3610. The one or more sensors 3610 include, but are not limited to: an acceleration sensor 3611, a gyroscope sensor 3612, a pressure sensor 3613, a fingerprint sensor 3614, an optical sensor 3615, and a proximity sensor 3616.

The acceleration sensor 3611 may detect a magnitude of acceleration on three coordinate axes of a coordinate system established by the terminal 3600. For example, the acceleration sensor 3611 may be configured to detect a component of gravity acceleration on the three coordinate axes. The processor 3601 may control, according to a gravity acceleration signal collected by the acceleration sensor 3611, the touch display screen 3605 to display the user interface in a transverse view or a longitudinal view. The acceleration sensor 3611 may be further configured to collect data of a game or a user movement.

The gyroscope sensor 3612 may detect a body direction and a rotation angle of the terminal 3600. The gyroscope sensor 3612 may cooperate with the acceleration sensor 3611 to collect a 3D action by the user on the terminal 3600. The processor 3601 may implement the following functions according to the data collected by the gyro sensor 3612: motion sensing (for example, changing the UI according to a tilt operation of the user), image stabilization during shooting, game control, and inertial navigation.

The pressure sensor 3613 may be disposed at a side frame of the terminal 3600 and/or a lower layer of the touchscreen 3605. When the pressure sensor 3613 is disposed on the side frame of the terminal 3600, a holding signal of the user on the terminal 3600 may be detected. The processor 3601 performs left and right hand recognition or a quick operation according to the holding signal collected by the pressure sensor 3613. When the pressure sensor 3613 is disposed at the lower layer of the touch display screen 3605, the processor 3601 controls an operable control on the UI interface according to a pressure operation performed by the user on the touch display screen 3605. The operable control includes at least one of a button control, a scroll-bar control, an icon control, and a menu control.

The fingerprint sensor 3614 is configured to collect a user's fingerprint, and the processor 3601 identifies a user's identity according to the fingerprint collected by the fingerprint sensor 3614, or the fingerprint sensor 3614 identifies a user's identity according to the collected fingerprint. When identifying that the user's identity is a trusted identity, the processor 3601 authorizes the user to perform related sensitive operations. The sensitive operations include: unlocking a screen, viewing encrypted information, downloading software, paying, changing a setting, and the like. The fingerprint sensor 3614 may be disposed on a front surface, a rear surface, or a side surface of the terminal 3600. When a physical button or a vendor logo is disposed on the terminal 3600, the fingerprint 3614 may be integrated with the physical button or the vendor logo.

The optical sensor 3615 is configured to collect ambient light intensity. In an embodiment, the processor 3601 may control the display brightness of the touch display screen 3605 according to the ambient light intensity collected by the optical sensor 3615. Specifically, when the ambient light intensity is relatively high, the display brightness of the touch display screen 3605 is increased. When the ambient light intensity is relatively low, the display brightness of the touch display screen 3605 is decreased. In another embodiment, the processor 3601 may further dynamically adjust a camera parameter of the camera component 3606 according to the ambient light intensity collected by the optical sensor 3615.

The proximity sensor 3616, also referred to as a distance sensor, is usually disposed on the front panel of the terminal 3600. The proximity sensor 3616 is configured to collect a distance between a front face of the user and the front face of the terminal 3600. In an embodiment, when the proximity sensor 3616 detects that the distance between the front face of the user and the front face of the terminal 3600 is gradually decreased, the processor 3601 controls the display screen 3605 to switch from a screen-on state to a screen-off state. When the proximity sensor 3616 detects that the distance between the front face of the user and the front face of the terminal 3600 is gradually increased, the processor 3601 controls the display screen 3605 to switch from the screen-off state to the screen-on state.

A person skilled in the art may understand that the structure shown in FIG. 36 does not constitute a limitation to the terminal 3600, and the terminal may include more components or fewer components than those shown in the figure, or some components may be combined, or a different component deployment may be used.

Figure 37:
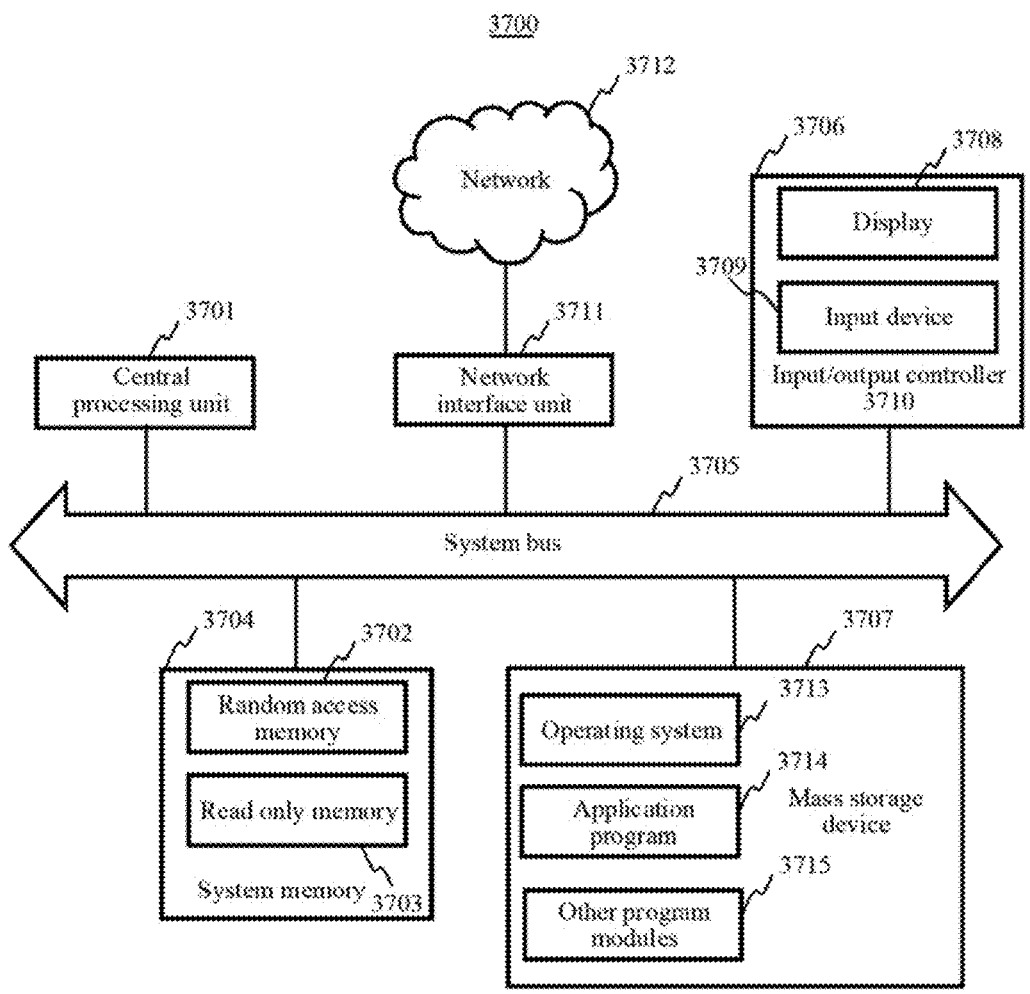
FIG. 37 is a schematic structural diagram of a server according to an embodiment.

FIG. 37 is a schematic structural diagram of a server according to an embodiment. The server is configured to implement the wireless network access method in the foregoing embodiments.

The server 3700 includes a central processing unit (CPU) 3701, a system memory 3704 including a random access memory (RAM) 3702 and a read-only memory (ROM) 3703, and a system bus 3705 connecting the system memory 3704 and the CPU 3701. The server 3700 further includes a basic I/O system 3706 for transmitting information between components in a computer, and a mass storage device 3707 used for storing an operating system 3713, an application program 3714, and another program module 3715.

The basic I/O system 3706 includes a monitor 3708 configured to display information and an input device 3709 such as a mouse or a keyboard that is configured for information inputting by a user. The monitor 3708 and the input device 3709 are both connected to the CPU 3701 by using an I/O controller 3710 connected to the system bus 3705. The basic I/O system 3706 may further include the I/O controller 3710, to receive and process inputs from a plurality of other devices, such as the keyboard, the mouse, or an electronic stylus. Similarly, the input/output controller 3710 further provides an output to a display, a printer or another type of output device.

The large-capacity storage device 3707 is connected to the CPU 3701 by using a large-capacity storage controller (not shown) connected to the system bus 3705. The large-capacity storage device 3707 and an associated computer readable medium provide non-volatile storage for the server 3700. That is, the mass storage device 3707 may include a computer readable medium, such as a hard disk or a CD-ROM drive.

A person of ordinary skill in the art may understand that some or all procedures in the methods in the foregoing embodiments may be implemented in a computer-readable instruction instructing related hardware, the program may be stored in a non-volatile computer readable storage medium, and when the program is executed, the procedures in the foregoing method embodiments may be implemented. Any reference to a memory, a storage, a database, or another medium used in the embodiments provided in this application can include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external high-speed cache. For the purpose of description instead of limitation, the RAM is available in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchronous link (Synchlink) DRAM (SLDRAM), a RAM bus (Rambus) direct RAM (RDRAM), a direct Rambus dynamic RAM (DRDRAM), and a Rambus dynamic RAM (RDRAM). The system memory 3704 and the mass storage device 3707 may be collectively referred to as a memory.

According to various embodiments, the server 3700 may be connected, by using a network such as the Internet, to a remote computer on the network and run. That is, the server 3700 may be connected to a network 3712 by using a network interface unit 3711 connected to the system bus 3705, or may be connected to another type of network or a remote computer system by using the network interface unit 3711.

The memory further includes one or more programs. The one or more programs are stored in the memory and configured to be executed by one or more processors. The one or more programs include instructions for performing the following operations: receiving a user account and identification information of a wireless access point that are transmitted by a guest terminal; generating a dynamic key key1 according to the user account and the identification information, and transmitting the dynamic key key1 to the guest terminal; receiving a first check request transmitted by the wireless access point, the first check request carrying a MAC address, the identification information, and a first MIC; verifying the first MIC according to the dynamic key key1 found by using the MAC address, and generating a first authorization result according to a verification result of the first MIC; and transmitting the first authorization result to the guest terminal by using the wireless access point.

Figure 38:
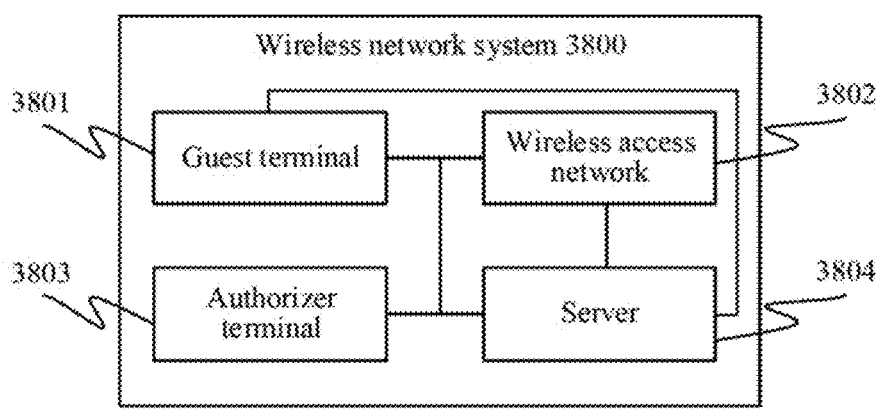
FIG. 38 is a block diagram of a wireless network system according to an embodiment.

FIG. 38 is a block diagram of a wireless network system 3800 according to an embodiment. As shown in FIG. 38, the communications system 3800 includes a guest terminal 3801, a wireless access point 3802, an authorizer terminal 3803, and a server 3804.

The guest terminal 3801, the wireless access point 3802, the authorizer terminal 3803, and the server 3804 are configured to perform the wireless network access methods performed in the embodiments shown in FIG. 5 and FIG. 21 to FIG. 31.

In an embodiment, a computer readable storage medium is further provided. The computer readable storage medium is a non-volatile computer readable storage medium. A computer program is stored in the computer readable storage medium. When the stored computer program is executed by a processing component, the wireless network access method provided in the foregoing embodiments can be implemented.

A computer program product may be provided according to the one or more embodiments of the disclosure. The computer program product stores one or more instructions. When the one or more instructions run on a computer, the computer can perform the wireless network access method provided in the embodiments of the disclosure.

The term "plurality of" in the disclosure means two or more. The term "and/or" describes an association relationship for describing associated objects and represents that three relationships may exist. For example, A and/or B may represent the following cases: Only A, both A and B, and only B.

The term used in the one or more embodiments of the disclosure such as "unit" or "module" indicates a unit for processing at least one function or operation, and may be implemented in hardware (e.g., processor and/or memory), software (e.g., developed using a computer programming language), or in a combination of hardware and software. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit.

The term "unit" or "module" may be implemented by a program that is stored in an addressable storage medium and executable by a processor.

For example, the term "unit" or "module" may include software components, object-oriented software components, class components and task components, processes, functions, attributes, procedures, subroutines, segments of a program code, drivers, firmware, microcode, circuitry, data, databases, data structures, tables, arrays, and/or variables.

A person of ordinary skill in the art may understand that all or some of the foregoing embodiments may be implemented by using hardware, or may be implemented by a program instructing relevant hardware. The program may be stored in a non-transitory computer-readable storage medium. The storage medium may be a ROM, a magnetic disk, an optical disc, or the like.

The technical features in the foregoing embodiments may be combined or further divided in different manners. To make the description concise, not all possible combinations of the technical features in the foregoing embodiments are described. However, combinations of the technical features shall all be considered as falling within the scope of the disclosure to the extent that the combinations of the technical features do not conflict with each other.

The foregoing embodiments only show several implementations of the disclosure and are described in detail, but should not be construed as limiting the patent scope of the disclosure. A person of ordinary skill in the art may further make variations and improvements without departing from the scope of the disclosure, which all fall within the protection scope of the disclosure. Therefore, the protection scope of the disclosure is subject to the protection scope of the appended claims.

What is claimed is:

1. A wireless network access method to prevent unauthorized access sharing, performed by a server, the method comprising:

receiving, by the server and from a guest terminal, a user account and identification information of a wireless access point, the identification information comprising first identification information and second identification information, wherein the first identification information is associated with a secure wireless network, and wherein the second identification information is associated with a common wireless network;

based on determining that the secure wireless network is a secure network, generating, by the server, a first dynamic key using the user account and the first identification information, and transmitting the first dynamic key to the guest terminal;

receiving, by the server and from the wireless access point, an encrypted version of a second dynamic key, wherein the second dynamic key was generated by the wireless access point based on a media access control (MAC) address of the guest terminal, the first identification information, and a first message integrity code (MIC);

verifying, by the server, whether the MAC address of the guest terminal is stored in an authorization library based on decrypting the second dynamic key and the MAC address, and generating a first authorization result according to a verification result;

transmitting, by the server and to the guest terminal through the wireless access point, the first authorization result;

transmitting, by the server, an authorization request to an authorizer terminal corresponding to the first identification information in response to the guest terminal being unauthorized by the first authorization result, wherein the authorizer terminal is a different terminal than the guest terminal;

receiving, by the server and from the authorizer terminal, an authorization response authorizing the guest terminal to access the secure wireless network;

updating, by the server, the authorization library according to a correspondence between the user account and the first identification information based on the authorization response; and transmitting, by the server the authorization response authorizing the quest terminal to access the secure wireless network to the guest terminal.

2. The method according to claim 1, wherein the verifying the MAC address comprises:

querying whether the MAC address is stored in the authorization library;

based on determining that the MAC address is stored in the authorization library, querying, in the authorization library, the first identification information and the first dynamic key that correspond to the MAC address;

generating a second MIC according to the MAC address, the first dynamic key, and the first identification information by using a MIC generation algorithm; and verifying whether the first MIC and the second MIC are same.

3. The method according to claim 2, wherein the method further comprises:

transmitting a first access notification of the guest terminal to the authorizer terminal based on the first authorization result authorizing the first MIC.

4. The method according to claim 3, wherein the transmitting the first access notification of the guest terminal to the authorizer terminal comprises:

separately transmitting the first access notification of the guest terminal to a parent application program and a second application program in the authorizer terminal based on the first authorization result authorizing the first MIC.

5. The method according to claim 1, wherein the method further comprises:

receiving a registration request and a registration key from the wireless access point, the registration request including the first identification information of the wireless access point; and storing the first identification information of the wireless access point into a security device library, wherein the generating the first dynamic key according to the user account and the first identification information further comprises:

generating the first dynamic key according to the user account and the first identification information based on the first identification information belonging to the security device library.

6. The method according to claim 1, wherein the receiving the user account and the identification information of the wireless access point from the guest terminal comprises:

receiving a query request transmitted by the guest terminal, the query request including the user account, the first identification information, and the second identification information, and wherein the generating the first dynamic key according to the user account and the first identification information comprises:

extracting the user account and the first identification information from the query request; and generating the first dynamic key according to the user account and the first identification information by using a dynamic key generation algorithm.

7. The method according to claim 1, wherein the method further comprises:

synchronizing the first identification information, a shared key, and an authorization range of the shared key with the authorizer terminal corresponding to the wireless access point, the authorization range including at least one user account;

receiving a second check request transmitted by the wireless access point, the second check request being generated based on the user account of the guest terminal, the first identification information, and the shared key;

verifying, according to the second check request, whether the user account falls within the authorization range of the shared key, and generating a second authorization result according to a second verification result; and transmitting the second authorization result to the guest terminal through the wireless access point.

8. A wireless network access method to prevent unauthorized access sharing, performed by at least one processor configured to implement a first application program on a guest terminal, the method comprising:

obtaining identification information of more than one wireless access point in an area surrounding the guest terminal, the identification information comprising first identification information and second identification information, wherein the first identification information is associated with a secure wireless network, and wherein the second identification information is associated with a common wireless network;

displaying a wireless network access interface, the wireless network access interface comprising a secure wireless network display area and a common wireless network display area, the secure wireless network area being used for displaying the first identification information and a first connection control, and the common wireless network display area being used for displaying the second identification information and a second connection control;

displaying a wireless network connection interface in response to receiving a trigger signal for the first connection control, the wireless network connection interface being used for displaying progress prompt information of a wireless network connection process, and the wireless network connection process being an authentication process performed by a server based on a user account, a media access control (MAC) address of the guest terminal, the first identification information, a first dynamic key generated by the server, and a second dynamic key that is generated by the secure wireless network;

receiving, from an authorizer terminal, an authorization response authorizing the guest terminal to access the secure wireless network in response to the wireless network connection process by the server being unsuccessful and the guest terminal being unauthorized to access the secure wireless network, wherein the authorizer terminal is a different terminal than the quest terminal; and displaying a network connection result interface based on receiving the authorization response authorizing the guest terminal to access the secure wireless network, the network connection result interface being used for displaying a connection result of a wireless access point corresponding to the secure wireless network.

9. The method according to claim 8, wherein the displaying the wireless network access interface, further comprises:
- transmitting the user account and the identification information to the server;
- receiving the first dynamic key from the server, the first dynamic key being generated by the server according to the user account and the first identification information; and
- determining identification information that includes the first dynamic key as the first identification information, and determining identification information that does not include the first dynamic key as the second identification information.

10. The method according to claim 9, wherein the displaying the wireless network connection interface comprises:
- generating a first message integrity code (MIC) according to the first dynamic key and the first identification information;
- transmitting a first access request to the wireless access point, the first access request including the first MIC and the MAC address;
- receiving a first authorization result from the wireless access point, the first authorization result being generated by the server after verifying the first MIC by using the first dynamic key obtained by using the MAC address; and
- displaying a prompt text of the first authorization result on the wireless network connection interface based on the first authorization result authorizing the first MIC.

11. The method according to claim 9, wherein the generating the first MIC according to the first dynamic key and the first identification information comprises:
- filling a connection password field with the first dynamic key; and
- generating the first MIC according to the first dynamic key and the first identification information by using a MIC generation algorithm.

12. The method according to claim 10, wherein the transmitting the first access request to the wireless access point comprises:
- transmitting the first access request according to a Wi-Fi Protected Access 2 (WPA2) encryption standard, the first access request including the first MIC and the MAC address.

13. The method according to claim 8, wherein the first application program is a sub-application program, and
- wherein the sub-application program depends on a parent application program to run.

14. The method according to claim 13, wherein the method further comprises:
- obtaining, by the sub-application program, the first identification information of the wireless access point and a shared key that are shared by the authorizer terminal;
- transmitting, by the sub-application program, a second access request to the wireless access point according to the first identification information of the wireless access point and the shared key; and
- receiving, by the sub-application program, a second authorization result transmitted by the wireless access point, the second authorization result being determined by the server according to whether the user account falls within an authorization range of the shared key.

15. The method according to claim 14, wherein the obtaining, by the sub-application program, the first identification information of the wireless access point and the shared key that are shared by the authorizer terminal comprises:
- scanning, by the parent application program, a graphic code shared by the authorizer terminal; and
- invoking, by the parent application program, the sub-application program to extract the first identification information of the wireless access point and the shared key from the graphic code.

16. The method according to claim 14, wherein the obtaining, by the sub-application program, the first identification information of the wireless access point and the shared key that are shared by the authorizer terminal comprises:
- receiving, by the parent application program, a card message shared by the authorizer terminal, the card message being corresponding to a link; and
- invoking, by the parent application program in response to receiving the trigger signal for the card message, the sub-application program according to the link to extract the first identification information of the wireless access point and the shared key from the card message.

17. A wireless network access apparatus, the wireless network access apparatus comprising:
- at least one memory storing computer program code;
- at least one processor configured to access the at least one memory and operate as instructed by the computer program code, the computer program code comprising:
  - first receiving code configured to cause at least one processor to receive, from a guest terminal, a user account and identification information of a wireless access point, the identification information comprising first identification information and second identification information, wherein the first identification information is associated with a secure wireless network, and wherein the second identification information is associated with a common wireless network;
  - first generation code configured to cause at least one processor to generate a first dynamic key using the user account and the first identification information, and transmit the first dynamic key to the guest terminal;
  - second receiving code configured to cause at least one processor to receive, from the wireless access point, an encrypted version of a second dynamic key, wherein the second dynamic key was generated by the wireless access point based on a media access control (MAC) address of the guest terminal, the first identification information, and a first message integrity code (MIC);
  - verification code configured to cause at least one processor to verify whether the MAC address of the guest terminal is stored in an authorization library based on decrypting the second dynamic key and the MAC address, and generating a first authorization result according to a verification result;
  - second transmission code configured to cause at least one processor to transmit, to the guest terminal through the wireless access point, the first authorization result;
  - authorization request transmission code configured to cause at least one processor to transmit an authorization request to an authorizer terminal corresponding to the first identification information in response to the guest terminal being unauthorized by the first authorization result, wherein the authorizer terminal is a different terminal than the guest terminal;
  - authorization receiving code configured to cause at least one processor to receive an authorization response from the authorizer terminal authorizing the guest terminal to access the secure wireless network;

updating code configured to cause at least one processor to update the authorization library according to a correspondence between the user account and the first identification information based on the authorization response; and authorization response transmission code configured to cause at least one processor to transmit the authorization response authorizing the quest terminal to access the secure wireless network to the guest terminal.

18. The wireless network access apparatus according to claim 17, wherein the verification code further comprises:

querying code configured to cause at least one processor to:

query whether the authorization library stores the MAC address, and based on determining that the authorization library stores the MAC address, query, in the authorization library, the first identification information and the first dynamic key that correspond to the MAC address; and second generation code configured to cause at least one processor to generate a second MIC according to the MAC address, the first dynamic key and the first identification information using a message integrity check generation algorithm, wherein the verification code is further configured to cause at least one processor to verify whether the first MIC and the second MIC are same.

19. The wireless network access apparatus according to claim 17, wherein the second receiving code is further configured to cause at least one processor to receive a registration request and a registration key from the wireless access point, the registration request including the first identification information of the wireless access point, wherein the wireless network access apparatus further comprises storage code configured to cause at least one processor to store the first identification information of the wireless access point into a security device library, and wherein the first generation code is further configured to cause at least one processor to generate the first dynamic key according to the user account and the first identification information based on the first identification information belonging to the security device library.

* * * * *